US009237211B2

(12) United States Patent
Tabe

(10) Patent No.: US 9,237,211 B2
(45) Date of Patent: *Jan. 12, 2016

(54) ENERGY HARVESTING MEGA COMMUNICATION DEVICE AND MEDIA APPARATUS CONFIGURED WITH APPARATUS FOR BOOSTING SIGNAL RECEPTION

(76) Inventor: Joseph Akwo Tabe, Silver Spring, MD (US)

(*) Notice: Subject to any disclaimer, the term of this patent is extended or adjusted under 35 U.S.C. 154(b) by 1401 days.

This patent is subject to a terminal disclaimer.

(21) Appl. No.: 12/852,481

(22) Filed: Aug. 7, 2010

(65) Prior Publication Data

US 2012/0034954 A1 Feb. 9, 2012

(51) Int. Cl.
*H04M 1/00* (2006.01)
*H04M 1/02* (2006.01)
*H04M 1/60* (2006.01)
*H04M 1/725* (2006.01)
(Continued)

(52) U.S. Cl.
CPC .............. *H04M 1/0202* (2013.01); *H04M 1/00* (2013.01); *H04M 1/6083* (2013.01); *H04M 1/72522* (2013.01); *H04W 52/04* (2013.01); *H04B 1/3838* (2013.01); *H04M 1/0214* (2013.01); *H04M 1/0235* (2013.01); *H04M 1/72536* (2013.01); *H04M 1/72558* (2013.01);
(Continued)

(58) Field of Classification Search
CPC ................... H01L 2924/0002; H01L 2924/00; H01L 23/5387; H04M 1/6083; H04M 1/72547; H04M 1/72561; H04M 1/00; H04M 1/0202; H04M 1/0214; H04M 1/0235; H04M 1/72522; H04M 1/72536; H04M 1/72558
USPC ........ 455/414.1, 420, 422.1, 423, 425, 456.4, 455/13.4, 41.1, 41.2, 41.3, 522, 523, 63.1, 455/67.11, 67.13, 550.1, 556.2, 566, 78, 85, 455/566.1, 571, 577, 573, 572, 574, 575.5, 455/575.6, 575.7, 575.8, 90.3, 13.1, 11.1, 455/114.1, 114.2, 115.1, 115.3; 340/539.1, 340/539.11, 539.19, 539.21, 539.22, 340/539.23, 539.26, 539.3, 506, 521; 977/762, 701, 707, 721, 722, 932; 370/277, 328, 338, 310.2
See application file for complete search history.

(56) References Cited

U.S. PATENT DOCUMENTS 4,939,766 A * 7/1990 Umemoto et al. ............ 455/462
5,564,085 A * 10/1996 Chen et al. .................... 455/117
(Continued)

*Primary Examiner* — Babar Sarwar
(74) *Attorney, Agent, or Firm* — Joseph Tabe

(57) ABSTRACT

Disclosed embodiments comprise an energy harvesting computer device in association with a communication device comprising interactive user interface operatively configured with CMOS multiple antennas on chin for boosting signal receptions and for providing faster data transmission speed. Disclosed embodiment encompasses three modes of communications—the Cell phone, wireless Internet applications, and Global communication and media information. Embodiments provide communication apparatus operable to enhance mobile communication efficiency with touch sensitive display comprising energy harvesting platform in communication with a charging circuit board configured with memories, processors, sensors, and modules. Embodiments further provide a gaming device, a wireless media device configured with touch pads comprising sensors being embedded in silicon substrate and fused in nano-fiber/microfiber material having excellent electrical characteristics. Certain embodiments provide communication apparatus configured for voice enabled applications comprising human voice auditory platform for converting text into voice auditory and/or voice auditory into text applications.

54 Claims, 37 Drawing Sheets

(51) Int. Cl.
*H04W 52/04* (2009.01)
*H04B 1/3827* (2015.01)

(52) U.S. Cl.
CPC ...... *H04M 2250/10* (2013.01); *H04M 2250/12* (2013.01); *H04M 2250/22* (2013.01)

(56) References Cited

U.S. PATENT DOCUMENTS

| | | | | |
|---|---|---|---|---|
| 5,584,055 | A * | 12/1996 | Murui et al. | 455/569.1 |
| 5,831,664 | A * | 11/1998 | Wharton et al. | 725/81 |
| 5,842,037 | A * | 11/1998 | Haartsen | 710/1 |
| 5,890,071 | A * | 3/1999 | Shimanuki | 455/567 |
| 5,914,947 | A * | 6/1999 | Saito | 370/337 |
| 6,073,019 | A * | 6/2000 | Lowdon | 455/436 |
| 6,377,823 | B1 * | 4/2002 | Higuchi et al. | 455/567 |
| 6,381,469 | B1 * | 4/2002 | Wojick | 455/550.1 |
| 6,437,836 | B1 * | 8/2002 | Huang et al. | 348/734 |
| 7,002,621 | B2 * | 2/2006 | Adair et al. | 348/158 |
| 2006/0031883 | A1 * | 2/2006 | Ellis et al. | 725/58 |

* cited by examiner

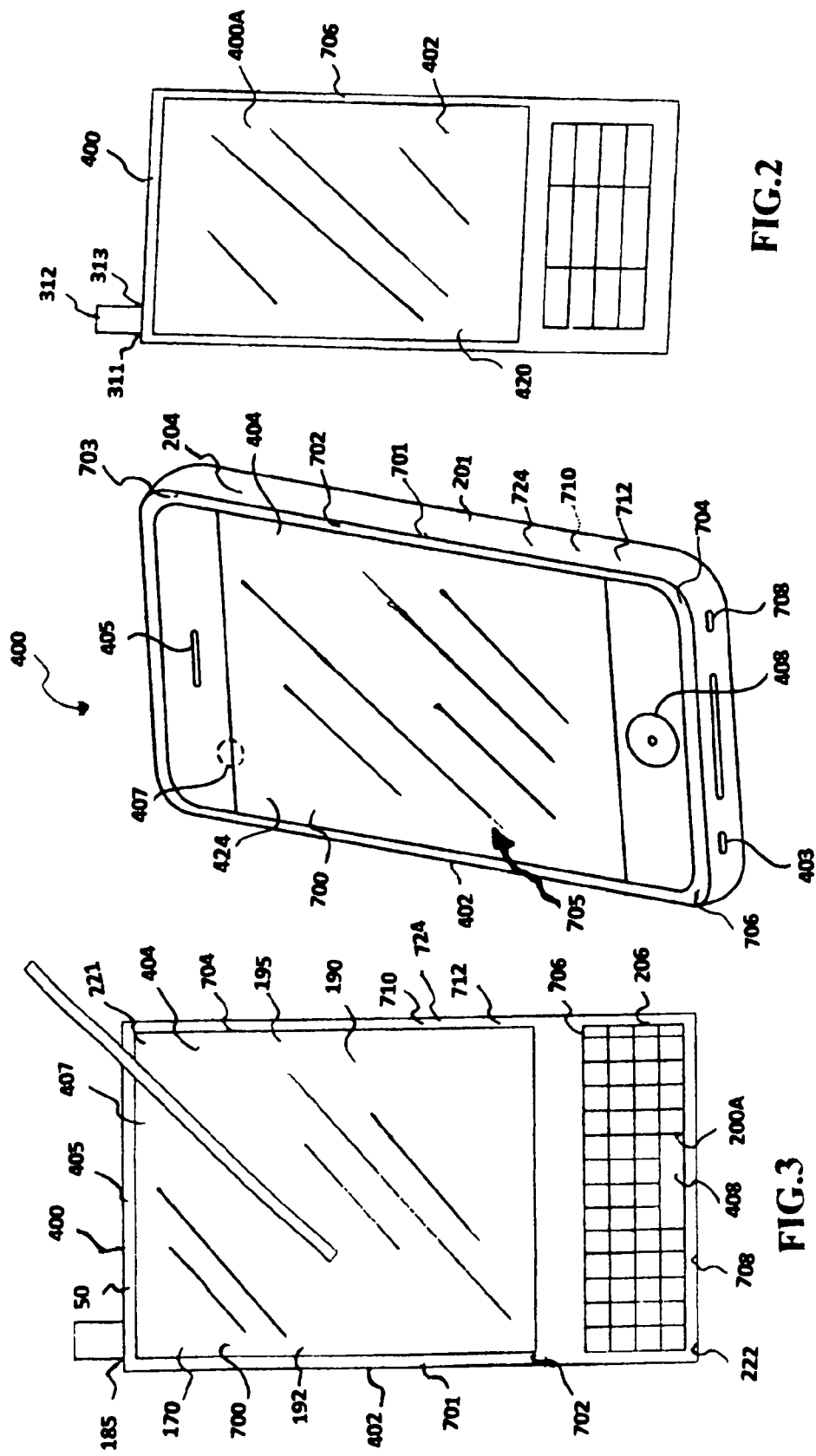

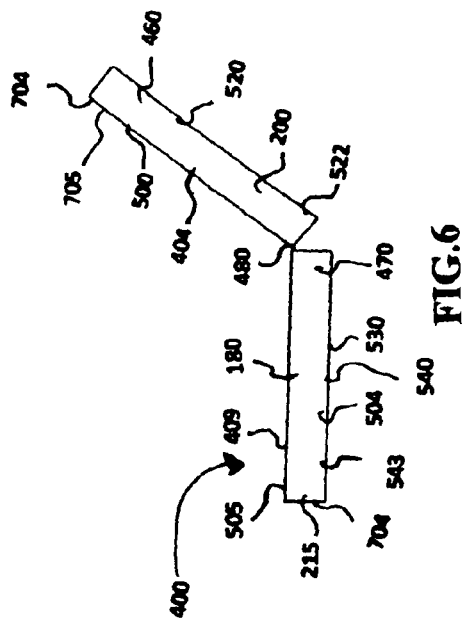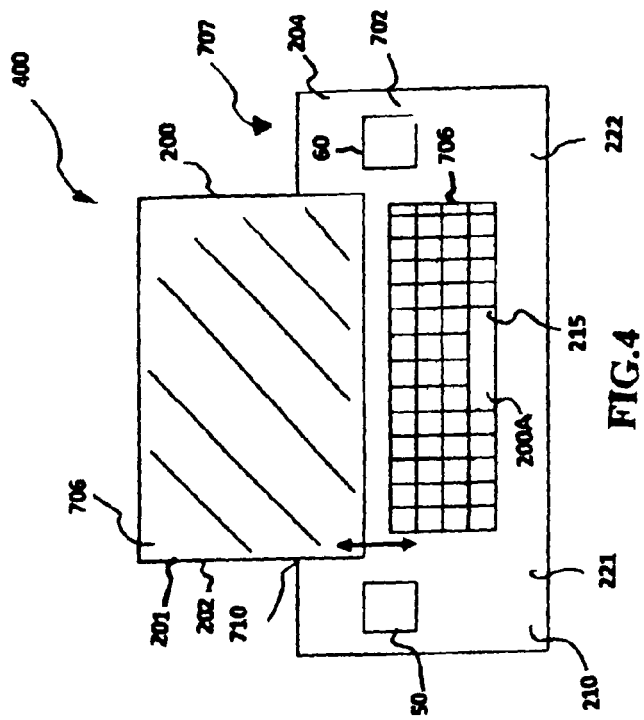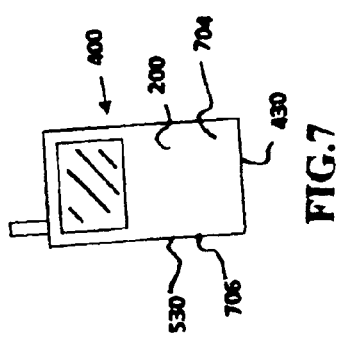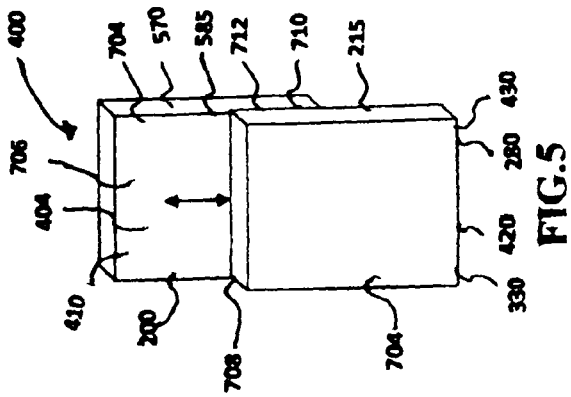

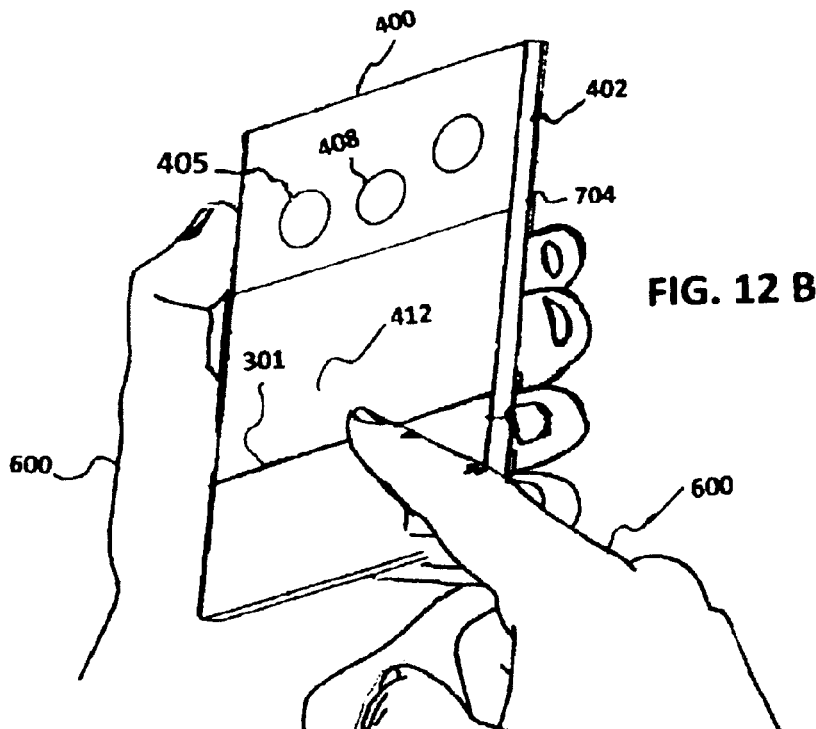
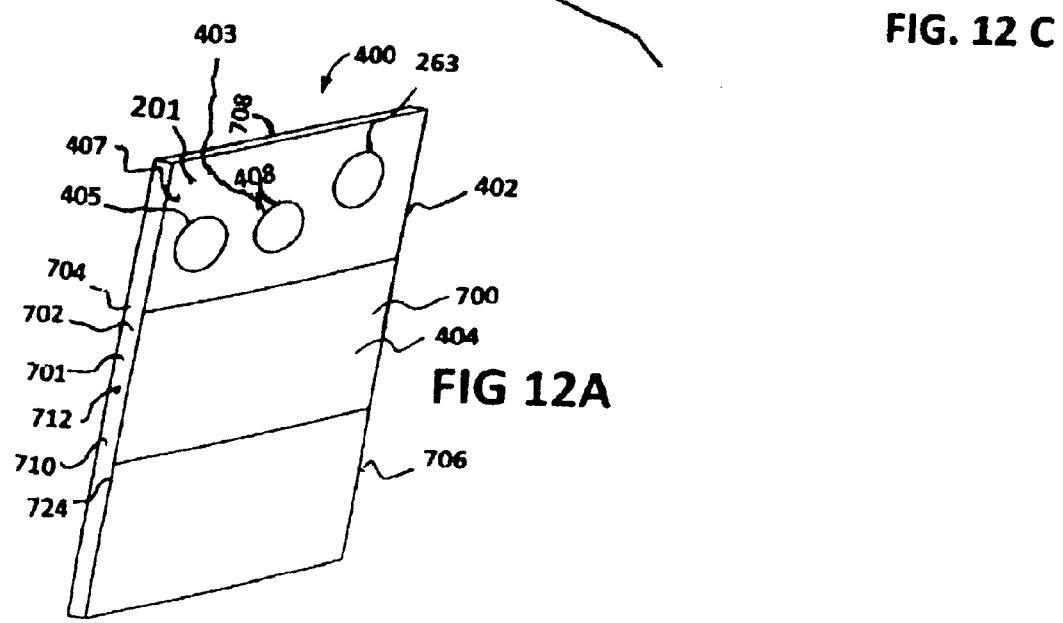
FIG. 12 B
FIG. 12
FIG. 12 C
FIG 12A

A BLOCK DIAGRAM AND SYMBOL FOR A SILCON CONTROLLED RECTIFIER

A SIMPLE SCR SWITCHING CIRCUIT

ENERGY HARVESTING MEGA COMMUNICATION DEVICE AND MEDIA APPARATUS CONFIGURED WITH APPARATUS FOR BOOSTING SIGNAL RECEPTION

The Present Application is a Continuation-In-Part of U.S. patent application Ser. No. 12/795,567, filed on Jun. 7, 2010, which claims priority benefit from application Ser. No. 11/475,286, filed on Feb. 28, 2006, which is a continuation in part of Ser. No. 10/814,087, filed on Mar. 31, 2004, now U.S. Pat. No. 7,116,942, which is a continuation in part of Ser. No. 09/559,330, filed Apr. 12, 2000, now U.S. Pat. No. 6,782,240, which claims priority benefit from provisional application Ser. No. 60/131,134, filed Apr. 27, 1999. The present application further claims priority benefit from application Ser. No. 11/821,776, filed Jun. 25, 2007, now U.S. Pat. No. 7,872,575, which is a continuation in part of application Ser. No. 10/660,473, filed Sep. 12, 2003, now U.S. Pat. No. 7,271,720, which claim benefit from provisional application Ser. No. 60/426,800, filing Date Nov. 18, 2002. The present application further claims priority benefit from application Ser. No. 10/995,093, filed Nov. 24, 2004, now U.S. Pat No. 7,839,273, and Application Ser. No. 12/607,086, filed Oct. 28, 2009, Application Ser. No. 11/977,365, Filed Oct. 24, 2007. All of these applications are incorporated by reference herein in their entirety.

TECHNICAL FIELD

Disclosed embodiments provide communication apparatus operatively configured to prevent cancerous diseases and to convert sound waves, vibrations, solar energy, and pressure force into electrical energy communicable to tend battery cell. Disclosed embodiment encompasses three modes of communications—the Cell phone, wireless Internet applications, and Global communication and information. Disclosed embodiments provide communication apparatus operable to improve quality of life and enhance mobile communication efficiency. Some embodiments provide wired and wireless communication apparatus, broadcasting device, entertainment device, remote control device, medical diagnostics device, emergency communications and alarm apparatus, interactive touch screen device, object controlled communication device, control systems for single and/or multimode communications, tele-informatics device, telemetry device, advanced vehicular computing and media applications for in-vehicle interactive communications, and wireless Internet applications. Embodiments further provide visor screen configured with touch screen comprising sensors being embedded in silicon substrate and fused in micro fiber material having excellent electrical characteristics. Certain embodiments provide communication apparatus for voice enabled applications comprising human voice auditory, signal amplification, better data and graphical transmission. Embodiments provide a media device configured for various telecommunications and Internet applications. Certain embodiment provide sensory platform on a screen apparatus comprising a display device configured with touch screen methods comprising graphical user interface operable for determining commands.

BACKGROUND OF THE INVENTION

Until recently, cell phone usage has become increasingly useful to businesses, individuals and most of all, automobile users. Today, more people use cell phones for business transactions and/or to reach love ones. Yet cell phone usage has been blamed for about 70% of fatal accidents occurring on our roads. Many states have instituted and are enforcing no-cell-phone usage while driving in order to save lives. Disclosed embodiments provide advanced method for entertainment, computing, and communications and would improve emailing applications with human voice auditory response to mails, GPS communications, and traffic communications by more than 90 percent. The increase in cellular telephones has dramatically reach world applications. People around the world are relying exclusively on cell phones, and are abandoning their traditional land line telephone services in favor of the convenience of cell phone mobility. There is a need for cell phone reliance, reliability, and amplified signal strength.

Cell phones emit radiofrequency (RF) energy called radio wave. The amount of RF energy produced by cell phones is too low and causes significant tissue heating and/or increase in body temperature. The amount of RF energy may pose cancer risk to cell phone users in a long run because cell phones emit radiofrequency (RF) energy at low signal strength (radio waves), which is a form of radiation. Constant loss in power may cause battery loss and may cause the production of harmful radiations which may cause brain cancer in future. Disclosed embodiments further provide a booster and/or a repeater comprising a chip being embedded in a circuit in communication with antenna apparatus. The antenna apparatus is affixed in proximity with the battery compartment and communicatively connected internally to the cell phone. Disclosed embodiment is operable for providing high signal strength for speedy data transmission. Disclosed embodiments are operable on at least one of: dual band, tri band or digital. Prior art devices can cause many problems to human body including brain cancer. Additionally, weak signal often result in signal radiations and dropped calls which can be annoying to consumers and expensive for the wireless service providers. Dropped calls are as a result of lost signals between a cell phone and a base station. This may occur for a number of reasons, such as interference due to buildings or mountains, increase in distance between the cell phone and the base station. There is a particular need to increase the reliability of cell phones near large buildings and to eliminate signal radiation causing brain tumor, including neurological effects such as sleep disruption, headaches, and dizziness.

Parent applications incorporated by reference herein in their entirety teaches means to increase the reliability of cell phones through signal boosters. Disclosed embodiments provide communication apparatus configured for signal amplification. Certain embodiments provide a communication apparatus comprising of a cellular network amplifiers being configured to receive the cellular signal sent from a base station, and operable to amplify and retransmit the signal to one or more cell phones. Some embodiments provide the cellular network amplifier being operable to receive the signals from one or more cell phones and being configured to amplify and retransmit the signals to the base station.

Although cellular network amplifiers are typically placed in relatively close proximity to one or more cell phones, these amplifiers are configured to increase the level of the signals being transmitted to and from the cell phones to enable cell phones to communicate with base stations that are out of range. Some of the amplifiers are configured to be integrated with the cell phone and/or cell phone cradle. Other amplifiers are configured to be disposed away from the cell phone location, in a vehicle, and/or in a poor reception area.

Though conventional cell phone signal boosters are externally connected to apply constant gain levels to the signal passing through the amplifier, these external signal boosters typically are expensive devices. Internal signal boosters would produce maximum regulatory allowable power and would eliminate signal radiation and roaming. Disclosed embodiment provide internally disposed signal booster to further advance distance communication signals and also eliminate signal interference due to close proximity to a base station overload, preventing unwanted oscillation. Cell phone signal boosters that are mounted externally can cause interference that would create significant problems for wireless service providers by causing degradation to the overall signal and service quality.

The many problems being solved by the application of disclosed embodiments include:
- Reduce exposure to electromagnetic radiation. This radiation is invisible and the danger may not be easily noted.
- Reduce effects on the human body, particularly the brain.
- Reduce the link between mobile phone signals and brain cancer.
- Reduce brain tumor incidence rates caused by cell phone harmful radiations.

It has been anticipated that these dangers have far broader public health ramifications than smoking, and directly concerns all of us, particularly younger generation. Disclosed embodiment reduces public health ramifications to radiation exposure, and this exposure is far broader with prior at devices than smoking.

Disclosed embodiments provide signal amplification method comprising a platform for empowering cell phones and radio antenna apparatus. The platform is operable to enable stronger signals and protects the cell phone from radiation. The platform comprises nanotechnology application configured with sensors embedded in silicon substrate and fused/etched in a micro fiber material for generating electrical energy.

The antenna apparatus comprises CMOS" digital circuitry design, and include microprocessors operable on integrated circuits (chips). Certain embodiments provide antenna method with CMOS circuitry being operable to dissipate less power when static. Embodiments provide antenna apparatus with CMOS processes and variants. Disclosed embodiments provide CMOS circuit that allows the implementation logic gates through p-type and n-type metal oxide semiconductor field effect transistors to create paths to the output from either the voltage source or ground. When a path to output is created from the voltage source, the circuit is pulled up. The other circuit state occurs when a path to output is created from ground and the output pulled down to the ground potential.

Furthermore, slow data speeds are caused by weak cellular signals. These signals can be amplified with advanced technologies. Though there are devices that boost communication signals, these devices are external signal booster devices with limited applications. Mega telecommunication and information system is operable to increase cellular signal strength with an internal antenna apparatus being configured with a chip operable on a logic circuit. The chip is operatively configured to boost communication signals through the cell phone antenna to improve sound quality and reduce dropped calls. The chip is operable on a logic circuit being communicatively connected with the cell phone circuit board and in communication with the antenna. Disclosed embodiments provide software in communication with the logic circuit being configured for analyzing signal strength and data speed. The amplification of the signals would improve cellular data card "IC card and SIM card" reception, providing faster data transfer speeds. The chip is further operable to move the wireless signal away from consumer's head to reduce exposure to cellular radio signals, which may cause health issues. {PRIVATE "TYPE=PICT;ALT=data card signal improvement"} The chip is a solution which depends on cell phone antenna configuration operable on CDMA, TDMB, Digital/Analog/GSM, and location area network. The rationale behind the present embodiments therefore is to provide a comprehensive solution to some of the shortcomings inherent in the existing prior arts. Further disclosure of the preferred embodiments provides a technology that is developed to advance cell phone and Internet usage in vehicles. Certain embodiments of the disclosure further comprise hands free communications while driving.

In some embodiments of the disclosure, first a problem is being identified and analyzed. In other embodiments, the problem is being solved, and/or coded to address each problem variation. These codes could be text, signals, and symbols used to transmit messages around our work places, communities, businesses, and traffic. Certain embodiments of the disclosure include electrical impulses, sound waves, and light signals comprising at least a method of coding transportation and environmental information messages. Embodiments provide a computer, telephone and radio device operatively configured to rely on these impulses to receive and transmit signals. These impulses could be changed into sounds and signals being used to transfer, emit, communicate, and absorb the coded information to and from different distant destinations. The source or sender information is first encoded and translated into the source message. The receiver information is then decoded for the information circuitry to be completed. Certain embodiments of the disclosure provide apparatus for environmental and transportation safeties. Available statistics reveal that cell phones or mobile phones have been the root cause of many fatal accidents in the United States. Yet, most drivers have no other options than turning to their cell phones to get help, when the need arises.

Studies reveal that when we drive and speak over the cell phone at the same time, especially with one hand grabbing the steering wheel and the other hand holding the cell phone hand set held close to the ear; our ability to concentrate and safely maneuver the steering wheel diminishes especially as the conversation becomes much more animated. This predisposes the driver to an accident because at the later stage his control over the car is greatly impaired due to the phone conversation. In all, cell phones have orchestrated many deaths on our highway. It is also true that in emergency cases, cellular phones have been more than helpful. Is there any thing that can be done in order to improve on the cellular phone communications to eliminate signal radiation that is causing brain tumor? Disclosed embodiments further provide communication apparatus being configured with a chip for signal amplification for advanced communications.

Disclosed embodiments provide a communication apparatus comprising a communication platform consisting of sensors being embedded on silicon substrate. Certain embodiments provide the silicon substrate being fused/etched in a micro fiber material being composed of excellent electrical characteristics. Some embodiments of the disclosure provide the communication platform being operable for signal amplification. Other embodiments of the disclosure provide the communication platform being configured for generating electrical energy. Disclosed embodiments provide the communication platform being configured to protect against cancerous brain tumor and other radiant enabled diseases. The communication apparatus further provide configurations to enable drivers to safely use cell phones for communications while maintaining control over the steering wheel.

Disclosed embodiments provide a communication apparatus operable for better communication clarity, data transmission, downloadable data, and to electronically send mails, eliminating the need to pick up the phone to receive or make a calls or to request data content. Certain embodiments of the disclosure provides at least a logic mode, which is turned on/off, all a driver needs to do is push the accept button to establish communication with the sender. In some embodiments, dialing a number comprises pushing and releasing the send button, which establishes communication with a correspondent. In case of emergency, dialing the tag number of closest vehicle would initiate communications for some help. The disclosed embodiments further provide dialing the tag number plus a family code to initiate communications to a loved one on the highway. The application of the later disclosure may result in immediate emergency response. Disclosed embodiments provide at least a communication apparatus being configured to convert text data into voice auditory communications. Certain embodiments provide at least a communication apparatus being configured for converting voice auditory message into text data. Some embodiments provide a communication apparatus being configured to read text messages sent by emails in voice auditory message. Other embodiments further provide a communication apparatus being configured to write text message from voice auditory messages and/or commands.

Further disclosure of the embodiments provides directional software being configured for city streets networks or 411 network services. Certain disclosure of the network services include occurrences where one gets lost in a city uses the 411 button to automatically enable communications with the information network for that city. Disclosed embodiments further provide embedded random-access memory (RAM) operatively configured with (CMOS) and communicatively configured with the media comprising microprocessor intelligence to diligently resolve cellular phone problems. Disclosed embodiments further include a self-test chip device embedded in the media device and being operatively connected to a cellular phone control board to constantly monitor the performance of the media, the cell phone, and the bypass mode; and to further insure routine checking of all other communication devices. The bypass mode further allows the full operations of the cell phone when detached from the media device, including all operational features of the disclosed embodiments. The transmitters are designed to transmit to all destinations with the aid of the select mode button being configured to select different options. At least a mode is responsive to incoming signal and being configured to disable all the active functions of the media system temporarily to allow the receiver to receive incoming cell phone codes and other non-media signals. Until all the signals are transmitted, the media will stay disabled. At the end of the cellular/cell phone signal transmission, the media will return to the preset mode automatically and enable the continuous entertainment mode.

Certain embodiments further provide information technologies to assist communication clarity and control of larger industrial and commercial companies. Embodiments further provide features that can surpass the two-way radios. In addition to the two-way radios, the drivers in any vehicle still have to pick up the microphone to talk. This of course will have some degree of interference with their control of the steering wheel. Drivers still have to hold the microphone with the two-way phone which causes interference with the ability to safely control their vehicle. Two-way radios can only go past a certain zone. Sometimes, where there are high-rise buildings, the two-way radios will not transmit signals. Companies are constantly spending money trying to get their businesses going without knowledge of the safety aspect of the advanced technology. Disclosed embodiments provide improved technologies to facilitate means of communications, and to give customers a better service with very limited time lost, while satisfying the company's goals. Embodiments further provide a microprocessor operable to register the tag number of a vehicle as the acceptance number. When that tag number is dialed from home or from another vehicle equipped with disclosed embodiments, the microprocessor will power the device to pick up the radio or microwave signal and communication is established. In accordance, companies would be able to reach any of their drivers or employees at any time, to pass on further assigned duties that need to be performed without distracting the driver's attention. The megatel communication system is a unique system by which cars, trucks, heavy trucks, and planes can curtail communication barriers.

Disclosed embodiments provide apparatus for recognizing incoming and outgoing communication signals. Embodiments provide code responsive communication apparatus for communications with plurality family cars. Certain embodiments provide apparatus to initiate a family line conversation to ensure the safety of family members. Some embodiments provide methods for advancing communications for the super high way and reduce the estimated cost to the society. Every call made using disclosed embodiments would be locally billed. For example, if one is driving from one state to another and decides to make an out-of-state phone call the call will connect local receivers and transmitters within the sender's state and be billed as local call.

Embodiments provide tag number plus ID-code dialing. For instance, a driver driving down town or on a highway in the middle of the night and realizes that there is another car following his would use the communication apparatus to push a 911 button and transmit the danger signal to the nearest police station. It thus establishes communication between the driver and the police station without interfering with the driver's ability to safely maneuver the steering wheel. The car chasing the driver will be unaware of the driver's communication with the police. The driver will discretely give the police a complete description of the car chasing him without noticeable body language. If the driver knows the tag number of the car chasing him, then a 911 button plus the tag number will give the police a clear description of the person or car chasing him. With this advanced technology in place, the crime rate will drop and the cost to the society for, repairing the aftermath will drop. School principals, teachers, and parents will be able to use the school bus numbers, school bus tags, or a combination of both numbers to keep track of their students. They will also be able to use disclosed embodiments to verify if all the children on the bus reached home safely without interference with the driver's control of the bus. Disclosed embodiments provide solutions to reduce communication problems and crimes around cities. Any subscriber will be able to reach any other subscriber from another company and the subscriber's provider will mail all the bills. For instance, when a driver uses disclosed embodiments to dial, for each dialing location, if the number is a local number for that location, and the driver is within that location, disclosed embodiments is operatively configured to select the nearest phone network station. The microprocessors and the fiber optics are operable to enhance communications.

Embodiments provide computerized station detector operable to search the nearest station and transmit all the coding signals to various destinations. The station will dial the number as a local number, provided that the sender and the receiver are within the local zone. If the receiver is out of the local zone were the sender is calling from, the call could become a distance. Disclosed embodiments would search among huge array of existing MVA-DMA stations, picking the dialing tag numbers for any car and dial the car directly. The computerized station detector will prepare all itemized bills through the Internet services with telephone companies and send to the subscribers. The tag card is configured to carry programmed information in communication with the computerized phone station detectors. The tag card, the communication apparatus, and the computerized station detector are made up of various kinds of transmission media sensors configured for interactions between devices. These systems would pick the stations and assign the stations to carry voice and data signals from place to place, and switching the systems that connect the circuits that link together two parties.

Disclosed embodiments further provide interactive signal detection and switching medium with voice enabled applications. Disclosed embodiments provide a communication apparatus being operable to reduce cost and increase safety. The microprocessor is designed and programmed to identify numbers and to speak to other microprocessors. These microprocessors serve as the main information exchange center by absorbing and emitting radiant energies through waves and can demodulate the absorbed energy or modulate the emitted energy. The energy signals are modulated or demodulated from the coded information. The communication apparatus further provides microprocessors being operable to allow other networks and businesses to advertise by programming plurality of microprocessors, said processors being interactive, to emit the advertisement codes.

Disclosed embodiments provide means for converting sounds, vibrations, pressure force, and external data into electrical energy. Certain embodiments further provide means for modulating the radiant energy emitted by radiant energy sources, according to the output codes assigned to each of the microprocessors. Other embodiments provide the codes being demodulated to demodulate the absorbed radiant energy. Some embodiments provide the microprocessor being configured to absorb the radiant energy signals when calls are transmitted and also exchange coded information; enabling the powered antenna motor to serve as a wave-guide power supply that receives and transmits signals. Disclosed embodiments provide an antenna apparatus being operable with signal amplification chip in communication with a logic circuit. Certain embodiments provide microprocessors being programmed for communications with ambulances, fire trucks, police, other emergency vehicles, construction areas and equipment.

Embodiments comprise of fiber optics/silicon micro fiber to transmit and receive wave signals from radio waves and microwaves, and to determine the amount of light traveling down the fiber. Embodiments use fiber optics to measure the amount of light coupling from one fiber to another in optical radiation. The fiber optic receivers are high-performance and linear fiber optic module that are configured to extend the range of radioactive frequency (RF) signals in hard-to-reach areas such as tall buildings, underground railroads, submarines, and tunnels. Some embodiments provide a fiber optic modem chip operable at full or half duplex over fiber optic cables or waves to allow faster communication signal transmissions. Disclosed embodiments provide apparatus to promote safety while simplifying its usage. Certain embodiments provide a hold in slot i for the cellular phone. The cellular phone has a coded metal base end that, when inserted into the hold in slot will recharge the phone and also permit cellular communication through the media microphone and the media speakers of at least a vehicle. When the vehicle is packed, the cellular phone is pulled out of the slot and used like a regular cellular or wireless communication device for non-driving purposes. In other words, the MEGATEL device is used as a hands-off communication device for drivers like a regular cellular phone if taken out of the slot. The microphone is used to talk party-to-party without actually holding it. This will allow the driver to have total control of the steering wheel with both hands while talking on the phone.

In other embodiments of the disclosure, the microphone could be mounted on the ceiling of a vehicle for a headset, or embedded in the sun visor, the steering wheel, or the dashboard. The headset or speakers are powered by the built-in amplifier and is connected through modular connectors. The main media volume control also controls the phone volume. Disclosed embodiments further provide apparatus for taking messages for later transmission and include Internet ready transmission. Some embodiments of the disclosure further provide at least a screen covered with electronic control protective shield that is opened when the Internet or communication service is enabled. The Internet service is disabled when the vehicle's speed exceeds the preset limit, thereby allowing the Internet service to depend on the speed of the vehicle, to further prevent future accident caused by the driver's lack of focus.

Certain embodiments provide a communication apparatus operable on different frequencies including giga range frequencies for better communication clarity. The signals are separated into more frequencies to make conversation interference very impossible. The headset is attached to the cellular phone to be powered by the amplifier configured to directly receive(s) all incoming calls. The communication apparatus could also be inserted into the slot of the media device to receive all transmissions and codes through the metal base being provided to power all signals through the microphone and the antenna. Disclosed embodiments provide microprocessors designed to continually monitor all communication devices and automatically transmitting and receiving different coding signals to and from different destinations. The megatel is a media-phone with Internet ready access mode, powered by the media amplifier and further include screen viewed from the sun-visor that has a protective cover shield to further prolong the life of the screen. Other embodiments provide communication devices operatively configured with microprocessor chips operable to transmit and receive different signals through radio waves and microwaves frequencies.

Disclosed embodiments further provide communications and entertainment station configured for processing instructions. Certain embodiments provide a communication-processing module comprising a microprocessor configured for signal communications and information handling. Some embodiments provide a microphone, including a cordless headset mounted in the vehicle for privacy usage if there is a third party in the vehicle. The cordless microphone is configured to improve on noise cancellation and to transmit communication signals with better clarity. Handling a cellular phone with one hand and driving at the same time can create hard flexion on the shoulder, headache, and neck pain, which can influence accidents. On the contrary, driving and talking through the headset is very relaxing and will help reduce the many accidents that normally occur. It is the object of the disclosed embodiments to provide communication apparatus that is configured with a chip for amplifying signal communications.

Certain embodiments provide a built in amplifier that amplifies the microphone. The cordless microphone is adjustable to accommodate different drivers. Some embodiments further provide a mode button that has many features including deactivating incoming calls if the driver does not want to be bordered. Disclosed embodiments provide the mode button which could be switched from phone mode to media mode to listen to music through the headset. Certain embodiments further provide an interface unit being operable through a circuit board operatively configured with control functions in communications with the memories to control functions of the microprocessor through the network software. Some disclosed embodiments provide a fiber optic modem chip operable through a manual or an automatic switching circuit or through corresponding pin interface operable to activate the fiber optic modem. Switching may be achieved through transmitting time of the following sources; internal oscillation, external clock from the communication apparatus, loop-back clock derived from the receive signal.

Disclosed embodiments further provide a transmission modem that is synchronous. This means, the transmission time is selected for internal, external, or loop-back clock. Transmission signals are converted internally to synchronize the format in compliance with other standards. All other formats are switch selected. Disclosed embodiments further provide a modem chip, which could be a card operable for transmitting and receiving signals to and from automobiles and other transportation equipment or industries. With this device or with the incorporation of a pressure sensor on the seat surfaces of airplane seats, electronically knowing how many passengers are seated and also communicating to individual passengers in the plane will be much easier. Certain embodiments provide a linear fiber optic transmission links operatively configured for satellite earth stations to communicate signals at the same frequencies as the links. With this linear fiber optics, distance limitations between antennas for the communication apparatus or other broadcasting media operation centers will virtually be eliminated. The linear fiber optic earth satellite station and the delivering signals are communicable without any automatic gain control.

Disclosed embodiments provide apparatus that allow communication between many personal computer systems, space communications, communication between movie producers and actors, without physically holding the phone system to talk. Certain embodiments further provide apparatus operable on a push a button and release to talk while driving or while performing other duties in the work area. Communication between actors and producers will be easily transmitted, received and controlled by a single device with the disclosed embodiments. Just push the receive button to receive incoming calls and talk while driving. All signals are digital and analogs via radio and microwave frequency communication signals through the fiber optic cables.

Certain embodiments provide apparatus operable to communicate to any driver while both cars are in motion. Some disclosed embodiments provide apparatus operatively configured to improve daily live communications and entertainments. The process of exchanging information from vehicles to vehicles, or from homes, offices, businesses to vehicles is called communication and human senses depend on more advanced technologies to make this simpler.

Disclosed embodiments further provide a media device being configured with interactive screen input/output and/or for communications. The key to solving problems includes the technical processes of exchanging information. This information is in the form of communicating, and communication technology is the process of transmitting information from a source to a destination, using codes and storage signals. Machine to machine, machine to human, and human to machine communication are the most common forms of communication being embodied in the disclosure, including hands free communications. The human to machine communication will allow the driver to transmit information to the other vehicle with an extended capability. The machine to human communication system will allow the driver of any of the other vehicle know that some one is trying to reach to the driver or the occupants. Certain embodiments further provide apparatus being operable for communication interface.

Disclosed embodiments further provide an improved automotive communication system that reduces accidental injuries caused by lack of concentration on the steering wheel. Certain embodiments provide a microchip or microprocessor operable to turn receivers on and off when a call is made. Some embodiments of the disclosure provide a communication system that receives and transmits signals from one vehicle to the other. The microprocessor is further operable to increase transmittal speed responsive to 911 codes when a collision is detected. Disclosed embodiments further provide a communication apparatus functionally programmed for communications without interfering with the steering wheel control. Certain embodiments provide automatic switchboards, radio waves and microwave transmitters, satellite, and optic fibers operable for transmitting/receiving phone signals around traffic and the world. Other embodiments provide communication apparatus operable for transmitting Information from a source to a destination through codes and signals. The transfer of information includes designing, coding, transmitting, receiving, and storing of data in a system.

Disclosed embodiments further provide apparatus that implement actions to increase traffic communication and reduce traffic accidents caused by automotive phone system. Some embodiments provide a messaging system that informs, persuades, instructs and entertains drivers and other businesses around the world. The information system is operable with a receiver to inform and provide the transmitted message. The general message that instructs all drivers also provide directions or knowledge about the future or upcoming events and road situations through coded instruction in the highway boards and other road construction areas. The message that persuades will convince drivers to take caution on different situations and events around the cities and the highways.

Disclosed embodiments further provide advertisement messages communicable to alert the public and drivers alike of some sales and other upcoming events without distracting their attention. Certain embodiments provide billboards along major highways being equipped with programmed microprocessors communicatively configured to ensure smooth transmission of vital information including ad messages to on-coming cars approaching the billboard. Disclosed embodiments further provide communication apparatus that communicate with all highway signs and advertisement boards. Certain embodiments provide compatible chip communicatively configured with programmed processors. Other embodiments provide the microprocessors operable to communicate with other processors wirelessly. Disclosed embodiments further entertain by providing some form of amusement to users and drivers while driving. Certain embodiments provide a communication apparatus in wireless communication with car media devices, further responsive to phone and Internet device applications. When there is a message, a phone call, or e-mail, the media system will be bypassed and the phone system will automatically be activated. The media amplifier, through the media speakers, is configured to amplify the receiving and transmitting messages. Certain embodiments provide a microphone located on the steering wheel, sun-visor edges, ceiling, or dashboard operable to absorb and transmit the messages.

Disclosed embodiments provide a sun-visor being operable with electronic screen for receiving electronic and Internet messages. The sun-visor has automatic foldable cover for the screen. Certain embodiments provide the screen operable to output electronic messaging and Internet communications. Some embodiments provide a communication device being configured for radio programs, cellular transmissions, and TV broadcasting to assigned locations. Receiving and transmitting communications is the process of acquiring and decoding messages. Disclosed embodiments provide a receiver being operable to decode or interpret messages from any of the sources.

Certain embodiments provide cellular and/or media receivers operable to convert the radio waves into pleasant sounds that one can hear and understand. Successful communication is often the result of feedback provided to the sender. This feedback is usually returned information to the sender to confirm that the message was received. The feedback is a communication process that responds to the completed communication signal and coded signs. Another point of concern that is affecting current hand-held cell phones is the interference. Interference is the distortion of signals intended to the receiver. This interference is caused by the reception of undesired signals. The interference can be the called noise or distractions that interfere with the communication process. Disclosed embodiments further provide amplified signal communication device. Certain embodiments provide communication apparatus that generates electrical energy Embodiments further provide the media device operable with a rechargeable means.

Disclosed embodiments further provide a chip operable on a circuit being configured with the antenna for signal transmission accuracy and destination free. The key to this advanced communication device is to allow friendly and safe conversation around the highway and inner city by increasing the level of communication signal clarity. The communicated information is being exchanged among people, machines, police, governments, businesses, schools, and industrial groups without interfering with environmental safety. In part, telecommunication is the transmitting of information or signals between distant points where the information would be received, understood, and used. The most common example is the telephone. The use of satellite to transmit radio signals around the globe is an excellent example of telecommunication system being utilized with the disclosed embodiments. Certain embodiments provide a communication apparatus being operable with a telecommunication satellite.

Embodiments provide communication apparatus being configured for communications, information, and electronic mailing. For example, a police chasing a car in the highway would be able to transmit certain verbal information through coding to all vehicles on the chasing lane. The chasing lane and the direction of the chase are instantly communicated to all the vehicles heading the direction in view of forestalling the occurrence of potential accidents. Embodiment is operable with human-to-human, human to machine, machine to human and machine-to-machine communication signals. Disclosed embodiments further provide quick means to exchange information over long and short distances at low cost.

Disclosed embodiments further transmit and receive information in electronic form. Major construction companies will be able to provide the following messages to approaching traffic miles away: "Road construction ahead, Road block, Traffic jam, Major accidents, Advertisement." A constant flow of more messages could be followed. Disclosed embodiments provide a communication apparatus being further operable for communications with large groups of people or individuals, as well as advertisement, traffic instructions, entertainment, persuasion and information. When calls are made, the calls will be sent through series of transistorized switches until the calls are connected with the other telephones at the addressed identified. Certain embodiments provide a communication apparatus that enhances the convenience of communicating quickly and easily, over any distance, without interfering with the driver's ability to safely maneuver the steering wheel. Some embodiments of the disclosure provide an interactive device for communications and safe driving. Other embodiments of the disclosure provide a wireless communication apparatus communicatively configured for networking and Internet communications. The designing process for disclosed embodiments is uncompelled and unlimited. When a message is sent, a feedback is returned to inform the sender about the status of the message. Disclosed embodiments further provide an automotive communication system that entails more options like; informing, instructing, persuading, entertaining, and advertising Disclosed embodiments provide communication apparatus operable for reduction of the pressure effect to improve the transmission and receiving of the transmitted information. The antenna is made up of cell foams and would allow the media device and the cell phone to operate on the same mast mounted antenna. The antenna is operable to receive and transmit coded information. The antenna is communicatively configured with the chip for eliminating acoustic interference signal radiation problems that exist in the wave traffic. The quality features of the antenna include stainless steel ferrule, high-gloss urethane finish over fiberglass, powerful brass internal elements, ferrite choke bead, and UV stable RG-8x marine cable with a factory-installed mini-connector. Embodiments provide antenna apparatus operable to reduce the whistling effects and also to damp the occurring wave due to vibration. Certain embodiments provide antenna apparatus communicatively connected to a chip in communication with a logic circuit. Other embodiments of the disclosure provide an antenna motor which is turned on when the ignition switch of a vehicle is turned on. When the ignition switch is turned on, the circuit for the antenna motor will be closed and the antenna motor will rotate on one direction, enabling the antenna to be raised up.

Disclosed embodiments provide antenna apparatus with a stronger link operable with wireless communication devices and/or with vehicle media device to oversee any weak signal and to improve communication clarity. The antenna could be embedded or be vertically mounted at ranges from 4" to 24" with ultimate signal pulling power. All internal elements are sealed with fiberglass rod coated with high-gloss urethane finish. The high-gloss urethane coating is to ensure lasting performance and more compatibility with the other high quality antenna products that could be used. Certain embodiments of the disclosure provide an antenna apparatus operatively connected to a chip operable at other frequencies. Disclosed embodiments provide improvement to acoustic reduction, better communication performance, and is operatively configured for transmitting, receiving, switching and transmitting, receiving and switching, receiving by combining ground to air to transmit and receive signals, and is not cancerous.

SUMMARY OF THE INVENTION

Embodiments provide a communication apparatus operatively configured to prevent cancerous diseases and to convert sound waves, vibrations, solar energy, and pressure force into electrical energy communicable to tend battery cell. Disclosed embodiments provide improved communication apparatus comprising media device, computer device, cell phone device, and hands-free cell phone and Internet usage while driving. Further disclosures provide embedded chip in communication with antenna apparatus for signal amplification. Disclosed embodiments provide a communication apparatus that is operatively configured to extend battery life. Disclosed embodiment encompasses three modes of communications—the Cell phone, wireless Internet System, and Global communication and information. Disclosed embodiments provide communication apparatus operable to improve quality of life and enhance mobile communication efficiency. Some embodiments provide advanced vehicular computing and media applications for in-vehicle interactive communications and wireless Internet applications. The amplification of signals would improve cellular data card "IC card and SIM card" reception, providing faster data transfer speeds. The chip is further operable to prevent wireless signal radiation, reducing exposure to cellular radio signals, which may cause health issues. {PRIVATE "TYPE=PICT;ALT=data card signal improvement"} The chip is a solution which depends on cell phone antenna configuration operable on CDMA, TDMB, Digital/Analog/GSM, and location area network. Disclosed embodiments further provide a method of the waves being used to guide the direction of information or codes. Disclosed embodiments provide chip being operable with an antenna apparatus in communication with the signals traveling through waves.

Disclosed embodiments provide communication apparatus that transmits and receives signals through radio waves and microwaves. Some of the advantages of the microwaves are that signals can be projected into a very small area through amplification. Which means the energy is being used efficiently. Disclosed embodiments further provide embedded antennas in circuit communication with a chip being configured to boost signals. Some of the disadvantages of the microwave signal are the effect of poor weather on microwaves. That is, since the wavelengths are so small, rain, snow, hail, or even a high wind may absorb the energy in the signals. However, the amplified spring-like behavior on the powered antenna compensates for the wind and other foreign factors. The communication apparatus further comprises a cellular phone, and uses radio waves to transmit information. Certain embodiments provide a device that uses both one way and two-way radio messaging methods to transmit information. Certain embodiments provide feedback method responsive to messages.

Some embodiments provide electronic pulse (number dialing) switching method for communication, including the network and the Internet communications. Certain embodiments provide a preferred electronic switching system (ESS), including computer programs being used for routine wireless operations and switching operable through transistorized switches and microprocessors. All the switching programs are stored in the microprocessor and the processor is operatively configured to differentiate a telephone signal from a media or radio signal and bypass the radio, so that the receiver could receive and transmit messages for wireless communications.

The quickest switching route is mapped out through the use of transistorized switches and microprocessors to complete calls. Disclosed embodiments further provide a method of using the transistorized switches and the microprocessors to collect coded electronic pulses. The computer is operatively configured to-review all the numbers and maps out the switching route to complete the calls. The switching system is further operable to make communications more efficient than electromechanical switching system. Embodiments provide a switching system that is quicker, less costly, smaller, and more reliable and uses less power.

Disclosed embodiments provide the computer device being operable with a software program to identify codes, complete all calls, and control the overall function of the communication apparatus. Disclosed embodiments are operable via a network, which is a system of interconnected subsystems. Certain disclosed embodiments provide a communication apparatus which permit networking and wireless Internet connections being operable through transmission links, terminals switching operations that work together for the Internet services. Disclosed embodiments further provide apparatus that necessitates calls completion and also sends worldwide information via vehicular media transmission through the Internet. The transmission links transmit calls and the network switching system is configured to complete the circuits. Disclosed embodiments provide a communication apparatus with embedded signal amplification chip in communication with an antenna apparatus. Other embodiments of the communication apparatus comprise a modem device being configured to enable Internet services and other searches.

The modem device is operable to communicate with other devices over the microwave to radio wave links through wireless communications, providing better wireless Internet services and satellite communications. Microwaves are able to cut through the earth's atmosphere easily. The microwave beams must be carefully aimed towards the proper ground station or satellite. The signals are sent and received using special antennas. However, the ground antenna and the satellite must be able to stay in constant communication contact in order to transmit these signals.

Vast amount of information can be transmitted through microwaves links. This is because microwaves are extremely short. Therefore, microwaves can be concentrated (focused) into a very small, narrow beam. These beams will allow powerful, efficient transmissions around the globe. Disclosed embodiments provide binary operations, which are series of 0s and 1s that represent phone numbers, tag numbers, letters, sound, or visual images. The codes, which are the vehicle for transmitting messages, are the language that the computers will use to communicate with one another. The American Standard Code (ASC11) may be used for information exchange. This code includes all the letters of the English alphabet, the number 0 through 9, and punctuation. Disclosed embodiments provide communication apparatus that provide easy communication method. The transmission methods could be parallel transmissions for short distances or serial transmissions for long distances. Disclosed embodiments provide hands-free communications while driving. Other embodiments provide wireless Internet communications. Disclosed embodiments provide IC card being used to store data specific to the communication apparatus. The advantage of disclosed embodiment would become apparent to the understanding of wireless communications, signal radiation, energy production, and safe driving.

BRIEF DESCRIPTION OF THE DRAWINGS

FIG. 1 is a perspective view of a portable communication apparatus with GSM and CPU in accordance with disclosed embodiment;

FIG. 2 is a perspective view of a portable device in a first configuration of a mobile phone with a WAP browser in accordance with one embodiment of the present invention;

FIG. 3 is an exemplary embodiment of a mobile phone with integrated GPS and MP3 music capability;

FIG. 4 is an exemplary embodiment of a slide-able mobile phone with predictive text massaging platform and QWERTY keyboard;

FIG. 5 is an exemplary embodiment of a slide-able mobile phone with Bluetooth technology, infrared sensors, calendar, and FM radio;

FIG. 6 is an exemplary embodiment of a clamshell mobile phone with GPRS Internet services, comprises QWERTY keyboard and virtual keyboard on a touch screen configured with social network platform;

FIG. 7 is an exemplary embodiment of a mobile phone with LCD display screen, video recognition, phonebook, and dictionary;

FIG. 12 is an exemplary embodiment of a mobile phone with numeric keypads operable to provide voice over texting applications; a slide out keyboard; and a resistive touch screen character recognition;

DETAILED DESCRIPTION OF THE PREFERRED EMBODIMENT

Figure 8:
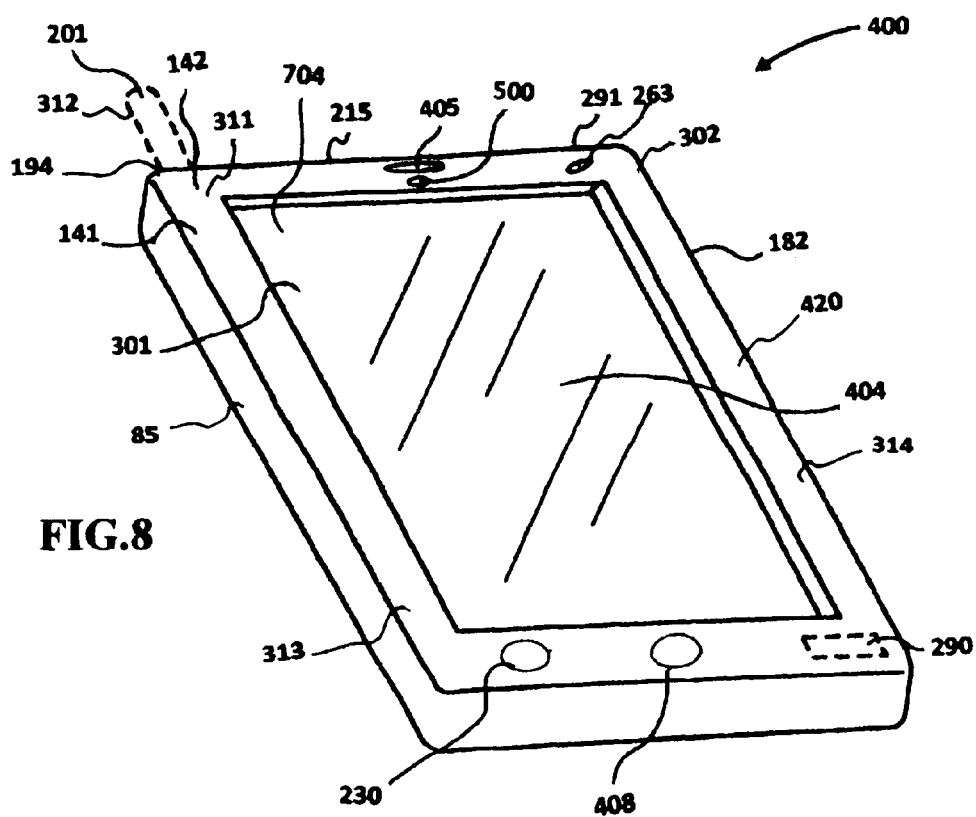
FIG. 8 is an exemplary embodiment of a mobile phone comprising a gaming apparatus configured with an interface device.

The terminology used herein is for the purpose of describing particular embodiments only and is not intended to be limiting of embodiments. As used herein, the singular forms "a", "an", "at least", "each", "one of", and "the" are intended to include the plural forms as well, unless the context clearly indicates otherwise.

It would be further understood that the terms "include", "includes" and/or "including", where used in this specification, specify the presence of stated features, integers, steps, operations, elements, and/or components, but do not preclude the presence or addition of one or more other features, integers, steps, operations, elements, components, and/or groups thereof. In describing example embodiments as illustrated in the drawings, specific terminology is employed for the sake of clarity. However, the disclosure of this patent specification is not intended to be limited to the specific terminology so selected and it is to be understood that each specific element includes all technical equivalents that operate and/or function in a similar manner. It would be further noted that some embodiments of the enclosed communication apparatus is used concomitantly and/or not used concomitantly with megatel. In some embodiments, the communication apparatus comprises a platform array responsive to media communications. In some embodiments, the communication apparatus further comprises of a platform array responsive to signal radiation. Other embodiments herein describe apparatus configured for entertainment.

The foregoing and/or other objects and advantages would appear from the description to follow. Reference is made to the accompanying drawing, which forms a part hereof, and in which is shown by way of illustration specific embodiments in which the embodiments may be practiced. These embodiments being described in sufficient detail to enable those skilled in the art to practice the teachings, and it is to be understood that other embodiments may be utilized and that further structural changes may be made without departing from the scope of the teachings. The detailed description is not to be taken in a limiting capacity, and the scope of the present embodiments is best defined by the appended claims. Referencing the drawings, wherein reference numerals designate identical or corresponding parts throughout the several views, exemplary embodiments of the present patent application are hereafter described. The numbers refer to elements of some embodiments of the disclosure throughout. As used herein, the terms "and/or" and "at least one of" include any and all combinations of one or more of the associated listed items.

Referring to FIG. 1 is seen exemplary embodiment of a communication apparatus 400 with GSM, touch screen, and CPU in accordance with one embodiment of the invention. The communication apparatus 400 comprises a housing 402 comprising of a sensory platform 700 consisting of nanotechnology application. The sensory platform further includes strain gauges 701 embedded in load cells 702. Disclosed embodiment further provide nano technology applications comprising nano sensors 704 being embedded in silicon substrate 712 and fused/etched in microfiber material 710, providing a silicon microfiber 724. The sensory platform 700 being operable to provide a detection platform 706 being further operable for communications and/or for converting at least a form of energy into electrical energy. The detection platform 706 further comprises at least a transformer module operable with at least a battery module. The transformer module further comprises electronic interface circuit operable to match the power need for the communication apparatus. The communication apparatus 400 further comprises a hand-held device operable for providing communication services. Certain embodiments provide the communication services comprising voice communications. Some embodiments provide communication services comprising cellular phone functionalities, including symbol processing. At least the functionality may include an antenna apparatus being configured with a chip in communication with a radio module. The communication apparatus 400 is further disposed with hardware enclosing at least a control logic in communication with a software operable for providing the communication services and for performing symbol processing. In the embodiments further include radio functionalities operable for providing communication services. Certain embodiments provide the communication apparatus 400 comprising a computer device operable for providing the communication services. At least one communication service comprises Internet services. At least one switch device comprises application button being operable for controlling functions of the communication apparatus 400 and directions of the symbols. At least one symbol is associated with the display/input device 424, and further comprises a scroll-up and/or scroll-down button.

Disclosed embodiments further provide the sensory platform 700 further comprising a display/input device 404 being disposed with the housing 402. Certain embodiments provide the housing 402 further consisting of speakers 405, microphones 408 embedded antenna apparatus 201 in communication with at least a signal booster comprising a chip 403, in communication with a logic circuit 407. The communication apparatus 400 further comprises the detection platform 706 comprising sensors 708 being operable for detecting objects proximity to at least the display/input 404. The communication apparatus 400 may comprise at least one of: cellular telephone, telephonic, media device, PDA device, cellular telephone, GPS device, entertainment device and/or an information device being operable for road and traffic communications, including road side advertisement. The media device further consists of input and output devices. Disclosed embodiments provide the communication apparatus 400 configured in the housing comprising of a cellular telephone, a game device, and a media player and a PDA. The communication apparatus 400 is portable and may fit within the hand of normal adult and grown children. In one embodiment, the display/input device 404 may include at least one of multipoint interactive touch input screen, an LCD display. In one embodiment, the multi-point interactive touch screen is a capacitive sensing medium configured to detect multiple touches, including blobs on the display from a user's face or multiple fingers touching or nearly touching the display.

The load cell 702 further comprises silicon load cell comprising of force sensor in communication with software 204. Disclosed embodiments provide force measurement apparatus being operable to perform measurement and to generate energy by compressing a meander-like strain gage 701. Certain embodiments provide a second strain gage, which is not loaded, operatively configured for temperature compensation and for compensation of bending and stretching stresses in the chip comprising energy platform 705, eliminating a zero-load resistor values on the communication apparatus 400. Some embodiments provide the communication apparatus 400 being configured with a bridge 703, whereby the output of the bridge 703 is at least a linear function of the total force and independent of the force distribution on the silicon chip comprising the energy platform 705. Disclosed embodiments further provide a communication apparatus 400 comprising load cell to MEMS system integration being operable with integrated systems' interface. The physical scales as well as the magnitude of signals of various integrated subsystems vary widely. The communication apparatus 400 provide a MEMS load cell system integration being further configured for high capacity load sensing, including a micro-machined sensing gauge, interface electronics and energy module for communication signal characterization. Disclosed embodiments further provide a communication apparatus 400 comprising silicon substrate-microfiber hybrid technologies. The subsystem further provides piezoelectric sensor comprising of piezo-resistive sensing being operable on CMOS processes. Embodiments provide the silicon substrate-microfiber further comprising a metal semiconductor being configured with the CMOS processes to provide nano-scale antenna apparatus 201 that could effectively couple light into a semiconductor light emitter. The configuration of the subsystem includes a sensing layer being configured to reduce the offset, temperature drift, and residual stress effects of the piezo-resistive sensor. The load cell 702 comprises of built-in electronics for signal conditioning, processing, and communication.

Referring to FIG. 2 is seen exemplary embodiment of a communication apparatus 400 in a first configuration of a mobile phone with a WAP browser in accordance with one embodiment of the present invention. The communication apparatus 400 further comprises a detection platform 706 being further operable for providing multiple communications environment. Disclosed embodiments further provide a communication apparatus 400 comprising single and/or multiple communication environments 400A. Certain embodiments provide at least a communication environment 400A including at least one of: position finder, Radio Frequency Identification Devices (RFID), emergency communication device, medical diagnostics, General Packet Radio Service (GPRS), transportation information highway (TIHW), at least a Modulation Format Selectable cellular device (MF-SCD), mobile wireless apparatus, satellite device, land based device, Global Mobile communication device, Enhanced Digital GSM (EDGSM), and/or Code Division Multiple Access (CDMA).

Disclosed embodiments provide a communication apparatus 400 being further configured for multiple communications. The communication apparatus 400 further comprises at least one of: broadcast device, tracking device, location finder, position finder, processor in communication with at least one of: transmitter, receiver, transceiver, entertainment device, remote control device, educational device, gaming device, medical device, signal detection device, video and/or visual image signal detector, infrared device, Global Positioning System (GPS) receiver and/or an interface to a GPS receiver, temperature detection device, electrical signal detection device, Radio Frequency Identification Device (RFID.

Some embodiments provide a communication environment 400A further comprises at least one of: Wideband Code Division Multiple Access (WCDMA), Time Division Multiple Access (TDMA), Infrared (IR), Wireless Fidelity (Wi-Fi), Orthogonal Frequency Division Multiplex (OFDM), and/or Bluetooth application. Disclosed embodiments provide a communication apparatus 400 further comprising a communication environment including at least one of: an interface device 402, a processor 420, a transmitter 311, a receiver 312, and/or a transceiver 313. Disclosed embodiments further provide the interface device 402 comprising content composed of user interface component objects operable for receiving contents. Certain embodiments provide the interface device 402 comprising user interface component objects operable for extracting exportable information. At least one of the exportable information is being exportable outside the content. Disclosed embodiments further provide the interface device configured for detecting at least one of action and providing a signal for transferring the exportable information to at least a target object.

Referring to FIG. 3 is an illustration of an exemplary embodiment of the communication apparatus 400 comprising a mobile phone with integrated GPS and MP3 music capability configured with sensors 704, 708 embedded in silicon substrate microfiber 724 for providing detection platform 706 with sensitivity and selectivity in accordance with the present invention. FIG. 3 further depicts the nanotechnology application on a detection platform 706 comprising image and/or sound sensor 170 operatively configured with RFID chip 200. The detection platform further comprises nano sensors being embedded in a silicon substrate 712, and etched/fused in a microfiber material 710. Disclosed embodiments provide a communication apparatus configured with nano sensors, including image and/or sound sensor 170, load cell 702, RFID chip 200, strain gauge 701, and temperature sensor 200A. Some embodiments provide the detection platform 706 comprising nano sensors, including at least one of: load cells 702, strain gauge 701, membrane 195, resilient membrane 206, optical sensors 50, MEMS 192, detection means 190, and/or transducer 185. The detection platform 706 further comprises ferrous and/or non ferrous material 221, 222 being alloyed with the silicon substrate 712 and etched/fused in microfiber material 710. The communication apparatus 400 further comprises a housing 402, a display/input device 404, a speaker 405 device, a logic circuit 407, and a microphone 408. The substrate may further comprise optical elements suitable for electronic wafer module. The wafer module may comprise light shield film and/or UV curing resin configured with transparent support substrate. The optical sensor 50 is further configured for optical video modulation. Disclosed embodiments provide the display device 404 comprising a display screen operable for displaying information. Certain embodiments provide the display device 404 comprising an input/output unit operable for receiving input of information and for sending output information. Other embodiments provide the display device 404 configured with a storage medium operable for storing data therein a plurality of executable and/or relation information, including object information operable for indicating an object is correlated with relationship information having a relationship with other objects. Yet, certain embodiments provide the display device operable for selecting object information and for apparatus for providing relationship information with an object. Disclosed embodiments provide the object further comprises a user of an electronic device. Certain embodiments provide the object further comprising switches and buttons embedded in a touch screen device. At least said one touch screen device comprises a control unit for causing the display device to display the selected information stored in the storage medium. Some embodiments provide the selected information being displayed in a display position of the touch screen. The display position further comprises a predetermined distance being displayed within the embodiment of a display device. At least one predetermined distance further comprises information normally displayed by a global positioning system (GPS) from selected information within a directory of a predetermined direction.

The transparent support substrate may comprise at least a glass plate. The wafer module further comprises energy management apparatus. Photon in sunlight passed through the silicon microfiber semiconducting materials, or reflects through the silicon microfiber semiconducting material, or absorbed by silicon microfiber semiconducting materials. Electron (negatively charged) is knocked loose from their atoms, allowing them to flow through the silicon microfiber material to produce electricity on a solar cell "Energy Platform." Due to the special composition of solar cells, the electrons are only allowed to move in a single direction. The solar cells are configured to convert solar energy into a usable amount of electrical energy. The solar cells are further configured with light absorbing material within the cell structure to absorb photons and generate electrons via the photovoltaic effect. Tin film is further provided to reduce the amount of light absorbing material required for the solar cell. The absorbing material may include cadmium telluride. Embodiments further provide high-rate deposition of materials including at least one of: thin film, polymer, carbon, silicon, metals, metal oxides, and the like, onto at least a substrate. Disclosed embodiments provide communication apparatus 400 is further configured with silicon substrate microfiber 724. The silicon substrate microfiber 724 further comprises fiber mesh and/or synthetic fiber mesh to inhabit shrinkage cracking and to reduce settlement cracking. Some embodiments provide a communication apparatus 400 being configured with silicon substrate microfiber 724 to improve cohesion and reduce explosive spalling in high temperature or impact. Certain embodiments provide the communication apparatus 400 being configured with the silicon substrate microfiber 724 to reduce water migration and permeability while providing a residual strength. Disclosed embodiments further provide a communication apparatus 400 being configured with silicon substrate microfiber 724 to generate electrical energy, improve communication clarity, resist shattering, resist fatigue, and boost communication signal.

Certain embodiments provide particles of the material being mixed with fluid and injected against at least a metal at high pressure and high velocity. Some embodiments provide the particles of the material forming a current collection surface of the metal. The metal further comprises cathode and/or anode combined with a separator to form at least an energy platform further comprising at least one of: fuel cell, metal-ceramic membranes, film composite metal-ceramic materials being configured with the communication apparatus. The silicon substrate may include carbon nano-tube; single crystalline silicon; and polycrystalline silicon. The silicon substrate may further be disposed with an intrinsic layer comprising at least one of: silicon dioxide; silicon nitride; silicon-on-insulator substrate; silicon-substrate-fiber mesh; carbon fiber mesh substrate; diamond-like carbon fiber mesh; and silicon oxide, and may be formed on a substrate and or a continuous substrate. The silicon substrate is further configured with CMOS processes circuitry. Certain embodiments provide the communication apparatus 400 further comprising a display/input/output device being configured with laminated of a transparent substrate comprising synthetic fiber mesh being plated with metal alloy, providing an adequate shielding against electromagnetic waves from at least a plasma display. The diamond-like carbon mesh is attached to a silicon substrate configured for converting heat energy into electrical energy. The metal alloy comprises material with excellent electromagnetic shielding and having the ability to absorb near infrared rays. The silicon-substrate-fiber mesh further provides an apparatus for transferring data efficiently on and off of an integrated circuit in communication with a network node. Disclosed embodiments further provide a communication apparatus 400 configured with optical switch device. The communication apparatus 400 further comprises energy absorption device.

Referring to FIG. 4 is an illustration of an exemplary embodiment of the communication apparatus 400 comprising a slide-able mobile phone with predictive text massaging platform and QWERTY keyboard. The communication apparatus further comprising sensors embedded in silicon substrate microfiber to provide a sensory environment for the detection platform 706 in accordance with the present invention. The detection platform further comprises electronic wafer module being configured with sensors. The wafer module further comprises solar panel being configured for converting light photons to a photon generated electrical current. At least a heating module and a cooling module are provided with the wafer module. FIG. 4 further depicts the detection platform 706 further comprises a wearable outfit 707 being configured for housing the communication apparatus 400. The wearable outfit 707 further comprises a cell phone case configured for generating electrical energy. The communication apparatus is operable for communications and for generating electrical energy. Disclosed embodiments provide a communication apparatus being transformed into force responsive device operable for communications and for detecting logistics influential to communication signals, data transmissions, communications environment including touch screen display. Disclosed embodiments further provide a communication apparatus being outfitted with the housing 707 configured for converting at least one of: solar energy, vibration, pressure force, and/or wind force into electrical energy. The communication apparatus further comprising sensors on silicon substrate 712. Certain embodiments provide the silicon substrate 712 being sensitized with microfiber material 710, providing a selective and sensitive detection platform 706. The detection platform 706 further comprises antenna apparatus 201 in communication with at least a chip 202 comprising signal booster. The chip 202 further comprises logic configured with software 204 in communication with the communication apparatus 400. The communication apparatus is further configured with sensors, including at least one of: cantilever sensors 210, load cells 702, multifunctional sensors 215, optical sensors 50, temperature sensors 200A, investigative agent 176, RFID chip 200, and/or electro optical sensors 60. Disclosed embodiments further provide the communication apparatus 400 being re-enforced with at least one of: ferrous material 221, and/or non ferrous material 222.

Referring to FIG. 5 is seen further embodiment of the communication apparatus 400 comprising mobile phone with Bluetooth technology, infrared sensors, calendar, FM radio and a sensory platform 704. The sensory platform further comprises cell environment 708 being operable for communications, for display/input, and for generating electrical energy. The sensory platform 704 comprises at least a silicon substrate 712. The silicon substrate 712 comprises of nano-technology applications consisting of at least one of: nano sensors 200, multifunctional sensors 215, micro beam devices 280, sensory array 330, MEMS 420, thin film 430, including piezoelectric thin film AlN, being fused/etched in microfiber material 710 to provide detection platform 706 with efficient detection selectivity and efficient detection sensitivity. Disclosed embodiments further provide the nano-technology application comprising of nano sensors. At least one nano sensor comprises an accelerometer. Certain embodiments provide the sensory environment 704 being configured with sensors, including surface acoustic wave line 570 being coated with paste and/or ink 585 comprising of passive glass film. MEMS 420 and multifunctional sensor 215 are configured with thin film 430, in communication with at least a microelectronic circuit 410 to further convert solar energy into electrical energy. The surface acoustic wave line 570, the paste 585, the MEMS 420, the thin film 430, and the multifunctional sensor array 330 are embedded in the silicon substrate 712 and etched/fused in a micro-fibered material 710 to provide a detection platform 706 further operable for generating electrical energy. The silicon substrate is micro-machined in a chemical and/or electromechanical etch technique.

Referring to FIG. 6 is seen further embodiments of the communication apparatus 400 comprising a clamshell mobile phone with GPRS Internet services, QWERTY keyboard and virtual keyboard on a touch screen configured with social network platform, and a sensory environment 704 consisting of energy platform 705. Other embodiment of the sensory environment provide a silicon to silicon bonding 460 and/or silicon to ceramic wafer bonding 470 being configured for detection and for generating electrical energy. The silicon to ceramic wafer bonding is further responsive to solar energy for generating electrical energy. The silicon to ceramic wafer bonding may include at least silicon to glass bonding 480, forming single crystal silicon to improve the micro-acoustics and micro optics in the nanotechnology applications. Multifunctional sensor 215 are employed, further comprises surface acoustic wave resonators 500 responsive to frequency shift. The frequency shift may be influenced by mechanical, chemical, and electrical perturbation within the boundary of active interface with the sensory environment 704. The electrical perturbations may occur in at least metal films 543. The metal film 543 may have different conductive values deposited on the resonators 500 responsive to loading effects on the display/input device 404. Disclosed embodiments provide the communication apparatus comprising a changeable amplified output/input signal configured for altering any back gate voltage above predetermined sensor value to eliminate any potential radiation induced charges.

The display/input device 404 consists of at least liquid and/or solid media 505. The metal film is further configured for generating electrical energy. Detection selectivity is further influenced by metal clusters 520. The metal clusters 520 are further configured to increase sensor selectivity caused by pressure absorption due to the coupling between sensing surface 409 and other properties 504. These other properties 504 may consist of metal oxide 530 being further configured for converting pressure force into electrical energy. The metal clusters 520 are operatively configured with sensors 180, 200 to increase selectivity. The metal clusters 520 further comprises semiconductor oxide substrate 560 configured with sensor sensitization to enable metal particles 522 to act as centers for surface pressure absorption. The addition of clusters 520 further provide electronic sensitization resulting from the oxide surface 540.

Referring to FIG. 7 is seen further embodiment of the communication apparatus 400 comprising a mobile phone with LCD display screen, video recognition, phonebook, dictionary, and a sensory environment 704. Disclosed embodiments further provide silicon-substrate-metal oxide 530, further comprising antimicrobial metal consisting of at least silver being laminated to at least a liquid absorbing nonwoven material being fused/etched in microfiber material to provide at least a detection environment on the detection platform 706. Certain embodiments provide the silicon-substrate-metal oxide-micro fiber 530 further comprising the nonwoven material consisting of metal coating including metal particles facing at least a liquid absorbing material to retain surface effect. Certain embodiments provide communication apparatus comprising sensors 200 being configured to retain antimicrobial effect. Some embodiments provide silicon-substrate-metal oxide 530 being configured with silicon-substrate-thin film 430, providing a detection platform 706 configured with plurality sensors 200 operable for detecting pre-use and post-use of communication apparatus 400. Certain embodiments provide the nonwoven material comprising at least a polyethylene mesh forming an antimicrobial composites comprising antimicrobial metal coating.

Referring to FIG. 8 is seen further embodiment of the communication apparatus 400 comprising a mobile phone comprising a gaming apparatus configured with an interface device and a sensory platform 704. The antenna 201 is operable to increase signal strength and may comprise internal antenna apparatus being configured with a chip operable on a logic circuit. The chip is operatively configured to boost communication signals through the antenna to improve sound quality and reduce dropped communications. The chip is operable on a logic circuit being communicatively connected to the circuit board for the communication apparatus 400 in communication with the antenna. Disclosed embodiments provide software in communication with the logic circuit being configured for analyzing signal strength and data speed. The amplification of the signals would improve wireless data transmissions, data card "IC card and SIM card" reception, providing faster data transfer speeds. The chip is further operable to move the wireless signal radiation away from the head to reduce exposure to cellular radio signals, which may cause health issues. {PRIVATE "TYPE=PICT;ALT=data card signal improvement"} The chip is a solution which depends on antenna configuration and may be operable on CDMA, TDMB, Digital/Analog/GSM, and location area network. At least a station interface 302 is operatively configured with the microprocessor electronics 85 and 182. At least a transducer 315 is operatively configured with sensor resonator 500 and multifunctional sensor 215 and communicatively connected to detection memory 291. The detection memory 291 is communicatively connected to station interface 302 and operatively configured with CPU 141. The CPU 141 and the CMOS 142 are communicatively connected to the communication apparatus 400 in communication with station interface device 302. The station interface 302 further comprising at least a transmission control 194 in communication with at least antenna apparatus 201. Receiver 312, transmitter 311, encoder 313 and decoder 314 are communicatively connected to interface device 302. The microprocessor electronics 85 and 182 are communicatively connected to MEMS 420, accelerator 230, and detector 290. Station interface 302 is operatively configured with interface device 301 in communication with display/input device 404. Disclosed embodiments further provide communication apparatus 400 being configured with speakers 405, microphones 408, camera 263, and display/input device 404.

Figure 9:
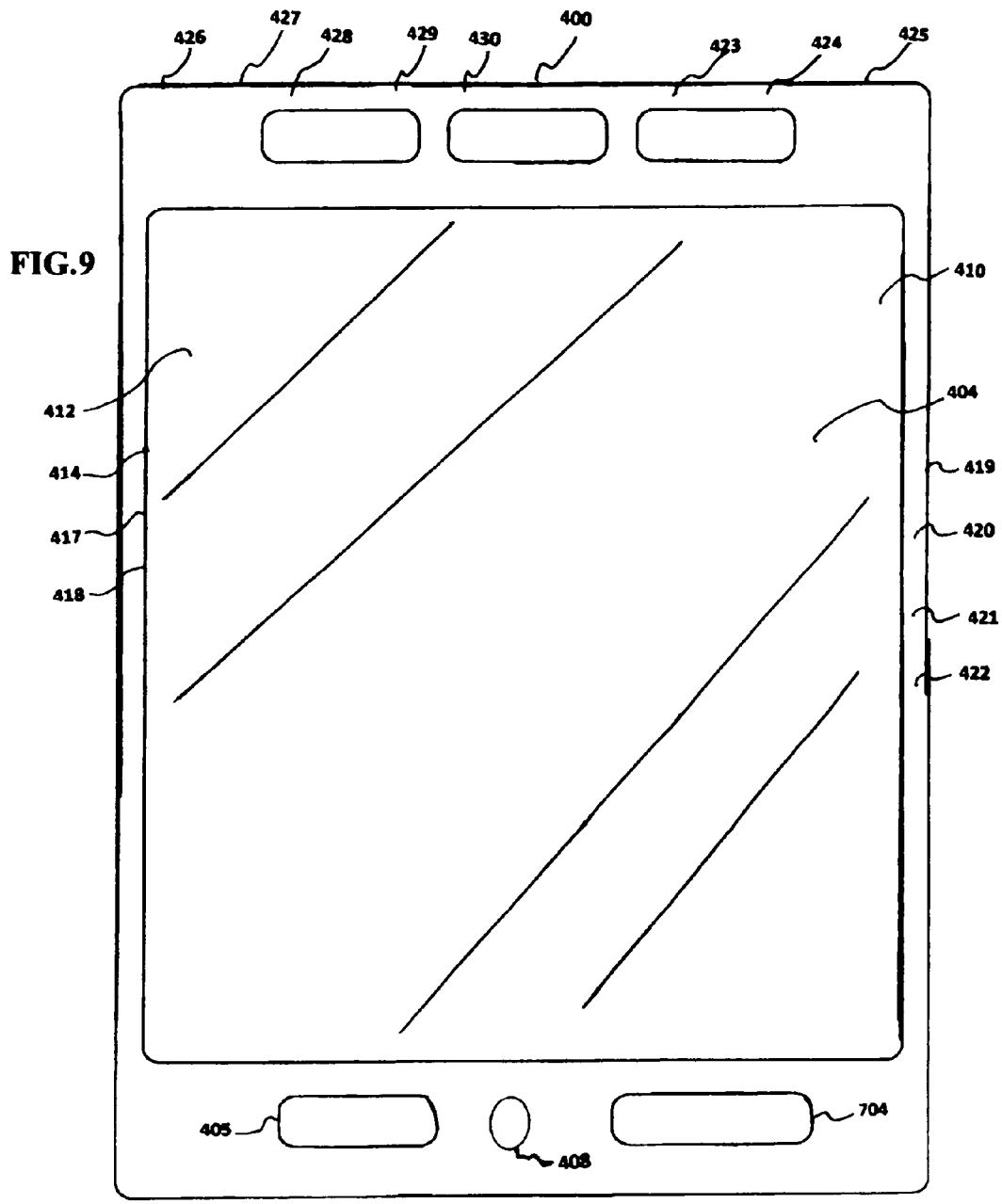
FIG. 9 is an exemplary embodiment of a mobile phone configured with Internet connectivity operable for global roaming.

Referring to FIG. 9 is seen exemplary embodiments of communication apparatus 400 comprising touch screen display/input 404 on a mobile phone configured with Internet connectivity operable for global roaming. Display/input device 404 further provides visual information to the user. Disclosed embodiment provide a display/input device 404 comprising liquid crystal display (LCD) 410, a touch screen display 412 or another type of display operable for providing information to a use. Certain embodiments provide a display/input device 404 being further operable for providing information regarding incoming or outgoing telephone calls and/or incoming or outgoing electronic mail (email), instant messages, short message services, multi-media message services, calendar application, text message application, the current time display, video games applications, downloaded content display, media applications.

The communication apparatus 400 further includes a cellular radiotelephone, personal digital assistant (PDA) 416, pager 417, gaming device 418, data communications device 419, data processing device 420, web-based appliance 421, Web browser 422 and/or other application providing Internet/Intranet access and messaging application programs. The messaging program includes text messaging, multi-media messaging, instant messaging, e-mail, an organizer application program, a calendar application program, video application and/or a global positioning system (GPS) receiver 423, personal computer (PC) 424, laptop computer 425, palmtop receiver 426, remote control device 427, radio-telephone transceiver 428, data processing device 429, and/or data communication device 430. The communication apparatus is further configured with speakers 405, microphones 408, and nano sensors 704. Disclosed embodiments further provide the communication apparatus 400 comprising the personal computer (PC) 424. Certain embodiments provide the personal (PC) 424 comprising an information processing apparatus. Some embodiments provide the personal computer (PC) comprising a computing device configured with the input 404. The input device 404 further comprises an input module for receiving characters and user inputs. At least the input module configured for receiving user input further comprises a switch device being configured with the software and disposed with the hardware. Disclosed embodiments further provide the communication apparatus 400 configured with sensors operable for detecting relative movements on the display/input device 404. The display/input further comprises a keypad.

The information processing apparatus comprises executers being operable for executing varieties of processes. Certain embodiments provide the personal computer (PC) 424 further comprising a controller operable for controlling operations of the executers, including information, authentication information authenticating each user. At least a user mapping storage medium is disposed with the personal computer (PC) 424 configured for storing correspondence information responsive to the executers. Some embodiments provide the personal computer (PC) 424 comprising the controller operable for identifying identifies corresponding user information in accordance with the correspondence stored information.

Figure 10:
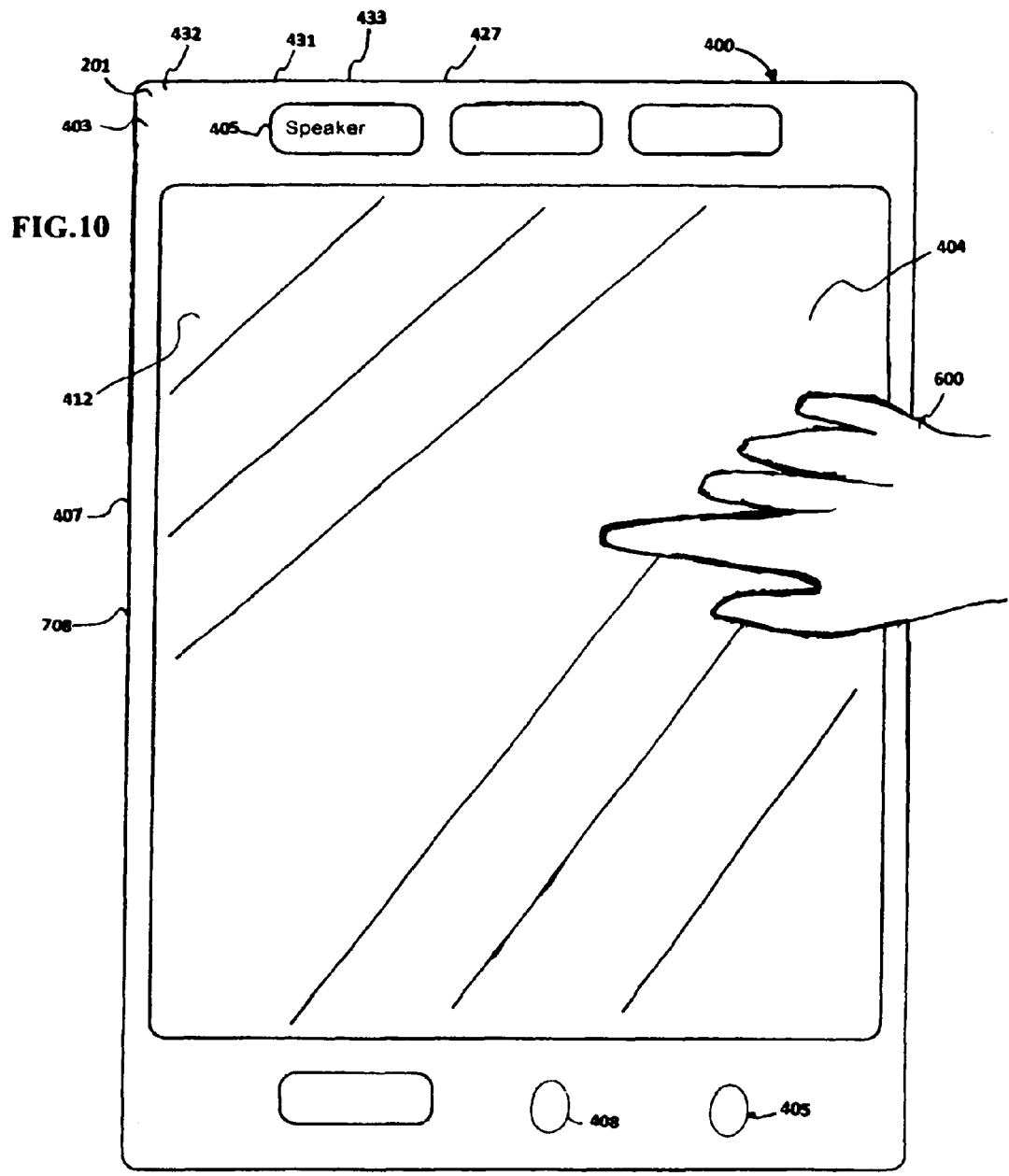
FIG. 10 is an exemplary embodiment of a mobile phone comprising a pocket PC, a PDA phone with dual processor.

Referring to FIG. 10 is seen exemplary embodiments of communication apparatus 400 comprising touch screen display/input 404, being operable through sensational touch by at least an object, including a human hand 600. The communication apparatus 400 further comprises a mobile phone comprising a pocket PC, a PDA phone with dual processor. Disclosed embodiments provide communication apparatus 400 comprising a touch screen 412, display/input device 404, including a remote control device 427 operable for remotely controlling a television, a stereo, a video cassette recorder (VCR), a digital video disc (DVD) player, a compact disc (CD) player, and a video game device. The communication apparatus 400 further comprises a wired network device, 431, an optical network device 432, and/or wireless network device 433 operable for receiving and transmitting data, including voice and/or video signals, multimedia signals, electrical energy transmission, data signals and video signal transmission. Certain embodiments provide a network device comprising a switched telephone network, transmission towers operable for receiving wireless signals and for forwarding wireless signals to intended destination, packet switched networks, including Internet protocol (IP) based network, an intranet, a local area network (LAN), a wide area network (WAN), a personal area network (PAN), Internet, and data transmitting network. Embodiments further provide communication apparatus 400 configured with speakers 405, microphones 408, and antenna apparatus 201 in communication with signal booster 403 being operable with logic circuit 407. Certain embodiments provide the communication apparatus being configured with at least a sensor 708.

Figure 11:
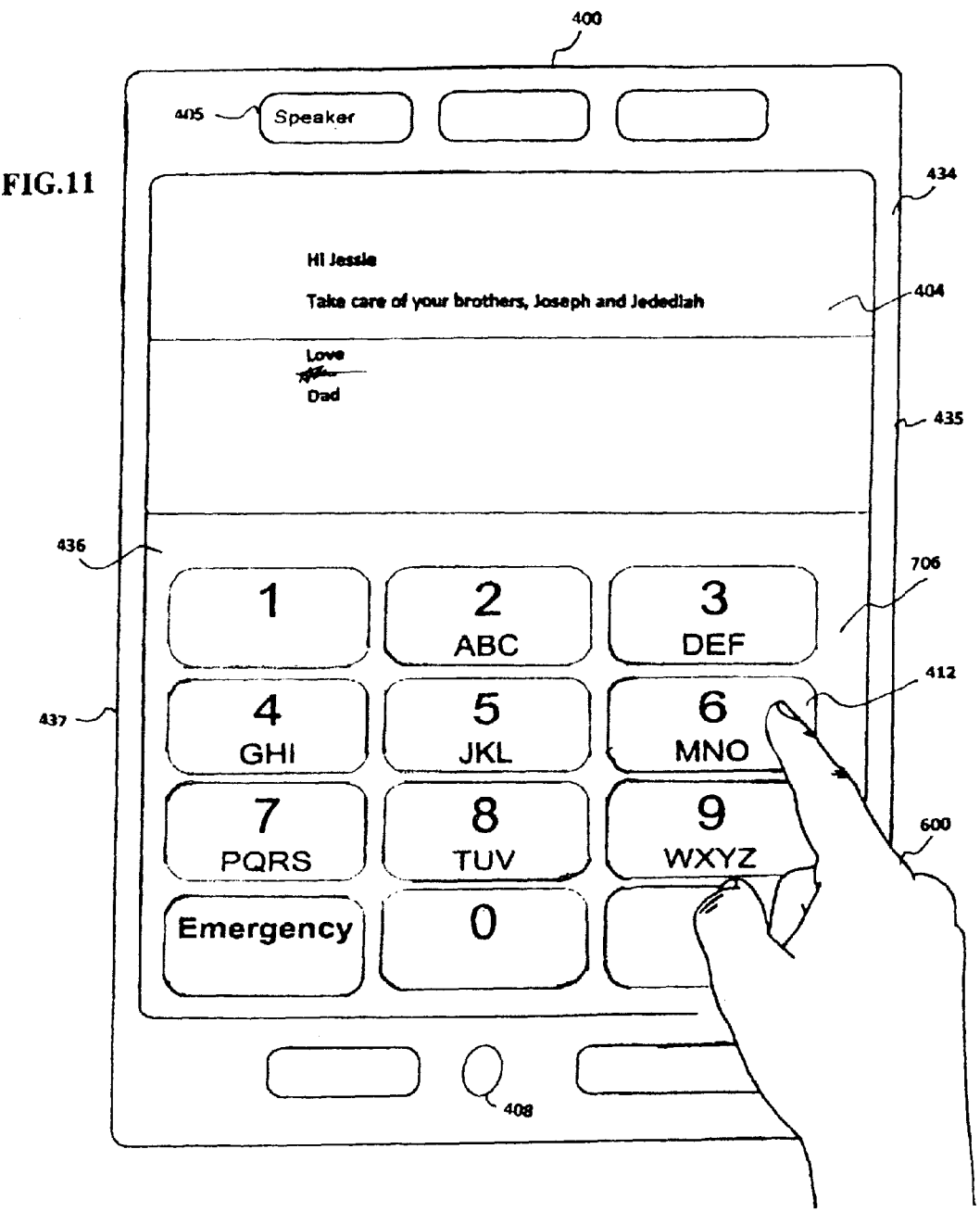
FIG. 11 is an exemplary embodiment of a mobile phone with a touch screen panel operable for communications; interactive gaming; music applications; a slider operable for accessing multimedia buttons.

Referring to FIG. 11 is seen exemplary embodiments of communication apparatus 400 comprising a mobile phone with a touch screen panel operable for communications; interactive gaming; music applications; a virtual slider operable for accessing multimedia buttons. Disclosed embodiments provide communication apparatus 400 comprising at least one of: at least a variable gain modules 434, a mobile device, 435, internal peripheral devices 436, external peripheral devices 437. Certain embodiments provide communication apparatus 400 comprising at least one of: cell phones, smart phones, laptops, handheld communication devices, handheld computing devices, satellite radios, global positioning systems, and PDA. Some embodiments provide internal peripheral devices being disposed in the mobile device. Other embodiments provide communication apparatus 400 further comprising a Bluetooth radio, wireless local area network (WLAN) radio, a wireless wide area network (WWAN) radio. The external peripheral device further comprises camera, printer, card reader, scanner, radio connection, wireless device connection. Embodiments further provide communication apparatus 400 configured with speakers 405, microphones 408. Certain embodiments provide the communication apparatus further comprises a display/input device 404 being operated by at least a human hand 600. The display/input device 404 further comprises a touch screen 412 being further operable on a detection platform 706.

Referring to FIG. 12 is seen exemplary embodiment of a communication apparatus 400 comprising a mobile phone with numeric keypads operable to provide voice over texting applications; a slide out keyboard; and resistive touch screen character recognition in accordance with one embodiment of the invention. Referring to FIG. 12A, the communication apparatus 400 comprises a housing 402 comprising of a sensory platform 700 consisting of nanotechnology application. Some embodiments provide the housing 402 comprising of at least a cell phone housing and/or belt clip. The sensory platform further includes strain gauges 701 embedded in load cells 702. Disclosed embodiment further provide nano technology applications comprising nano sensors 704 being embedded in silicon substrate 712 and fused/etched in microfiber material 710, providing a silicon microfiber 724. The sensory platform 700 being operable to provide a detection platform 706 being further operable for communications and/or for converting at least a form of energy into electrical energy. Disclosed embodiments further provide the sensory platform 700 further comprising a display/input device 404 being disposed with the housing 402. Certain embodiments provide the housing 402 further consisting of speakers 405, microphones 408, embedded antenna apparatus 201, in communication with at least a signal booster comprising a chip 403, in communication with a logic circuit 407. The communication apparatus 400 further comprises the detection platform 706 comprising sensors 708 being operable for detecting objects proximity to at least the display/input 404. The communication apparatus 400 may comprise at least one of: cellular telephone, telephonic, media device, PDA device, cellular telephone, GPS device, entertainment device and/or an information device being operable for road and traffic communications, including road side advertisement. Embodiments further provide communication apparatus 400 configured with speakers 405, microphones 408. Certain embodiments provide the communication apparatus 400 further comprises a display/input device 404. The display/input device 404 further comprises a touch screen 412 being further operable on a detection platform 706. Disclosed embodiments provide a device being configured for input/output on a substrate comprising at least one piezoelectric sensor formed on the substrate. The device further comprises a display/input formed on the substrate. The piezoelectric sensor is formed on the substrate in communication with at least a processor being further operable to calculate applied force and activate a force response based on the calculated value. Disclosed embodiments provide communication apparatus comprising a device configured for monitoring resistance associated with one or more piezoelectric sensors to detect changes in a force applied to a display/input device. The display/input device is further configured for detecting change in resistance associated with the one or more piezoelectric sensors being further configured with electrical crystals operable for measuring force applied to the display/input device based on the detected change in resistance.

Referring to FIG. 12B is seen an exemplary embodiment of a human hand 600, holding communication apparatus 400. The communication apparatus is disposed in a housing 402 configured with nano sensors 704, a display/input device 404, a speaker 405, and a microphone 408. The display/input device 404 further comprises a touch screen 412 being further configured with an interface device 301. The communication apparatus 400 further comprises a media device further consists of input and output devices. Disclosed embodiments provide the communication apparatus 400 including at least a housing 402.

The communication apparatus 400 further comprises a cellular telephone, a game device, and a media player and a PDA. The communication apparatus 400 is portable and may fit within the hand of normal adult and grown children. In one embodiment, the display/input device 404 may include at least one of multi-point interactive touch screen input device 412, an LCD display. Disclosed embodiment provide a display/input device 404 comprising liquid crystal display (LCD), a touch screen display or another type of display operable for providing information to a use. Certain embodiments provide a display/input device being further operable for providing information regarding incoming or outgoing telephone calls and/or incoming or outgoing electronic mail (email), instant messages, short message services, multi-media message services, calendar application, text message application, the current time display, video games applications, downloaded content display, media applications. In one embodiment, the multi-point interactive touch screen is a capacitive sensing medium configured to detect multiple touches, including blobs on the display from a user's face or multiple fingers touching or nearly touching the display.

Referring to FIG. 12C is seen an exemplary embodiment of the disclosure comprising human hand interaction 600. Certain embodiments provide the communication apparatus 400 comprising a hand held device, further comprises a display/input device 404 as seen in further 12B, being operated by at least a human hand 600 as seen in FIG. 12C.

Figure 13:
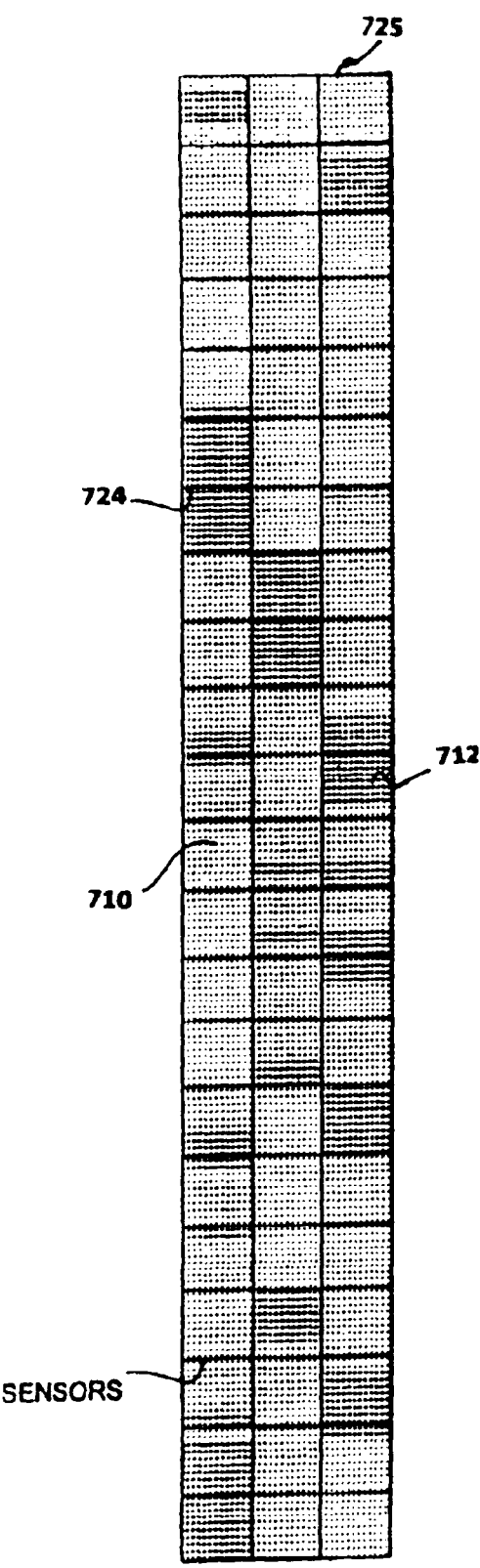
FIG. 13 is an exemplary embodiments of nanotechnoloay application of CMOS multiple antenna on a chip and nanowires for transporting energy.

Referring to FIG. 13 is seen exemplary embodiments of nanotechnology application comprising substrate-microfiber 724. Disclosed embodiments provide the communication apparatus comprising methods and systems for generating electrical energy. The communication apparatus comprises microfiber material 710 being configured with sensors on silicon substrate 712. Certain embodiments provide the substrate-microfiber 724 comprise miniaturized non ferrous materials 734 being embedded in the silicon substrate 712. Some embodiments provide the substrate-microfiber 724 comprise energy transport platform 725. Certain embodiments of the silicon substrate 712 comprise at least glass 739, further comprising a gallium nitride high electron mobility transistor (GaN-HEMT) to improve communication signal amplification and reduce energy consumption. Some embodiments provide communication apparatus being configured with a silicon to silicon bonding and/or silicon to ceramic wafer bonding for detection and for generating electrical energy. The silicon is further provided with ceramic wafer bonding responsive to solar energy. The silicon to ceramic wafer bonding may include at least silicon to glass bonding, forming single crystal silicon to improve the microacoustics and micro optics in the nanotechnology applications to further reduce energy consumption and produce electrical energy. Certain embodiments provide optical properties of thin films being operable for the advancement of the integrated circuit for converting solar energy into electrical energy. Certain embodiments provide optical properties of thin films being operable for the advancement of the integrated circuit for converting solar energy into electrical energy. Disclosed embodiments provide energy platform consisting of at least surface acoustic wave line, paste, MEMS, thin film deposition, and multifunctional sensor array being embedded in the silicon substrate 205 and etched/fused in a micro-fibered material 220. The application of ceramic materials further provides many features, including high hardness, physical stability, extreme heat resistance and chemical inertness. Certain embodiments provide highly resistant material to aggressive chemicals, melting, bending, stretching, corrosion and.

Figure 14:
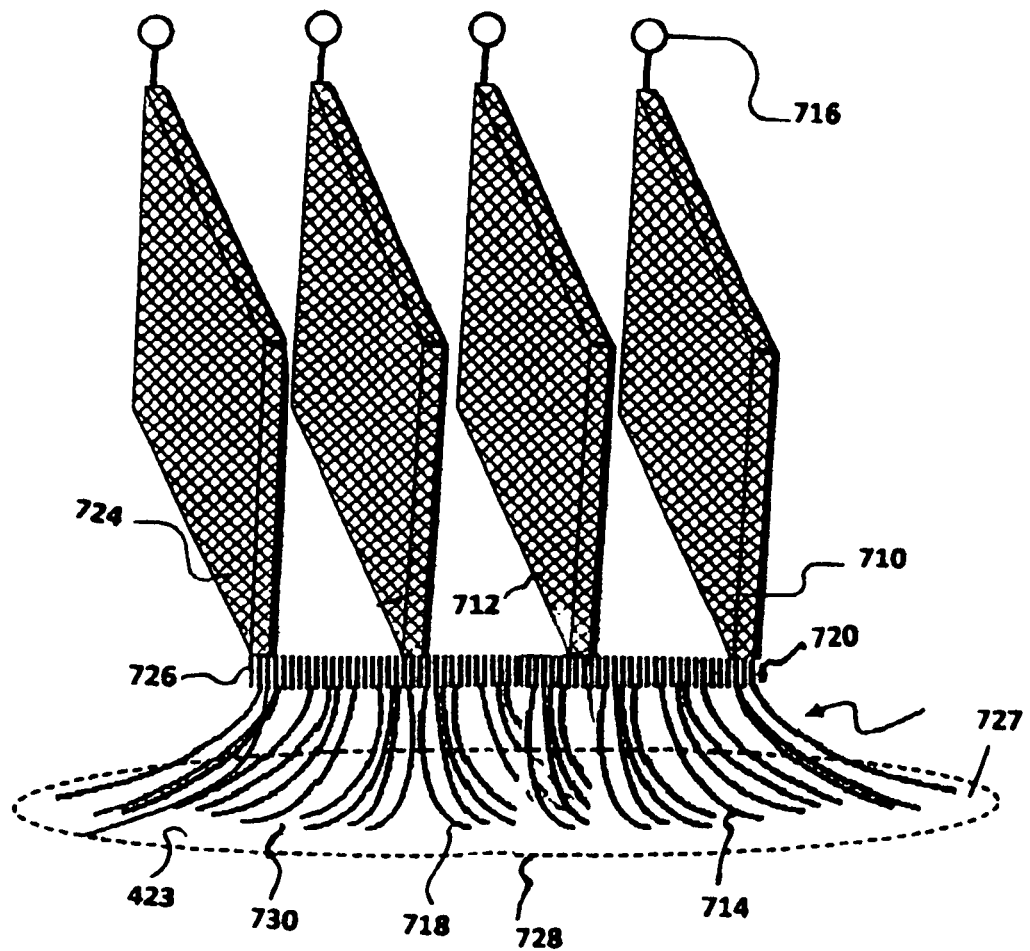
FIG. 14 is an exemplary embodiment of the antenna apparatus and the energy transport medium.

Referring to FIG. 14 is seen exemplary embodiments of the energy transport medium. Disclosed embodiments further provide communication apparatus comprising methods and systems for generating and storing electrical energy. Certain embodiments comprise nano-materials 710 comprising microfiber material. Disclosed embodiments further provide the microfiber material 710 comprising materials with excellent electrical properties being disposed with substrate 712. The microfiber material 710 includes material components with nanometer dimensions in which at least one dimension is less than 100 nanometers. Some embodiments provide the microfiber materials being further configured with nano-wires/tubes 714. The nano-wires/tubes 714 being further embedded in the silicon substrate 712. Certain embodiments provide a communication apparatus comprising the substrate 712, being configured with electrodes 716 in communication with the nano-wires/tubes 714. Some embodiments provide nano-sensors on silicon microfiber comprising nano-fibers formed on the microfiber. Disclosed embodiments provide a microfiber membrane configured to provide structural communication and data transmission integrity. Certain embodiments provide the nano-fibers being formed using electrospray deposition. Other embodiments provide the nano-wires/tubes 714 comprising at least one component of: carbon char, carbon black, metal sulfides, metal oxides and other organic materials being alloyed with the microfiber material 712. Disclosed embodiments further provide communication apparatus being disposed with alloyed material comprising apparatus 718 being configured for exhibiting unique electrical and electrochemical properties to provide efficient transportation of energy properties. Embodiment provide a combination of the silicon substrate and metal oxide and/or thin film or miniaturized metallic material in communication with signal booster chip, providing an energy platform comprising a battery cell for the communication apparatus. Disclosed embodiment further provide a communication apparatus consisting of a detection platform comprising touch screen display device configured with a processor means comprising a pattern recognition technique for producing "Sensing," a controlled data/communication signal and communicating sensed detection to a wireless modem or control module being operable to provide wireless communication.

Disclosed embodiments further provide communication apparatus comprising methods and systems for producing energy properties from the presence of high surface areas and charge transport mechanism. Certain embodiments provide the charge transport mechanism being further derived from the flow of pressured fluid 423. Certain embodiments of the pressure fluid 423 comprise sound waves, solar energy, vibration, and wind. Disclosed embodiments further provide apparatus for thermal expansion of fluid in communication with the nano-wires/tubes 714. Embodiments provide silicon-microfibers and nano-wires/tubes 714 being further provided with methods for converting thermal energy into electrical energy. Certain embodiments of the thermal expansion of the fluid comprise sound waves, solar energy, vibration, and wind and/or material pyrolysis. Some embodiments provide energy medium, including apparatus 720 comprising means through which electron transfer occurs at the electrode 716, through the release of chemical energy to create a voltage through oxidation/reduction reactions 722. The oxidation and reduction reactions 722 is being separated through the electron 716. The electrode 716 is being configured with substrate-microfiber 724 comprising of re-enforcements to external electric circuits. Certain embodiments provide at least a storage medium, comprising internal transport voltages at electrodes configured for providing useful energy transport stream to batteries 724 and/or capacitors 726. Disclosed embodiments provide silicon microfiber further comprising of Si-substrate consisting of a patterned isolation layer.

Certain embodiments provide the Si-substrate being etched/fused through openings of the patterned isolation layer to form a plurality of electric-conducting platform. At least the electric conducting platform further comprises electric-conducting wires and/or at least heat-conducting wires in communication with an opto-electronic device. The opto-electronic device further comprises opto-isolation apparatus being configured with at least a LED. Disclosed embodiment provide silicon microfiber, further comprising a remote sensor assembly comprising being configured with a plurality of micro electromechanical system (MEMS) embedded on the silicon substrate. The silicon substrate further comprises a wireless communication circuit being configured with a processing device operable to obtain data, such as measurement values from at least one of plurality of MEMS sensors. Certain embodiments provide the silicon substrate further configured to perform at least a filtering operation on the measurement values. Disclosed embodiments further provide silicon microfiber further comprising apparatus for coupling light between input and output waveguides comprising structures having higher portions or lower portions being arranged at a fine pitch equal to or shorter than a wavelength of visible light on base surface responsive to plurality of arc track rows.

Figure 15:
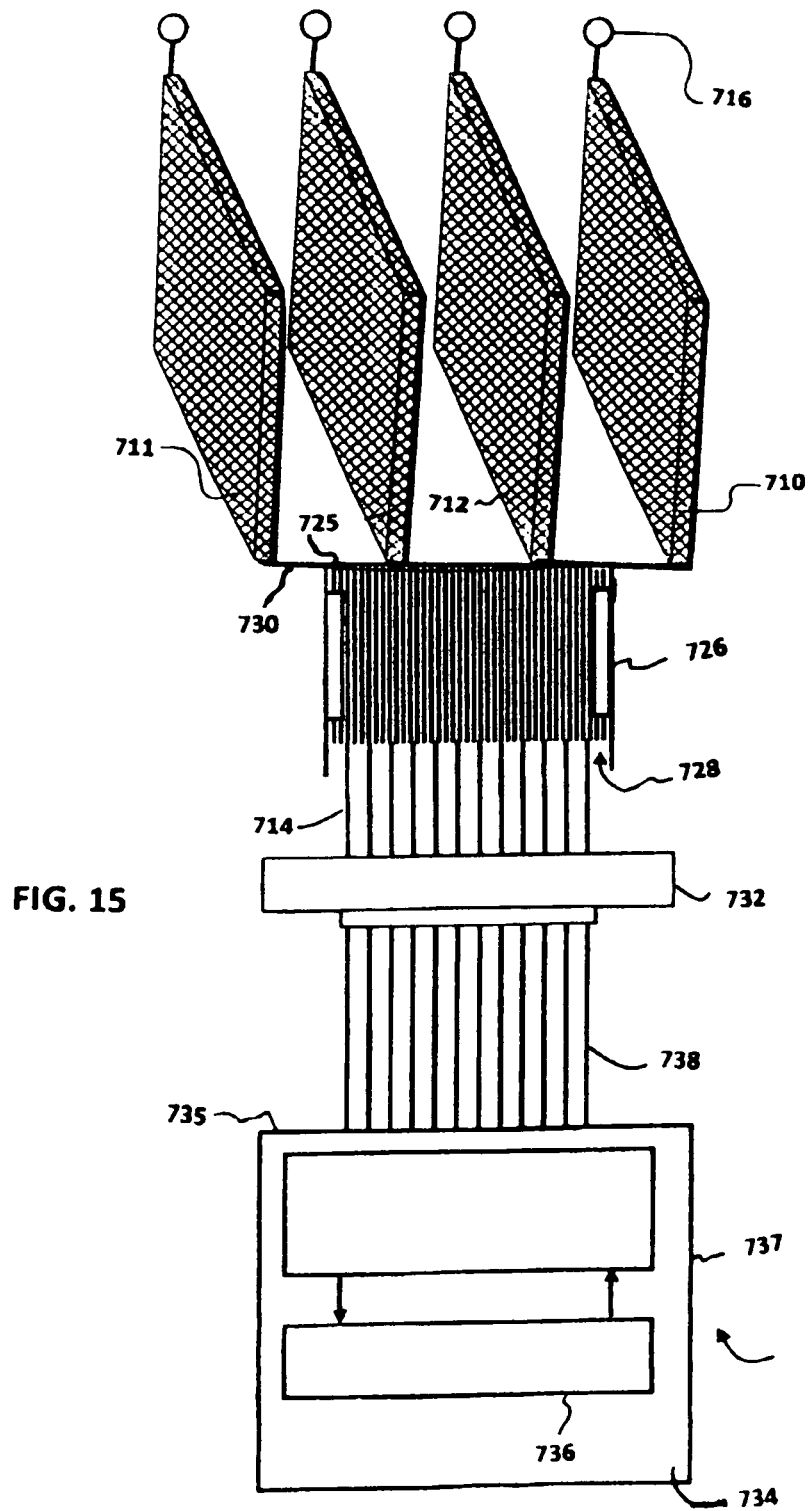
FIG. 15 is an exemplary embodiment of the CMOS multiple antennas on a chip comprising substrate microfiber embedded with meta-material.

Referring to FIG. 15 is seen further exemplary embodiments of the energy medium comprising energy storage apparatus 720. Disclosed embodiments provide methods and systems for generating electrical energy. Certain embodiments provide apparatus for generating electric energy from the energy released by at least a reaction, such as pressure, thermal transport, heat, force, and vibration. Certain embodiments provide microfiber material 710 being configured for converting pressure force and generating energy. Some embodiments of the energy being generated comprise electrical energy 730. Other embodiments of the energy being converted comprise thermal energy 732. The thermal energy, in other embodiments, is being piped through the nano-wires/tubes 714 in communication with the silicon-microfiber material and/or the electrode. The microfiber material 710 further comprises plurality textile fibers 711, being alloyed with zinc oxide (ZnO) nano-wires 734. Disclosed embodiments provide the zinc oxide nano-wire 734 being configured with piezoelectric crystals for generating electrical energy 728 and at least a coil for communicating and/or transporting the electrical energy being produced. Certain embodiments provide a communication apparatus being configured with signal booster chip in communication with an antenna apparatus being operable for current flow 730 from plurality fiber pairs 736. Other embodiments provide the fiber pairs being configured for converting at least one of: vibration, pressure, blood flow, sound, waves, force, thermal energy, and other electrical properties into electrical energy 730. Some embodiments provide a device for generating pressure, thermal energy, and force and producing electrical energy. Certain embodiments of the device comprise a radiation apparatus. Other embodiments of the radiation apparatus comprise a radiator device being configured with silicon-microfiber and at least an electrode.

Certain embodiments provide the radiator device comprising a device that emits radiant energy. Disclosed embodiments provide nanotechnology application comprising nano sensors and MEMS, being embedded on a silicon substrate and etched/fused in a micro fiber material, preferably fabricating together a unified process with supporting integrated circuit (IC) on the same semiconductor substrate comprising integrated silicon platform. Certain embodiments provide the integrated silicon platform in a single chip to greatly reduce the size, weight and power consumption of the communication apparatus and enhance the performance of all applications for the communication apparatus. Disclosed embodiments provide the energy platform comprising a cell platform being further configured for medical devices applications. Other embodiments of the cell platform comprise communication applications. Disclosed embodiments further provide the cell platform comprising nickel-cadmium (NiCd) configured with nickel oxide hydroxide and metallic cadmium. Disclosed embodiments provide the nickel oxide and metallic cadmium further consisting electrodes being configured for deep discharge applications. Other embodiments provide methods and systems for storing electrical energy, comprising the cell platform. The cell platform includes battery cells and/or capacitor configurations for withstanding higher number of charge/discharge cycles and faster charge and discharge rates. Certain embodiments of the cell platform further comprise an electrode device comprising at least electrically conductive nano wires/tubes being coated with at least one electrically isolating layer. The nano wire/tubes further comprises silicon nano wire operable to display biological analysis results such as electrical responses to either pH changes or receptor-ligand interactions of at least one of: protein disease, viruses, and DNA hybridization in real-time.

Embodiments further provide communication apparatus comprising apparatus for generating pressure, thermal energy, and force, and for converting the pressure, thermal energy and force into electrical energy. Disclosed embodiments further provide methods and systems for converting wind force into electrical energy. Some embodiments provide microfiber material 710 comprising zinc oxide (ZnO) being configured for converting pressure and force into electrical energy 730. Some embodiments of the microfiber material 710 comprise nanotechnology applications. Disclosed embodiments provide a method of selectively etching a solid sacrificial sensory layer, comprising wet etching and/or dry etching. Other embodiments provide methods and systems of generating renewable electrical energy through nanotechnology applications. The nanotechnology applications comprise at least a single layer microfiber 736. Other embodiments of the microfiber 710 further comprise miniaturized material arrays comprising nano-wire 734 being configured for applications in hybrid communication applications, comprising generator assembly 738. Certain embodiments provide the generator assembly 738 comprising at least semiconductor properties consisting of non ferrous material arrays. The non ferrous material array comprises vertically-aligned zinc oxide (ZnO) nano-wires 734. The zinc oxide nano-wire 734 is being configured to exhibit flexible electrode 716. Some embodiments provide the flexible electrode further comprising conductive platinum tips 735. Other embodiments provide the microfiber material 710 further comprising plurality fibers being operable for characterizing excellent electrical properties, and being coated with polymer and/or with zinc oxide layer 734 to provide energy transport platform 725. Certain embodiments provide the nano-wires 734 being coated with gold 737, and fused or etched on the transport platform 725. Some embodiments provide the nano-wire being configured for harnessing energy from a medium, comprising at least one of: vibration, pressure, blood flow, sound, waves, thermal processing, wind, and Force. Other embodiments provide apparatus comprising zinc oxide (ZnO) 734 being embedded in a silicon substrate configured with at least polymer. Disclosed embodiment further provide single crystal silicon to improve the fabrication of micro-acoustics and micro optics and to provide an energy platform for converting solar energy, sound wave, vibration, pressure force, and wind force into electrical energy.

Figure 16:
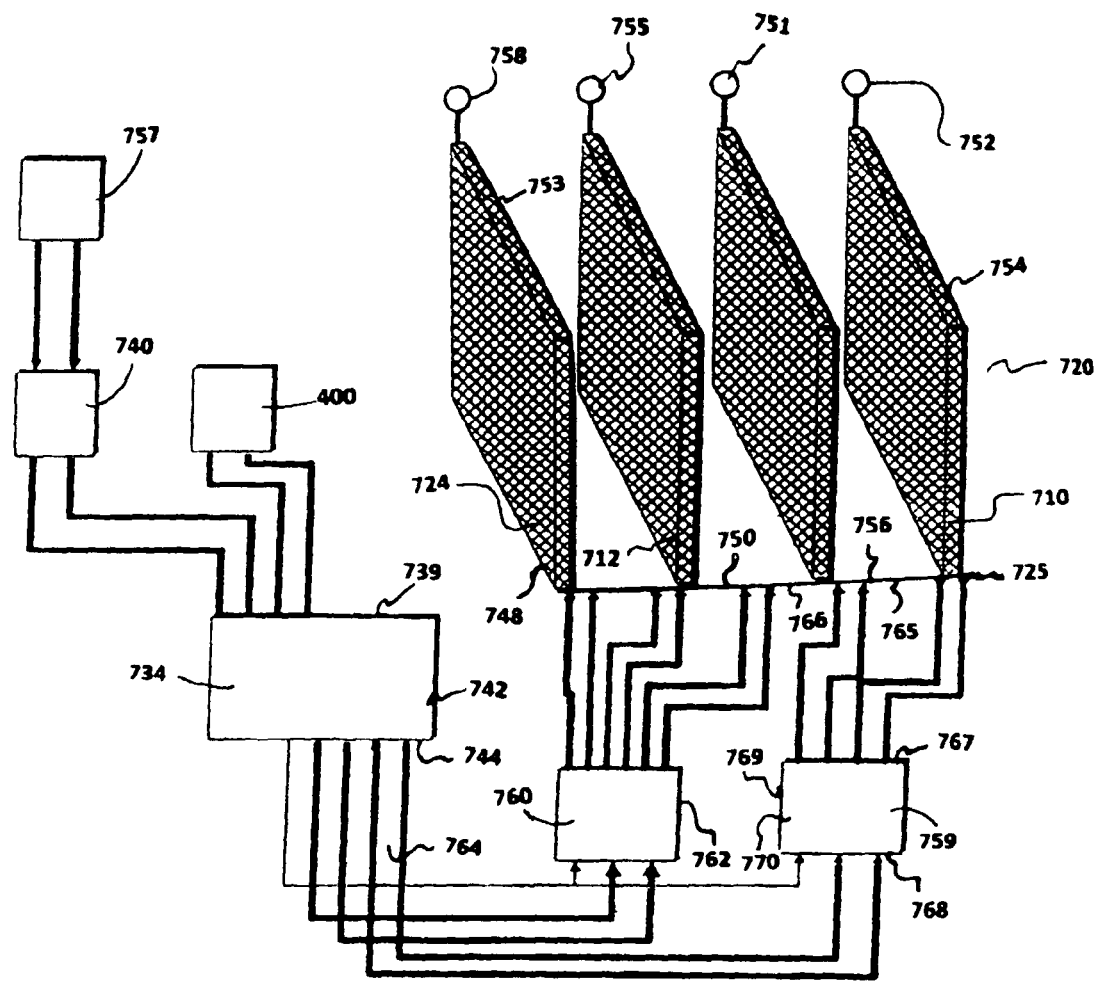
FIG. 16 is seen further exemplary embodiments of communication device comprising energy platform.

The micro-acoustics and micro-optics are further fabricated in a micro-electro-mechanical system and thin film technique to enable the integration of microelectronics circuit and multifunctional sensor into the detection platform for the communication apparatus. Wafer bonding in single crystal silicon is applicable to significantly lower acoustic losses and improve optical properties and energy production. Disclosed embodiments further provide silicon on insulator bonding method having a silicon layer formed on a silicon microfiber oxide film as an insulator film comprising parasitic capacitance being configured for high radiation-proof ability. At least a layer in the substrate surface layer portion comprise a region electrically isolated from the inside of the substrate via oxide film layer to eliminate effects such as a high speed/low power consumption operation and/or prevention of low signal transmission. The substrate further includes single-crystal silicon substrates comprising a single-crystal silicon substrate that becomes an SOI layer and/or a bond wafer. Certain embodiments provide the silicon substrate comprising a single-crystal silicon substrate that becomes a support substrate being configured with an oxide film on the surface of at least one silicon substrate microfiber. The single-crystal silicon substrates may be bonded to each other via the oxide film there-between and heat treated to increase bonding strength. Then, a film thickness of the bond wafer is reduced to obtain an SOI substrate Referring to FIG. 16 is seen further exemplary embodiments of communication device including energy medium comprising energy platform. Embodiments further provide silicon-substrate-microfiber comprising energy transmission/storage apparatus 720. Certain embodiments provide data being converted into electrical energy. The data may be derived from at least one of: vibration, pressure force, wind flow, sound waves, force, and electrical properties. The pressure may include pressure force from at least an object. The object may also include human hand being used to operate the communication apparatus 400. The operation of the communication apparatus include keyboards, touch screen, gaming, texting, programming, display/input, output, and normally utilized operations. Disclosed embodiments further provide the silicon-substrate-microfiber comprising charge couple apparatus 740 being configured with miniaturized conduit particles 734. Certain embodiments of the conduit particles 734 comprise of at least glass 739. Other embodiments of the conduit particle comprise of at least Zinc Oxide (ZnO) and/or gold. Some embodiments of the disclosed particles comprise of at least nonferrous material being alloyed with at least a substrate-microfiber 724. Disclosed embodiments further provide materials consisting of conduit properties comprising of at least glass fiber 739 being responsive to light data transmission. Further embodiments of the charge particle apparatus 740 comprise electron-silicon substrate-oxide 742 configured with materials being characterized with good optical properties for exhibiting effective sensitivity to electron range. Disclosed embodiments further provide the electron-silicon substrate-oxide 742 comprising coatings to prevent glass-glass interface 744. Certain embodiments comprise the silicon substrate 712, being at least the constituent of glass 739. Other embodiments provide the silicon substrate 712 being layered with fibers 710 to exhibit durability and better charged properties. Certain embodiments provide an energy platform comprising AlN thin film. Disclosed embodiments provide communication apparatus consisting of solar cell methods of generating electrical energy and silicon wafers process of producing a simpler and cheaper alternative green energy communication apparatus. Disclosed embodiments further provide a communication apparatus comprising of direct band-gap semiconductors cadmium telluride (CdTe), copper indium diselenide alloy (CuInSe2) and copper indium gallium diselenide alloy Cu(InGa)Se2, comprising materials with high optical absorption coefficients being applicable for the photo absorption layer in thin film photovoltaic (TFPV) cells for the energy platform.

The electrodes 716 further comprise of battery cells 748. Other embodiments provide the battery cells 748 further include electrolyte 750 comprising of cathodes 751 and anodes 752. The cathodes 751 comprising the oxidized form of the electrode metal and the oxidizations and reductions are controlled by the electrochemical potential being responsive to the thermal expansion, pressure, composition and concentration of the electrolyte 750. The electrical potential differential being produced is the sum of the electrochemical potential at the electrode 716. Disclosed embodiments further comprise of Zinc batteries and/or zinc fuel cells 754 being configured for electrochemical power applications through the oxidation of zinc with oxygen from the air. Embodiments provide a device for exhibiting high energy density. Certain embodiments comprise nano-materials 734 being embedded in the substrate 712 and etched/fused in the microfiber material 710 to provide advanced cell platform 756. Some embodiments of the cell platform 756 are being communicatively connected to the electrodes 716. Other embodiments of the cell platform 756 comprise a battery cell 753. Yet, other embodiments of the cell platform 756 comprise fuel cell 754. Still, other embodiment of the cell platform comprise energy storage medium. Disclosed embodiments further comprise a capacitor and/or a battery.

Disclosed embodiments provide the cell platform 756 further configured for medical devices applications 757. Other embodiments of the cell platform 756 comprise communication applications 758. Disclosed embodiments further provide the cell platform 756 comprising nickel-cadmium batteries (NiCd) 758 configured with nickel oxide hydroxide and metallic cadmium 760. Disclosed embodiments provide the nickel oxide and metallic cadmium 760 further consisting electrodes 716 being configured for deep discharge applications. Other embodiments provide methods and systems for storing electrical energy, comprising the cell platform 756. The cell platform 756 includes battery and/or capacitor configurations for withstanding higher number of charge/discharge cycles and faster charge and discharge rates. Certain embodiments of the cell platform 756 further comprise an electrode device 762 comprising at least electrically conductive nano wires/tubes 764 being coated with at least one electrically isolating layer 765. Disclosed embodiments further provide nano-wires/tubes 714 764 comprising at least a substrate 712 being coated with at least one metallic layer 760 having a nano-metric pattern thereon, and being at least partially exposed at a tip of electrically conductive core 760. The cell platform 754 further comprises at least plurality nano-wires/tubes 714 764 being configured with flexible electrode devices 762 disposed in a guided re-enforced silicon substrate 712. Other embodiments further provide each electrode device 764 being configured with plurality of micro-wires 734 being connected to at least one nano-wires/tube. The nano-wires/tubes 714 762 further comprise flexible electrode devices 762 being configured to provide electrical communications.

Disclosed embodiments further provide the cell platform 756 comprising particles of zinc mixed with an electrolyte consisting of at least potassium hydroxide solution. Certain embodiments provide a communication apparatus configured for converting sound waves, solar energy, vibration, and wind into electrical energy. Some embodiments provide oxygen from the air to enable reaction at the cathode 751. The reactions can form hydroxyls, which is being migrated into zinc paste and form zinc oxide hydroxide 734 configured for releasing electrons to the cathode 751. Disclosed embodiments further provide the reactions comprising zinc decaying into zinc oxide 734, the communication apparatus generating electrical energy from sound waves, solar energy, vibration, and wind, in communication with the cell platform 756. The cell platform 756 is being configured so that the sound waves, solar energy, vibration, and wind and hydroxyls from the anode 752 are being recycled for energy production at the cathode 751. The recycling would enable the sound waves, solar energy, heat, vibration, and wind 766 to serve only as a catalyst to effectively produce maximum voltage. Embodiments provide a substrate 712 and microfiber material 710 for the design configuration of the cell platform 756. The cell platform further comprises electro-active material to enable better charge transport. The cell platform 756 further comprise of plurality nano-components consisting of nano-particles 767 forming conductive carbon-based nano-clusters 768 bound together by a conductive carbon-based cluster binder having high densities of mobile charge carriers such as electrons, electronic acceptors, and ionic species. The cell platform 756 further comprises at least a terminal 769, being electrically coupled to the nano-particles 768 for enabling a charge transport being operable for supplying electrons and electron acceptor sites. Other embodiments of the cell platform 756 further comprise charge transport 740, occurring by means of the electron traveling through the highly conductive and short path of the binders 770. Disclosed embodiments provide the binders in close proximity with the nano-clusters 768 for enhancing the energy and power densities. Disclosed embodiments further comprise battery cell and/or capacitor.

Disclosed embodiments provide a radiator apparatus comprising a renewable energy source. Certain embodiments provide communication apparatus comprising solar panels made of crystalline silicon wafers for converting solar energy into electrical energy. Some embodiments provide thinner wafers using laser processing to ablate the circuit board, providing more electrically efficient communication environment for signal amplification. Disclosed embodiments provide the radiator apparatus being further configured with substrate-microfiber and metallic materials to prevent any radioactive or chemical impact within the environment. Disclosed embodiments further provide the radiation apparatus being further configured for extracting energy from the opposing outside wind to be stored within the cell platform. Disclosed embodiments provide methods and systems that don't produce noise and pollution. More electricity could be generated at any time without physically plugging the communication apparatus into a wall socket for recharge, thereby extending the life of the battery.

Figure 17:
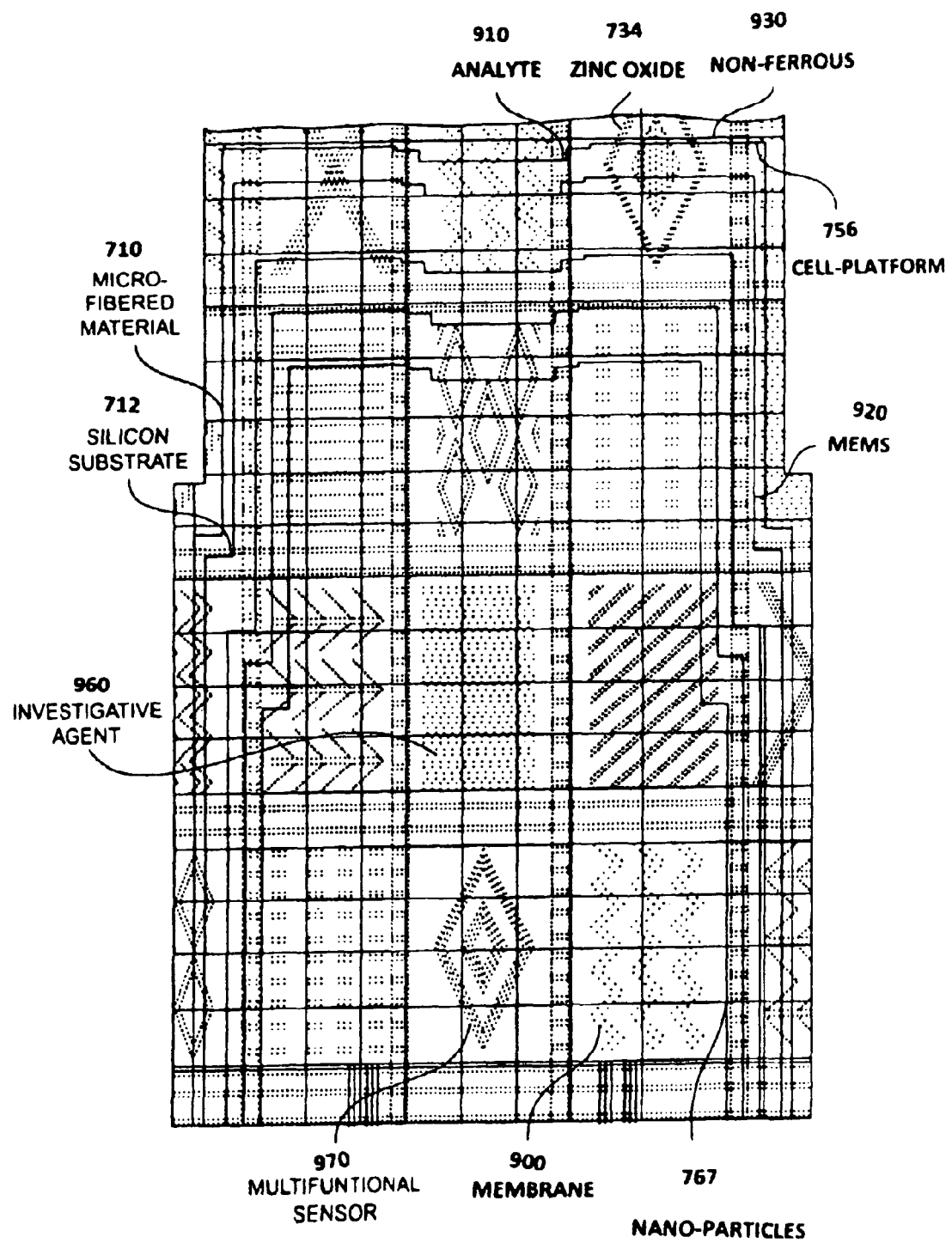
FIG. 17 is an exemplary embodiment of a charge transport comprising microfiber material being configured with silicon substrate.

Referring to FIG. 17 is seen exemplary embodiments of a charge transport comprising microfiber material 710 being configured with silicon substrate 712. The silicon microfiber comprises cell platform 756. The cell platform 756 comprises nonferrous material 930 embedded in the silicon substrate 712. Multifunctional sensors 970, nano-sensors 360, 327 and MEMS 920 are embedded in the silicon substrate for detection of charge characteristics. The cell platform 756 further comprises nano particles 767 being configured with membranes 900. Disclosed embodiments provide methods and systems for generating electrical energy and for transporting the energy into a storage medium. Some embodiments provide zinc oxide 734. Certain embodiments comprise an analyte 910. Other embodiments provide an investigative agent. Embodiments provide a MEMS 2-D scanning micro-mirror with miniature optics and flexible electronics for unrestricted probe movement. Embodiments provide communication apparatus being configured with flexible electronics for unrestricted freedom of movement due to pressure, vibration, and sound waves to generate energy through voltage-transformation circuitry in communication with the battery cells. The platform provides safety into MEMS system to protect consumers from dissipative radiant energy. Certain embodiments provide communication apparatus being operable on low power consumption. Certain embodiments provide highly efficient fiber amplifiers using ultrafast laser technique.

Figure 18:
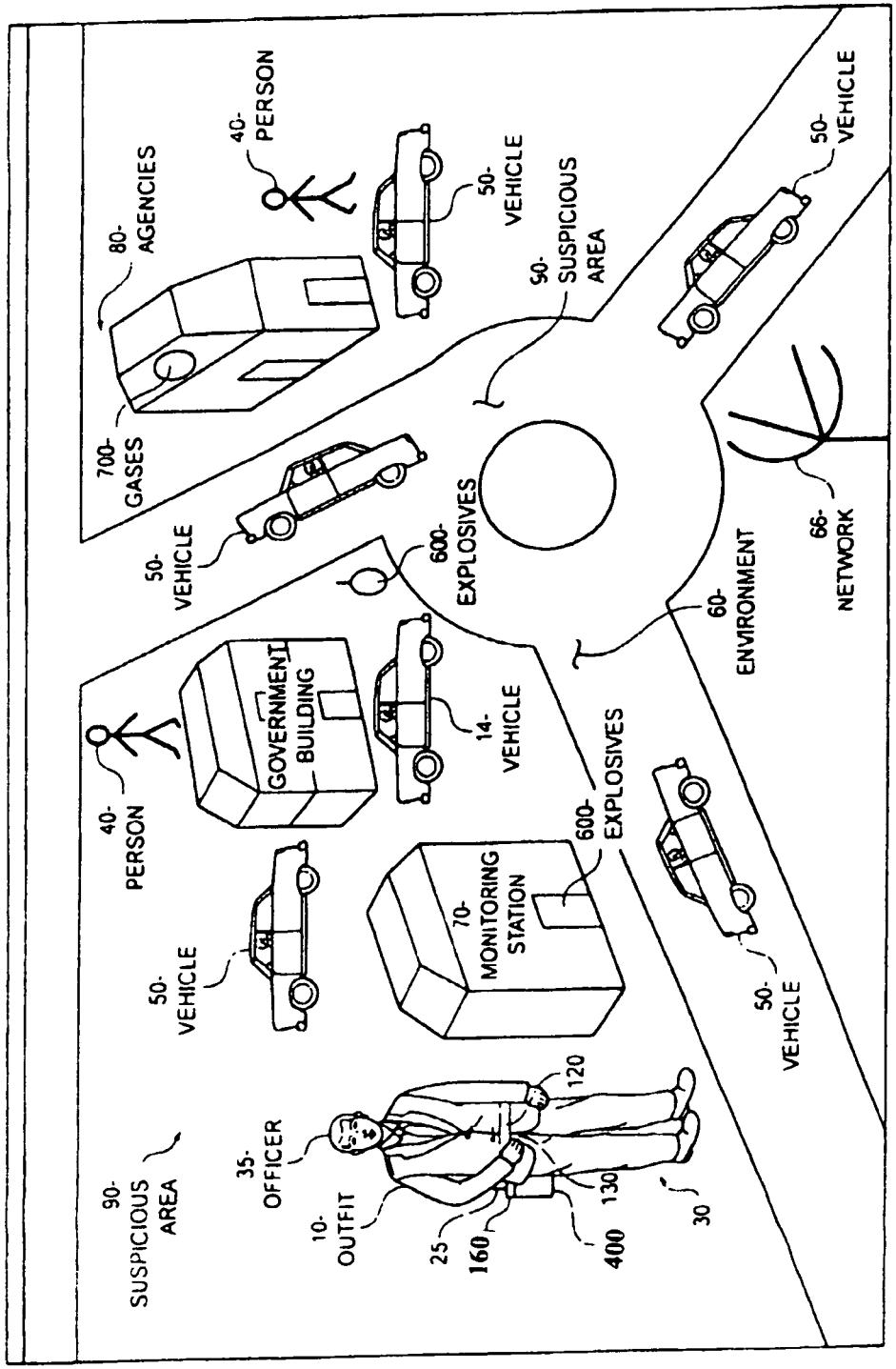
FIG. 18 is seen a communication environment comprising a monitoring station agencies, and a government building.

Referring to FIG. 18, is seen communication environment 60, comprising a monitoring station 70, agencies 80 and a government building. Vehicles 14 and 50 and at least a person 40 are being watched by an Officer 35 monitoring a suspicious area 90. The Officer 35 is outfitted with certain embodiments of the disclosure, comprising outfit 10 on the officer 35, a communication apparatus 400, communication apparatus 400 being disposed in an outfit 160 operable for housing the communication apparatus, wearable outfit 30, waist belt 120, outfit 160 is firmly secured on the officer's waist by the waist belt 120, and connector 25 being disposed within the waist area 130. Officer 35 is seen to have identified a suspicious person 40 patrolling at least agencies 80. The outfits 10, 30, and 120 are seen to provide exemplary embodiments of detected explosives 600 and gases 700. The communication apparatus 110 is further configured to analyze detections and is in communication with a network 66.

Figure 19:
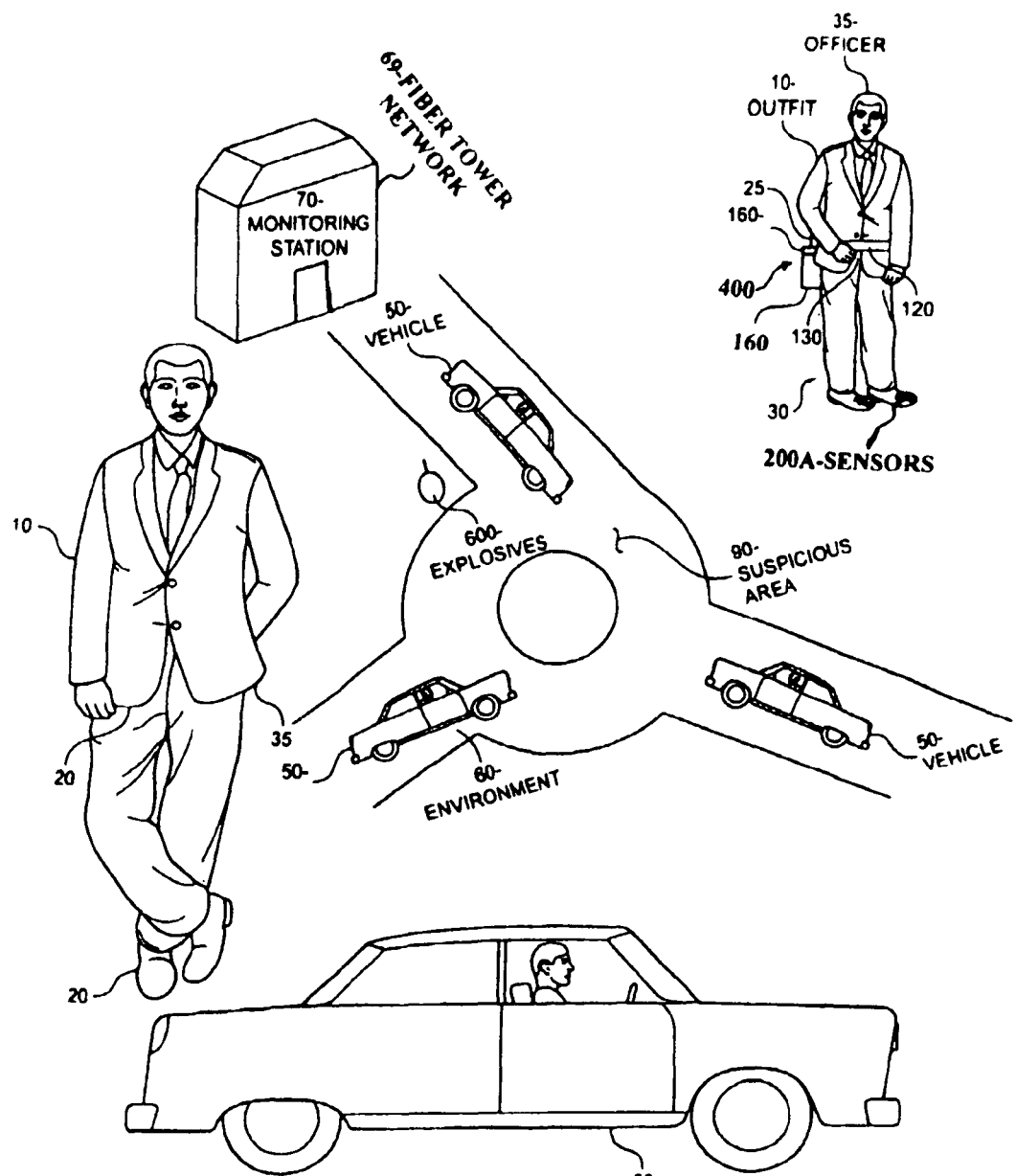
FIG. 19 is seen further embodiment of a monitoring station comprising a fiber tower, network.

Referring to FIG. 19 is seen further embodiment of a monitoring station 70 comprising a fiber tower network. A person 35 is seen wearing a detection outfit comprising of sensors embedded in silicon substrate and fused/etched in a microfiber material, a communication apparatus 400 is disposed in an outfit 160 comprising a housing being secured on the waist area 130 via a waist belt 120 by the person 35. The housing further comprises silicon substrate micro fiber being embedded with sensors operatively configured for generating electrical energy. The communication apparatus 400 is communicatively configured with signal booster operable to prevent cancerous disease and is responsive to network communications with the monitoring station 70 and/or fiber optic tower 69. The communication apparatus is further configured with battery cells responsive to energy being created and responsible for supplemental empowering of the detection platform for the display device. Further embodiment of a person 35 is being disposed with communications apparatus 400. Disclosed embodiments provide the respective person 35 wearing outfits 10, 20, 30, 120, 160 and 130, operable for detecting weapons of mass destructions. The person 35 is communicating with communication apparatus 400 disposed in a vehicle 50 being positioned within an environment 60. The communication apparatus 400 may be configured to detect suspicious area 90 containing explosive 600. A suspicious vehicle 50 is seen to have been detected with weapons of mass destructions.

Figure 20:
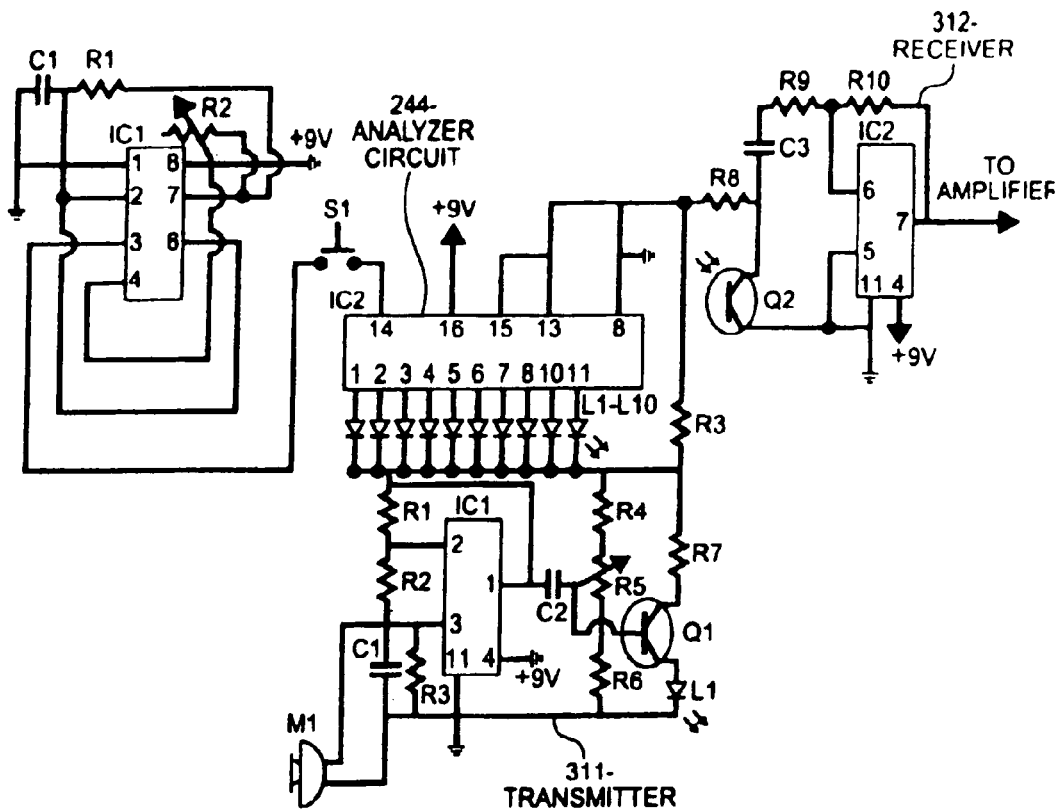
FIG. 20 is seen a transmitter being configured with energy apparatus comprising a battery cell which may be charged wirelessly.

Referring to FIG. 20, the transmitter 242 is configured with energy apparatus comprising a battery cell which may be charged wirelessly. An amplifier is configured with the communication apparatus for amplifying signal communications. Transmitter 311 and receiver 312 are communicatively connected. Transmitter 311 and receiver 312 are communicatively connected to analyzer circuit 244. The CMOS circuitry is operable to dissipate less power. Certain embodiments of the disclosure further provide a static logic configuration being operable on p-type and n-type metal-oxide-semiconductor field-effect-transistors "MOSFET's." being configured for implementing logic gates.

Figure 21:
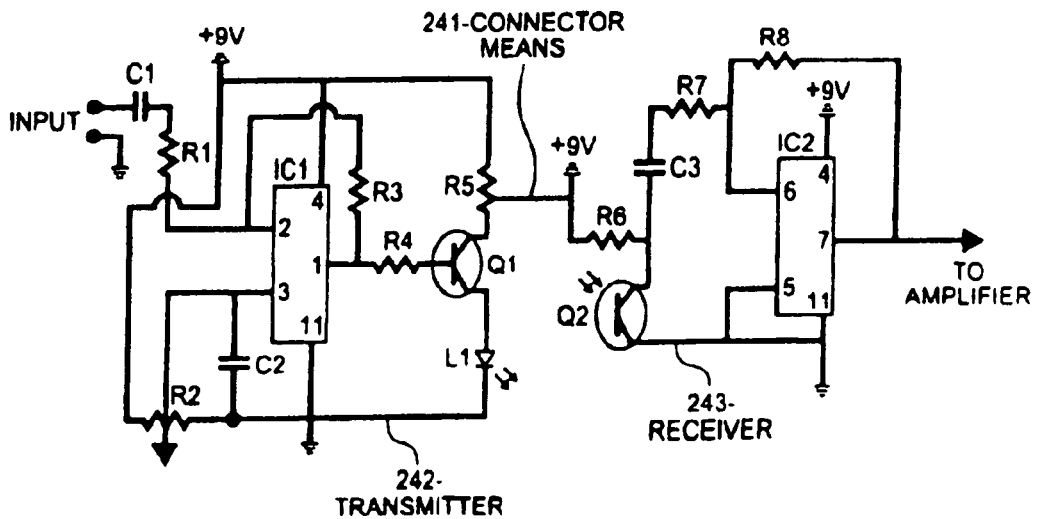
FIG. 21 is seen a transmitter and a receiver being configured with energy apparatus comprising a battery cell which may be charged wirelessly.

Referring to FIG. 21 is seen an exemplary embodiment of a transmitter 242 and 311, and a receiver 243 and 312. The amplifier is seen responsive to signal communications. Transmitter 242 is operatively configured with receiver 243 and communicatively connected to connector beam 244 responsive to communication network connections. The amplifier comprises a chip communicatively connected to receiver 243 and operatively configured with transmitter 242. The transmitter 242 and 311, and the receiver 243 and 312 comprise CMOS comprising of solar cells on n-type CZ silicon substrates, including Polycrystalline thin-film cells, lightly boron-doped CZ, or gallium-, indium-, and aluminum-doped CZ for converting solar energy, pressure force, sound wave, vibration, wind force into electrical energy. Disclosed embodiments further provide a thin-film comprising of thin layer of transparent conducting oxide, including tin oxide. Certain embodiments provide the oxides being highly transparent and configured to conduct electricity efficiently. Some embodiments provide antireflection coatings.

Other embodiments provide Polycrystalline thin-film cells comprising tiny crystalline grains of semiconductor materials operable for converting solar energy into electrical energy. At least a CPU-1C1 is provided in communication with RFID chip reader-1C2. L1 and L2 are LED. S1 is an automatic momentary single pole double throw switch operative for transmitting and for receiving signals. C1 is an electrolytic capacitor being disposed on an energy platform comprising C2 and C3, which are IMF capacitors. Q1 and Q2 are infrared LED emitter and M1 is a speaker microphone. R1 through R10 are resistors responsive to signals. Disclosed embodiments provide a digital signal processing system which allows reconfiguration of signal transmission to the environment and signal conditions. At least the antenna is developed for electrical operation, which can be reconfigured in terms of frequency and may also increase or decrease its directivity. The increase and/or decrease of signal directivity is a measure of the gain of the antenna in a particular direction. Disclosed embodiments provide the communication apparatus being configured with the antenna to operatively pick up faint signal by increasing its gain or overcome interference by creating a null point. Certain embodiments provide a smart communication apparatus being configured for any given network or environment. Some embodiments provide a miniaturized adaptive micro antenna in communication with at least a chip being configured for signal amplification and to minimize interference and maximize intended signal reception. Disclosed embodiments provide signal booster chip comprising of at least a MEMS, in communication with a logic circuit. The MEMS further comprises MEMS based phase shifters being configured on at least a single silicon substrate microfiber comprising communication control circuitry. The sensors are being coated with silicon substrate polymer and/or with zinc oxide layer to provide energy transport platform. Certain embodiments provide communication apparatus comprising silicon substrate microfiber configured with optical properties of thin films being operable for the advancement of the integrated circuit for converting solar energy into electrical energy. Disclosed embodiments further provide smaller feature sizes, faster switching speeds, and lower power consumption apparatus. Some embodiments provide basic wiring such as dielectric and photolithographic layers, providing a circuit for electrical energy production. This integrated circuit could employ copper/low-k interconnects, silicon-germanium and silicon on insulator-based transistor structures. Infrared spectroscopy is provided and offers metrology approach to sensing through the display/input device/outfit, complementary to UV-VIS techniques that provide excellent sensitivity to layer composition, including chemical bond densities and free carriers with the enhanced immunity to roughness induced scattering.

Figure 22:
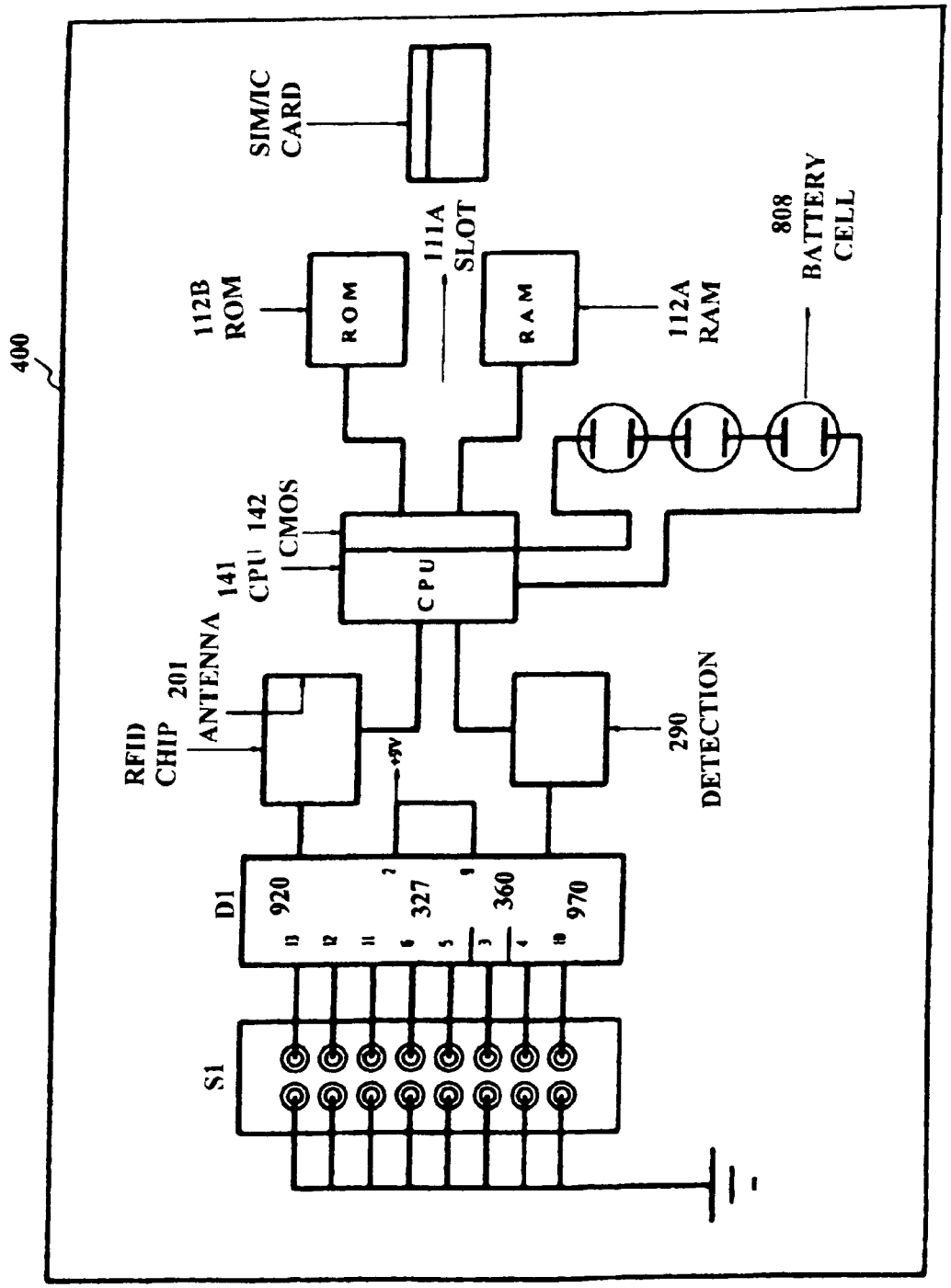
FIG. 22 is seen an embodiment comprising the circuit diagram of the communication apparatus, including a privacy indicator.

Referring to FIG. 22 is seen an embodiment of the circuit diagram of the communication apparatus comprising a privacy indicator. Switch (S1) is communicatively connected to RFID CHIP for signal amplification. Certain embodiments provide a common node display (D1) comprising touch screen operatively configured with multifunctional sensors 970. The display device is further operable for generating energy. RFID CHIP is operatively configured with antenna 201. A CPU 141 is operatively configured with detection device 290 communicatively connected to at least a CMOS 142. The detection device is responsive to detection signal communications and operatively connected to a battery cell 808. The communication apparatus 400 further comprises an IC and/or SIM card slot 111A. Embodiments further provide user identification card 112. The communication apparatus 400 comprises operating system consisting of software operatively configured with ROM 112B to read the ID card 112. The ROM 112B is communicatively configured to provide communications to the RAM 112A. The RAM 112A is responsive to communication database 113 where information may be stored or retrieved. A screen read-out 113A is provided configured with the communication apparatus. An 8-pin privacy indicator switch (S1) is operatively configured with the communication apparatus 400 and responsible for providing private communications. Switch (S1) comprises of display selections corresponding to cathode A, cathode G, and cathode D of at least a 7-segment common anode display settings (D1). Chip 200a comprises a detection tool responsible for providing communications to at least a network. The IC and/or SIM card 112 is further operable with the communication apparatus 400, comprising wireless communication applications in communication with a software program.

Figure 23:
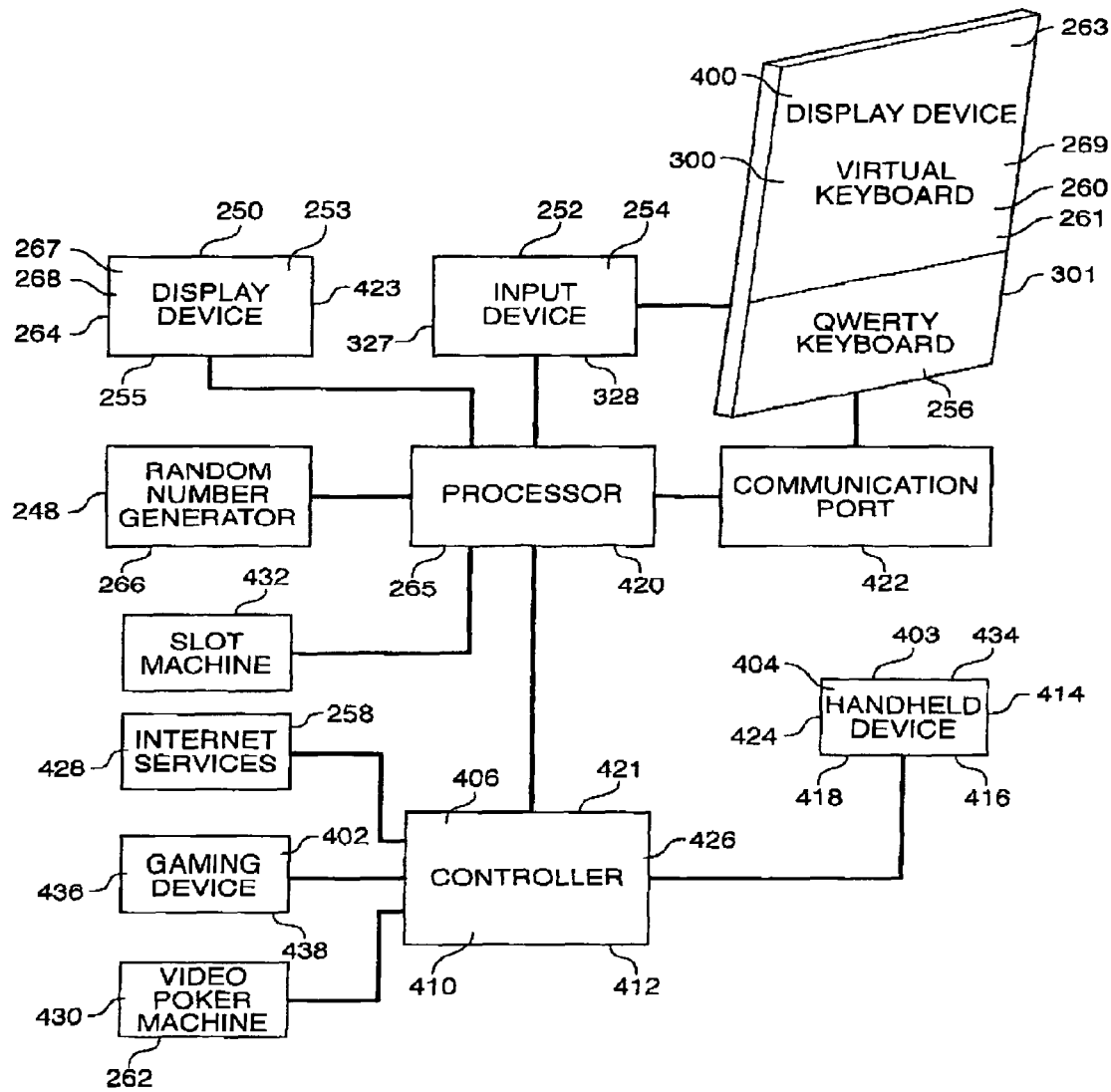
FIG. 23 is seen further exemplary embodiment of the communication apparatus comprising at least an input device, including a keyboard.

Referring to FIG. 23 is seen an exemplary embodiment of the communication apparatus. The communication apparatus 400 comprises at least an input device 252, including a keyboard 254. The keyboard 254 may consist of a virtual keyboard 255 and/or QWERTY keyboard 256 in further communication with a random number generator 248. At least a social network application 258 is configured with the keyboard and in communication with the processor 420. Disclosed embodiments further provide the keyboard being disposed on an LCD display screen 260 being configured with sensors 327 operable for object recognition. Certain embodiments provide the sensors 327 being configured for video recognition 262. Some embodiments provide the communication apparatus configured with a display device 260 operable with at least an activation button 264 configured for at least one of: phonebook 266, calendar 268, dictionary 267, calculator 265, and camera 263. Disclosed embodiments further provide the communication apparatus further comprising at least one of: a mobile communication device 400, a gaming device 402, a media device 403, and an interface device 404. Disclosed embodiments provide the interface device comprising at least an integrated phone/PDA 400 being configured with integrated connectivity apparatus 406 operable to provide global roaming. At least a communication port 422 is provided with the communication apparatus 400. Certain embodiments of the disclosure provide the communication apparatus comprising a GSM phone 400 being operable on plurality microprocessors 420. Certain embodiments provide the communication apparatus being operable to allow multiple inputs/outputs 252. Some embodiments provide the communication apparatus comprising a touch interface 261 operable on a touch screen 260 configured for at least one of: interactive communication, interactive gaming, music, video, and phone book.

Yet other embodiments provide the communication apparatus being configured with at least a slider 253 operable to access multimedia buttons and/or numeric keypads being configured with piezoelectric sensors 327. The piezoelectric sensors 327 further comprise crystals 328 configured to provide voice operations and/or voice over text applications. Disclosed embodiments provide the communication apparatus being configured with voice over text technology operable to provide hands free texting applications while driving. Still, other embodiments provide a communication apparatus comprising of carbon fiber 408 and/or silicon substrate microfiber consisting of resistive touch screen 260 and/or character recognition 269 and/or a communication board 300. Certain embodiments provide housing 301 for the communication apparatus 400 comprising a carbon fiber 408 and/or a silicon microfiber. Disclosed embodiments further provide a communication apparatus being configured with at least a WAP browser 410 and/or an integrated GPS device 412 and/or an MP3 music device 414 and/or a camera apparatus 416 and/or an internal antenna apparatus 418 being configured with a controller 421 in communication with a predictive text messaging applications 423. Certain embodiments provide the communication apparatus 400 being configured with at least one of: infrared sensor 326, calendar 268, FM radio 424, Bluetooth technology 426, and GPRS Internet services 428. Disclosed embodiments further provide the communication apparatus 400 comprising a video poker machine 430 and/or a slot machine 432, and/or a handheld device 434 and/or a gaming device 436 and/or a play station 438 in communication with communication port 422.

Figure 24:
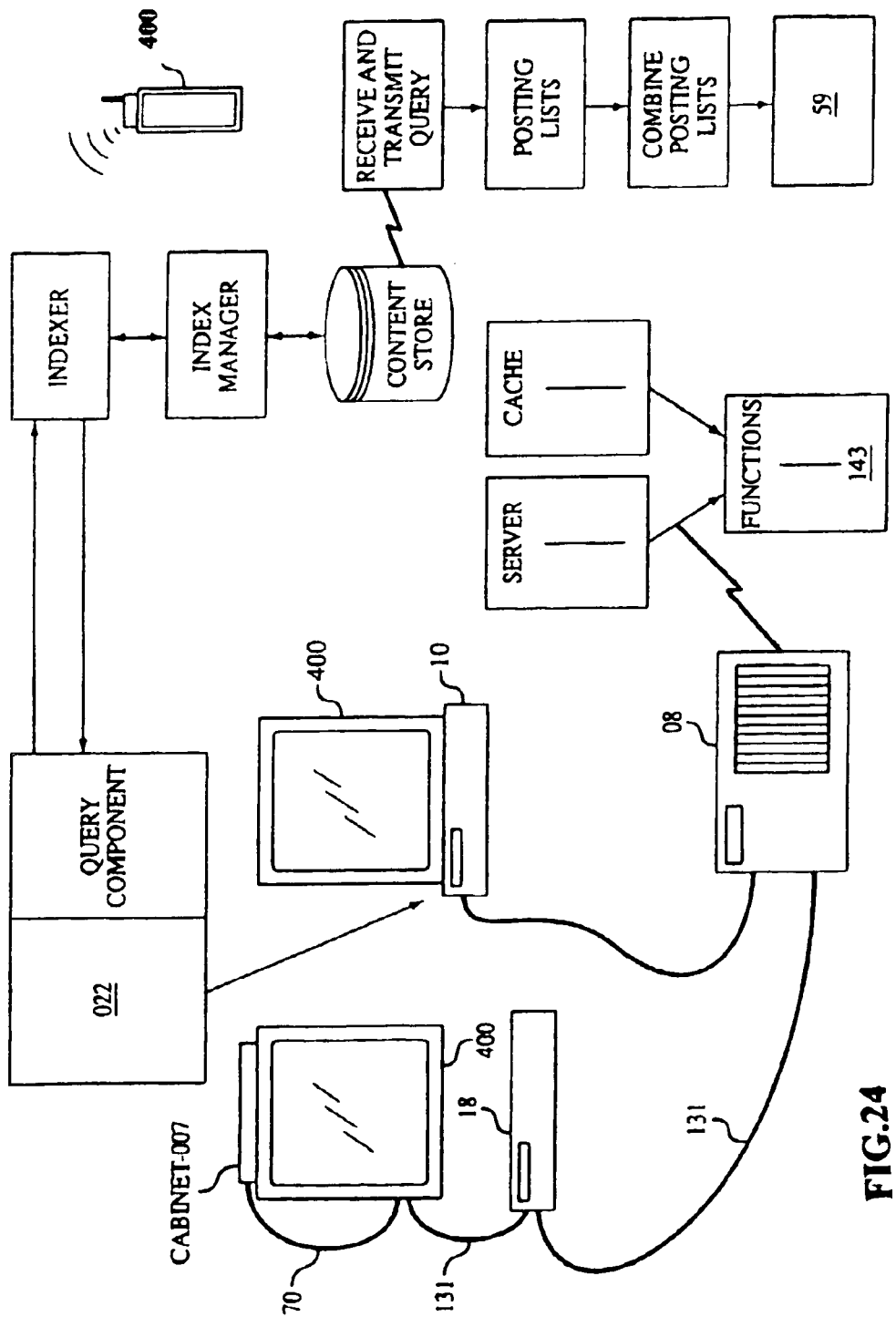
FIG. 24 is seen an exemplary embodiment of a network environment in association with the communication apparatus in communication with an output device.

Referring to FIG. 24 is seen an exemplary embodiment of a network environment, comprising a communication apparatus 400 in communication with an output device 70. The communication apparatus further comprise a computer system 10 being configured with a readout tool 008 in communication with an address book 131. A network terminal 022 is provided in communication with a query component. The query component is configured with an indexer in communication with an index manager. Embodiments further provide a network environment comprising a server and a cache engine in communication with functions 143. The functions 143 further include social network environment being operable to receive and transmit communications to at least one of: a memory, a cabinet 007, and/or a content store. Certain embodiments provide the communication apparatus comprising a memory consisting of a content store in communication with an input device. The input device is further operable to receive and transmit query, and in communication with posting lists and/or combine posting lists. At least a display adaptor is communicatively connected to the posting lists.

Figure 25:
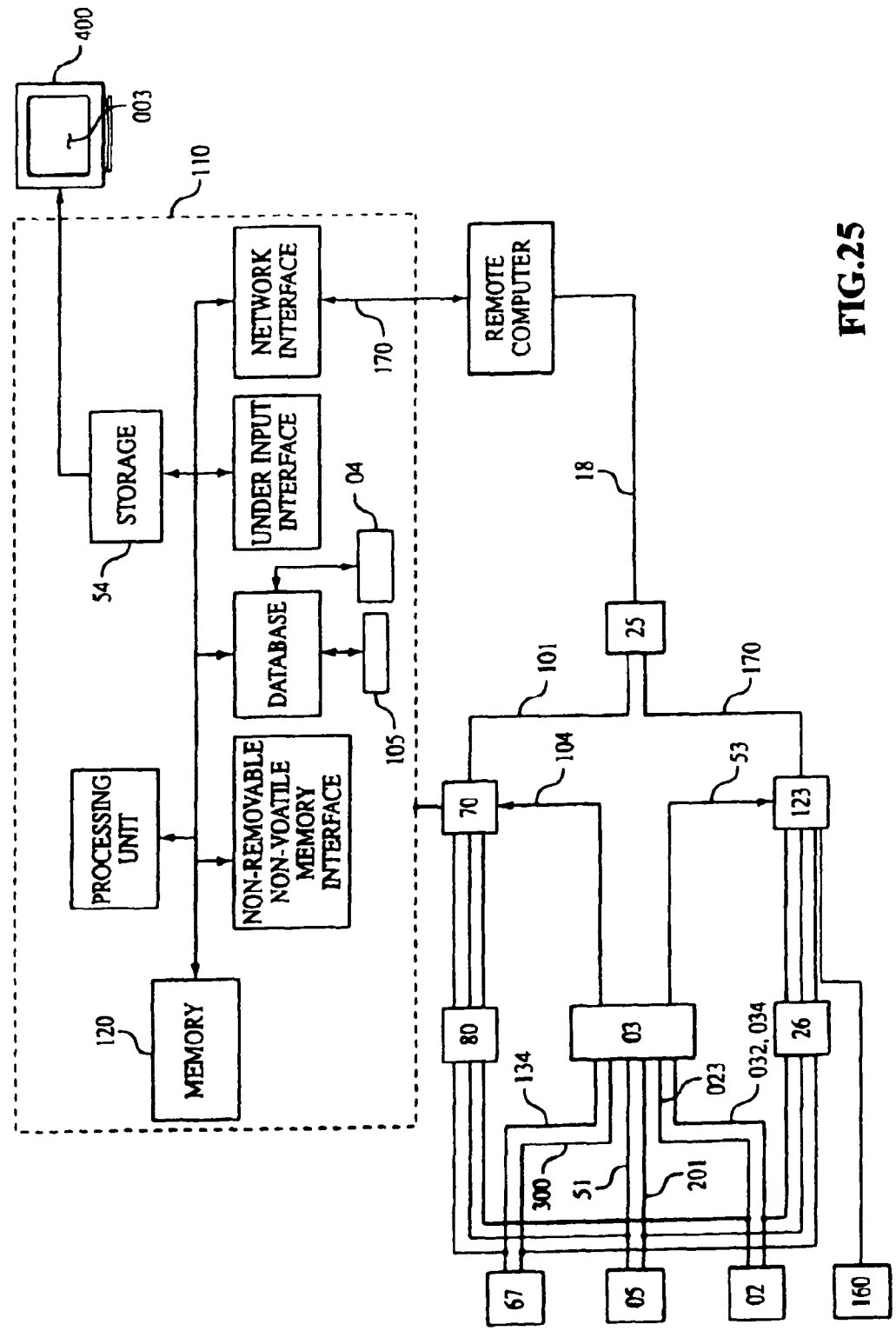
FIG. 25 is seen further exemplary embodiments of the communication apparatus in a structured environment.

Referring to FIG. 25 is seen further exemplary embodiment of the communication apparatus 400 comprising, storage medium 54, a processing unit 122 in communication with a memory device 120. Disclosed embodiments further provide a non-removable non-volatile memory interface, a database, input interface and network interface 170. Certain embodiments provide a communication apparatus comprising hardware 105, a graspable hardware/browser 04, and a display device 003. Other embodiments provide a communication apparatus 400 comprising software 300, central processor 51, a RAM 05, a ROM 02, a network adaptor 160, and a media device 201. Disclosed embodiments further provide a communication apparatus 400 comprising at least an output device 70, a remote computer in communication with a connection key 25. The connection key is further in communication with industrial files 18, network files 110, decision engine 123, graphic user interface 101, sensors 104, and system memory 53. Certain embodiments provide a communication apparatus being further configured with system bus architecture 67 in communication with an input device 80. Some embodiments provide the output device 70 further comprises a report generator 134 in communication with an instruction program 26. At least a CPU 03 is provided, in communication with a java class 023, a clickn Vest Servlet class 032, and a Servletrunner application 034.

Figure 26:
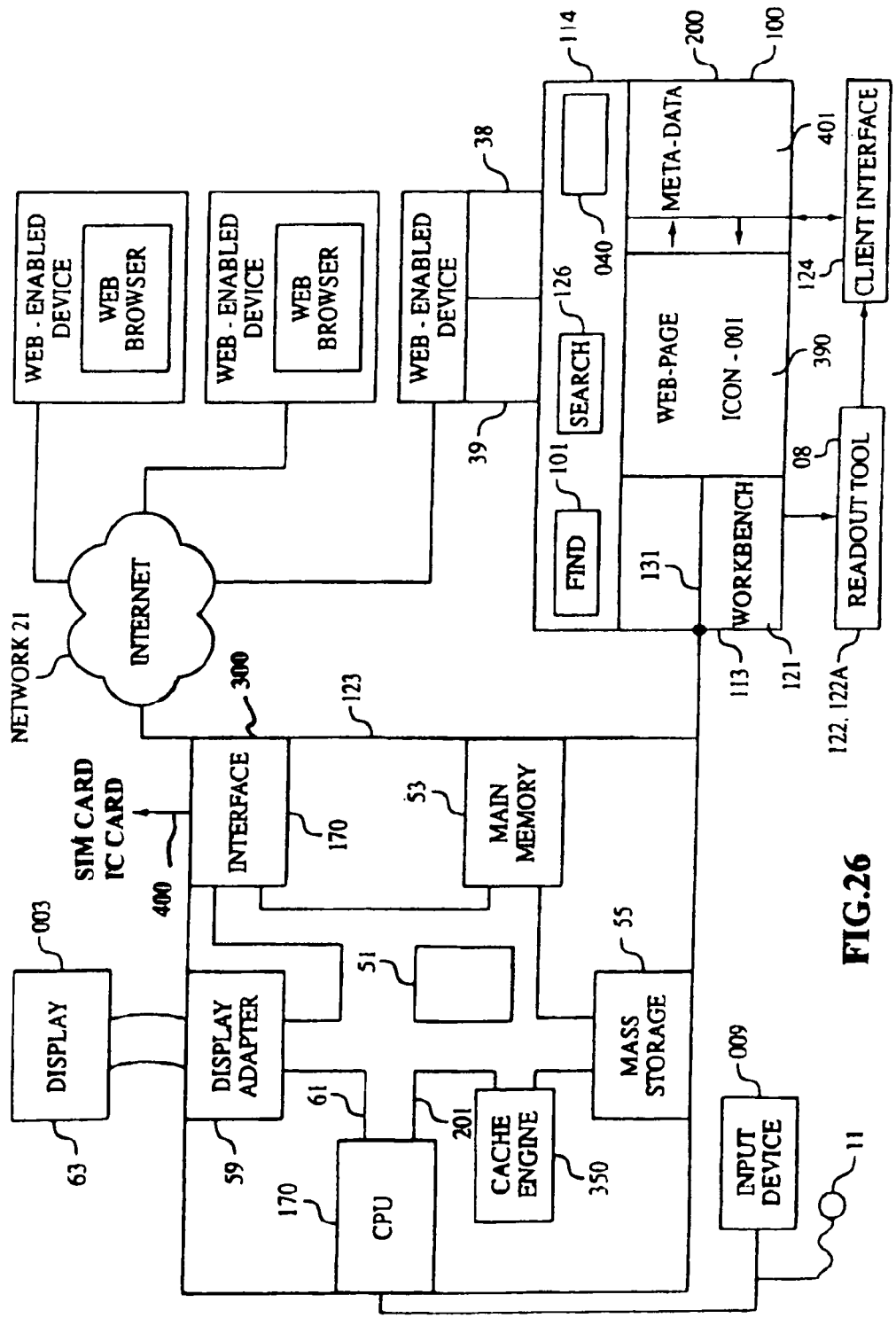
FIG. 26 illustrates further exemplary embodiment of the network comprising multiple computer system configured for Internet applications, further includes a decision engine, a wireless device and a server system for the network.

Referring to FIG. 26 is an illustration of a network environment comprising a communication apparatus 400 in communication with a computer system comprising a display device 003, a sound card 61, speakers 63, a cache engine, a network interface 170, a display adapter 59, intelligence logic 350, a media device 201, and a central processor 51. The communication apparatus further include an input device comprising at least a keyboard 009 and a mouse 11. The communication apparatus further include an IC card, SIM card, and interface. The CPU is operable with the intelligence logic to process commands and applications, in communication with memory 53, decision engine 123 and web-enabled devices. The network 21 is responsive to communications through the Internet. Certain embodiments provide a communication apparatus being configured with a browser, a server search report 39, and client search programs 38. Disclosed embodiments further provide a communication apparatus configured with graphic user interface 101, a search program manager 126, a browser 040, an ICON 001, and a storage medium comprising at least a meta-data 114. At least a web-page manager is provided comprising addresses 131, corporations 200, industries 100, schools and ware houses 121 and a workbench 113. The computer system further comprises an affinity analyzer 122, a data analyzer 122A, a readout tool 08, a web-page 390, a report generator 124, files 401, and client interface being operable with software application 300.

Figure 27:
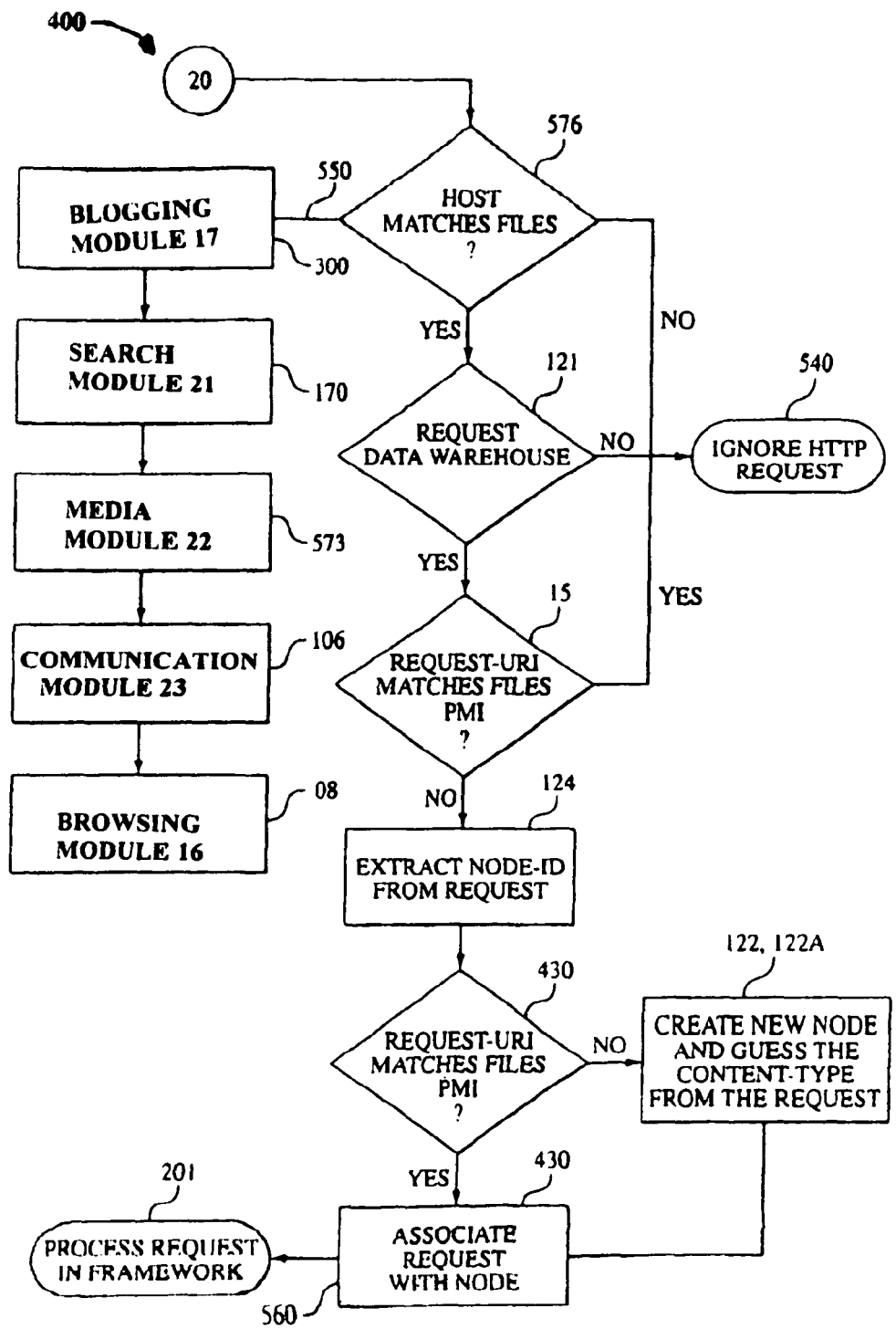
FIG. 27 is an exemplary embodiment of intelligence logic for the communication apparatus, comprising a blogging module configured with the session layer and software.

Referring to FIG. 27 is an illustration of the intelligence logic for the communication apparatus 400, comprising a blogging module 17 configured with the session layer 550 and software 300, a search module 21 in communication with network interface 170, a media module 22 with signal booster chip 573, a communication module 23 in communication signal booster chip 573 and antenna circuit 106, and a browsing module 16, in communication with a readout tool 08. At least a file memory is provided in communication with the software 300. A data warehouse 121 is communicatively connected to the search module 21 being configured with a primary memory interface "PMI" in communication with primary programs 15. Disclosed embodiments further provide a communication apparatus configured with a client identification node "ID NODE" in communication with affinity analyzer 122 and data analyzer 122A. The media module is communicatively connected to the media device 201, and the search module is communicatively connected to HTTP report generator 124 in communication with presentation layer 540. Some embodiments provide a communication apparatus configured with a default gateway 430 in communication with a transport layer 560. Certain embodiments provide the communication apparatus being operable on an energy platform 576.

Figure 28:
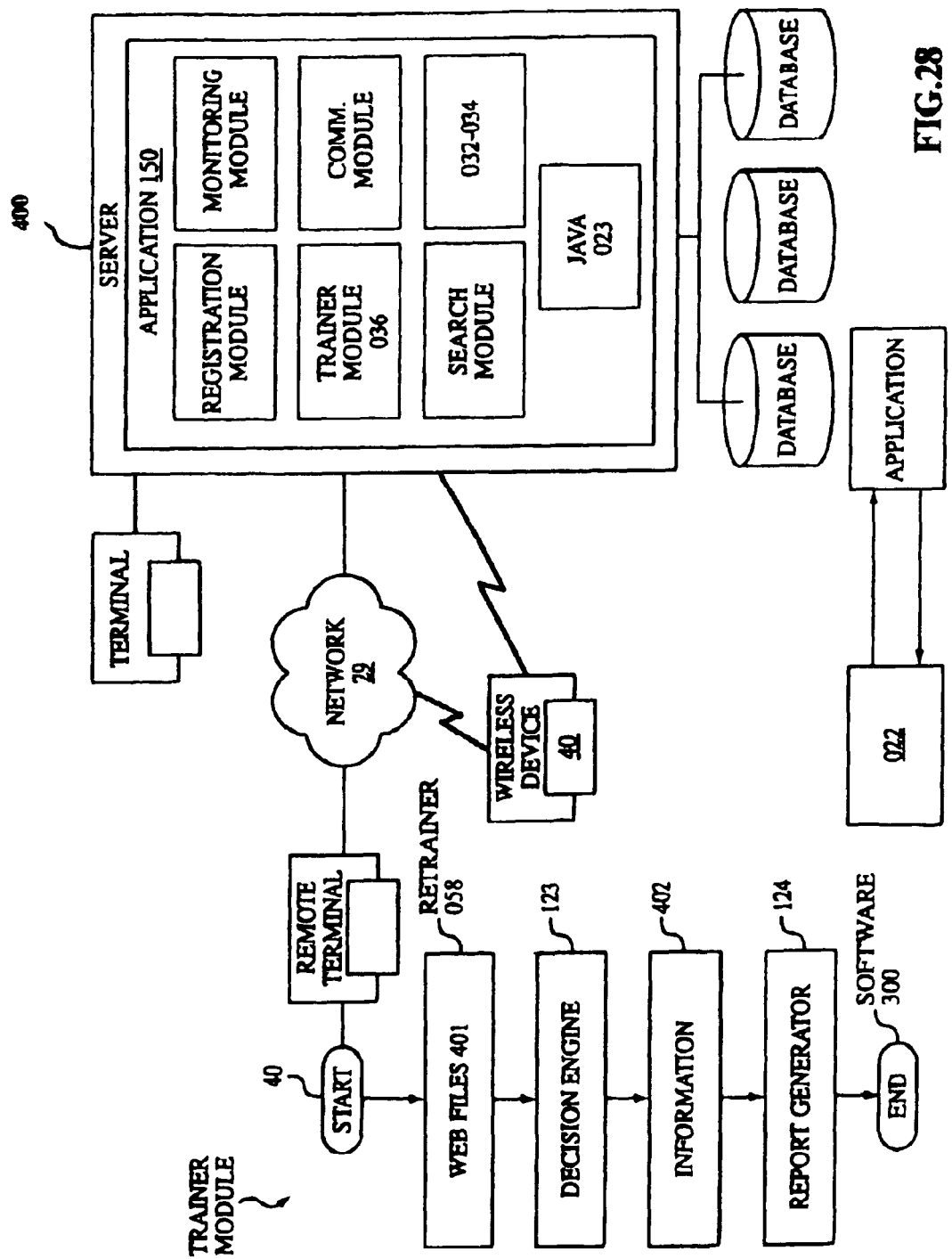
FIG. 28 illustrates an exemplary embodiment of a system for the network environment, comprising web-enabled devices in communication with the centralized transportation vehicle.

Referring to FIG. 28 is a further illustration of the communication apparatus 400 in a network environment 29, comprising at least a server application 150. The server application 150 further includes at least one of: a registration module, a monitoring module, a trainer module, a communication module, a search module, and/or java application software 023. Certain embodiments provide the java application software 023 in communication database. Disclosed embodiments provide the communication apparatus further comprises ports and/or terminals comprising a network terminal 022 in communication with at least an application. Certain embodiments provide the communication apparatus being turn on by at least a start button in communication with at least a control device 40. Other embodiments provide the control device 40 comprising a wireless device communicatively configured for communications with remote terminals. Disclosed embodiments further provide a communication apparatus comprising at least one of: report generator module 124, information module 402, retrainer module 058, web-files module 401, a clickn Vest Servlet class 032, and a Servletrunner application 034, and/or a decision engine.

Figure 29:
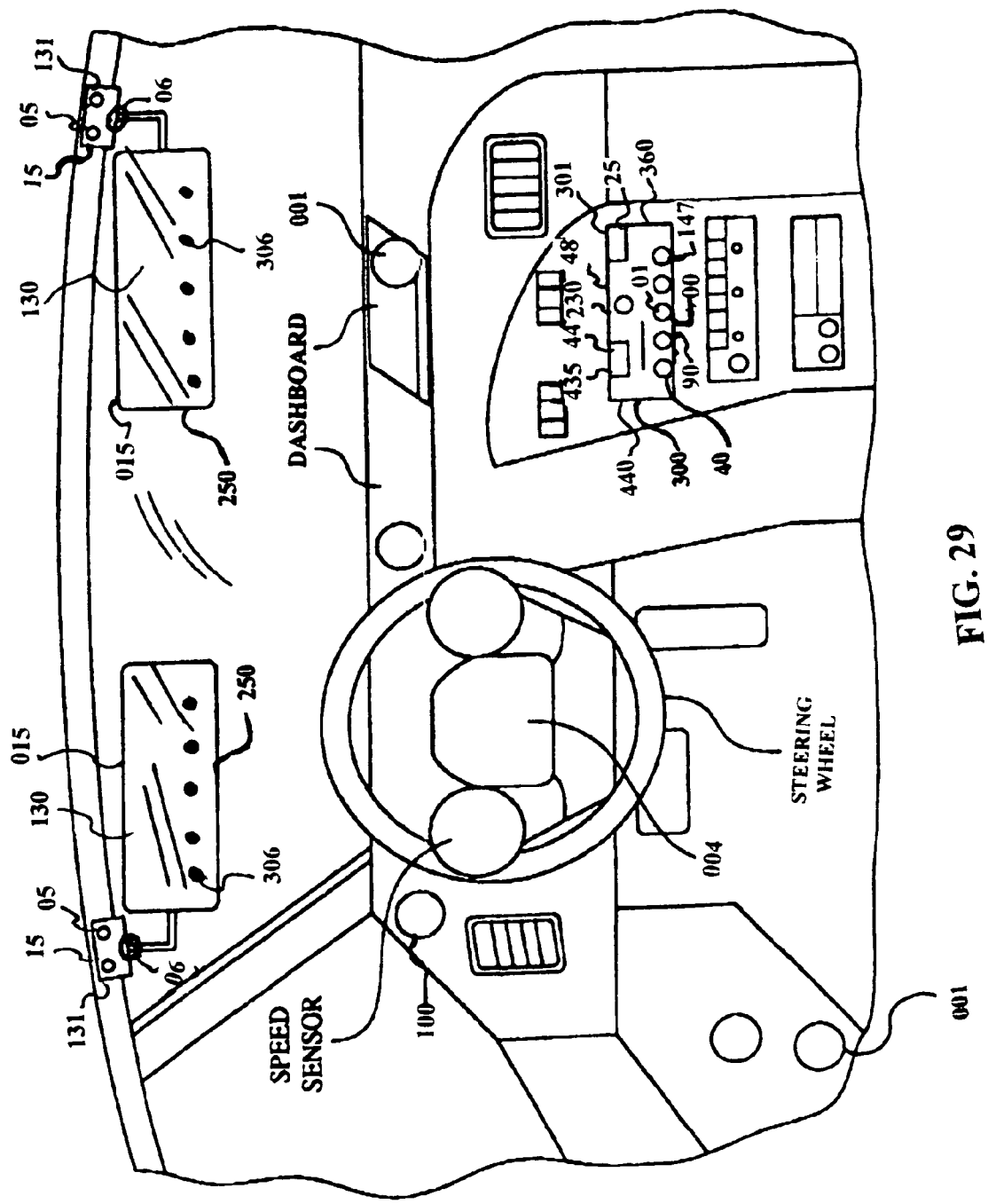
FIG. 29 is an exemplary embodiment of the megatel device, the monitor screen, the speaker means and the steering wheel, seen mounted in locations common to normal vehicle operations.

Referring to FIG. 29 is seen an exemplary embodiments of a communication apparatus comprising entertainment means, a radio means, a cell phone means, a paging means, an Internet means, a sun-visor monitor screen means. Embodiment transmits and receives signals in relation to responding to a wireless communication through the megatel device 300, further comprises a hand's free device being operable for safer cell phone communication through a media and radio device. Embodiment further provides a vehicle 700 being disposed with a media device 300 comprising a body 301 comprising at least one of: a cassette player 435, a CD player 440, an input device 230, and a phone slot 25. The media device being operatively configured with a control device 40 comprising at least one of: various mode buttons 90, Internet button 00, self-test button 44, a base sensor 360, a send button 48, an input/output terminal 01, and a signal booster 147. The signal booster 147 is operatively connected to antenna apparatus 100. Embodiment further provides a control device being operable on a sun-visor screen 130. The sun-visor screen 130 further comprises at least one of: a mirror case 15, a cover 015, a sun-visor base 131, a monitor 250 being interactively operable, a microphone 306, and a speaker 001. The sun-visor may be operable on a mounting base comprising at least a ball joint 06. The speakers 001 could also be disposed on a steering wheel 004. Certain embodiment provide a communication apparatus consisting of sensory platform on a screen apparatus comprising a display device configured with touch screen methods comprising graphical user interface operable for determining commands.

Figure 30:
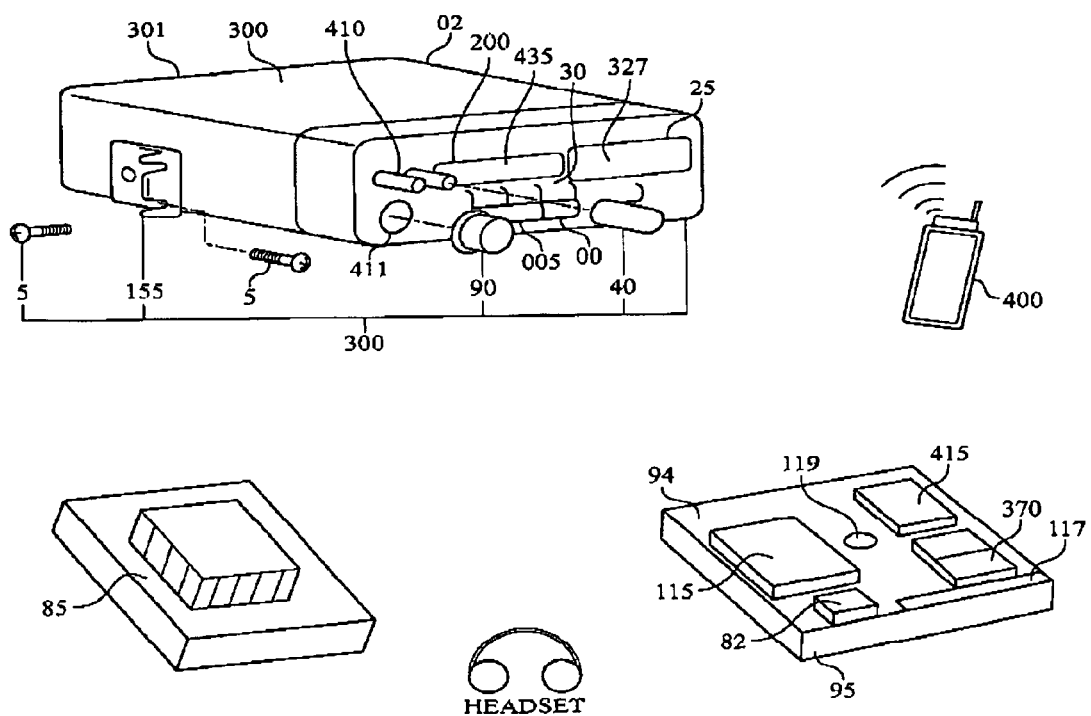
FIG. 30 is an exemplary embodiment of the interface unit for the media device and the cell phone device seen configured with the microprocessor, the megatel, the cell phone being configured with a metal base sensor.

Referring to FIG. 30 is seen an exemplary embodiments of the communication apparatus comprising a cell phone 400 in wireless communication with the media device 300. The media device 300 comprises a body 301 being supported by at least a mounting bracket 155 and secured by at least a fastener 5. The media device further comprises a radio device 410, input/output terminals 02, 911 emergency buttons 30, at least a 411 information button 49, various mode buttons 90, a push button for 005, Internet button 00 and at least a control device 40. The media device further comprises a player 435, a sensor 327, and a phone slot 25 being configured with the sensor 327. The cell phone is being operable on a circuit board 94 comprising a microprocessor 85, an interface unit 95, at least one of chip 119, 115, 117, and 370. At least a detector 82 is being operable with at least said one chip. A headset is operatively configured for communication with the cell phone 400 and/or the media device 300.

Figure 31:
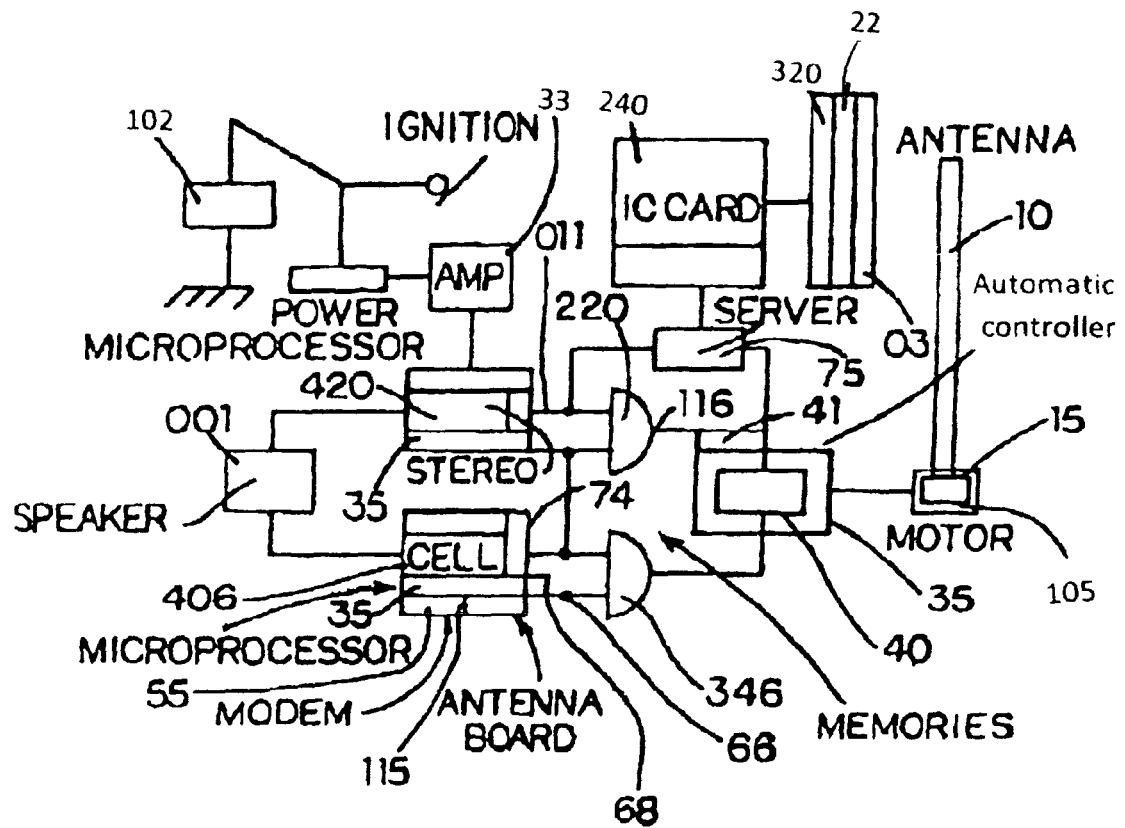
FIG. 31 is an exemplary embodiment of elements of the cell phone device circuit board being configured for the sequence of events which may occur during the operation of the communication apparatus.

Referring to FIG. 31 is seen an exemplary embodiments of a circuit board comprising memories 220, input/output terminal 03 remove-able/exchangeable IC card 240, a control device 40, a chip 115 communicatively connected to a logic circuit 346, and in communication with the antenna apparatus 10. The antenna apparatus comprises antenna board in proximity with a cell 406. The antenna apparatus is communicatively connected to the chip 115 operable with the logic circuit communicatively connected to a software program 116. The communication apparatus is in communication with the chip 115 being operable for signal amplification. Embodiments further provide media device configured with a mixer 35 and signal booster 33 in communication with a microprocessor 420. The microprocessor is further configured with a reset voltage switch responsive to incoming and out going signal communications. At least a speaker device 001 is operable with the communication apparatus. The media device is further configured with a radio modem 55 being operable with a hook-up control device 41 in communication with the communication apparatus. The hook-up control device is operatively connected to a dialer 68 configured with a dialer 74 and operable with the I/O terminal 03. Some embodiments provide a read only memory "ROM" 320 in communication with the IC card and/or the signal oscillator 22. At least a line terminal 011 is provided operable with the server 75. Certain embodiments provide the antenna apparatus 10 being connected to an automatic signal controller being disposed with at least a motor comprising at least a mirror case 15 operable with a reflective circuit 105. At least an encoder is communicatively connected to the antenna board.

Figure 32:
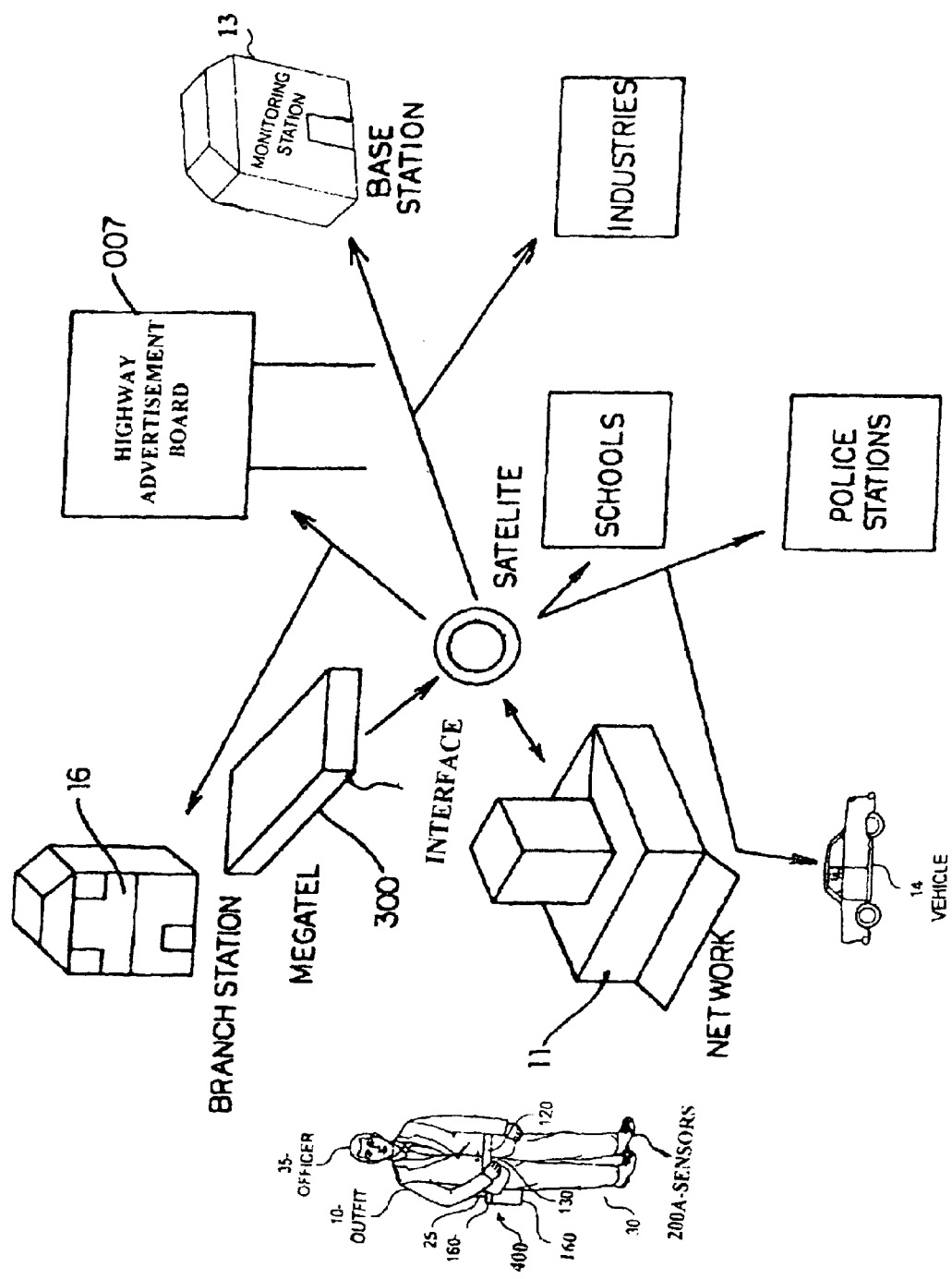
FIG. 32 is an exemplary embodiment of the device configured to communicate with various network interfaces.

Referring to FIG. 32 is seen an exemplary embodiments of a communication apparatus 400 in communication with a network environment. A person 35 is seen wearing a detection outfit 10 comprising of sensors embedded in silicon substrate and fused/etched in a microfiber material, the communication apparatus 400 is disposed in an outfit 160 comprising a housing being secured on the waist area 130 via a waist belt 120 by the person 35. The housing further comprises silicon substrate micro fiber being embedded with sensors and operatively configured for generating electrical energy. The communication apparatus 400 is communicatively configured with signal booster apparatus operable to prevent cancerous disease on the person 35. The communication apparatus 400 is further configured for network communications, including communicating with branch station 16 and/or the base station 13. The communication apparatus 400 comprises a detection platform being further configured with battery cells comprising power generator engine responsive to solar energy, vibration, sound, pressure force, and wind force. The detection platform is further configured with sensors embedded in silicon substrate micro fiber to detect traveling cancerous cells and/or circulating tumor cells "CTC" in cell phone user's blood through valuable information from perspiration. Disclosed embodiments provide the respective person 35 wearing outfits 10, 20, 30, 120, 160 and 130, further operable for detecting weapons of mass destructions. The person 35 is seen communicating through communication apparatus 400, and a second communication apparatus 300 is disposed in a vehicle 14. The communication apparatus 400 further comprises megatel 300 further comprising an interface device in communication with at least one of: a branch station 16, a highway sign 007, a base station 13, a satellite station, a school, a police station, a vehicle 14, and/or a network 11. The base station routes calls from communication apparatus 400 through a switching center, and the calls may be transferred to other cell phones, and other base station, including local land-line telephone system. With prior art devices the farther a cell phone is from the base station antenna, the higher the power level is needed to maintain the connection. This distance determines, in part, the amount of RF energy exposure to the user. Disclosed embodiment provide the detection platform comprising a cell-capture platform consisting of at least nano-structured substrates comprising silicon chip consist nano-tubs/nano-pillars being densely packed to provide effective sensory surface area to detect traveling CTC's. The cell capture platform further comprises at least a nano-chip device being configured to receive electric current to direct DNA probes from the detection platform to specific sites.

Figure 33:
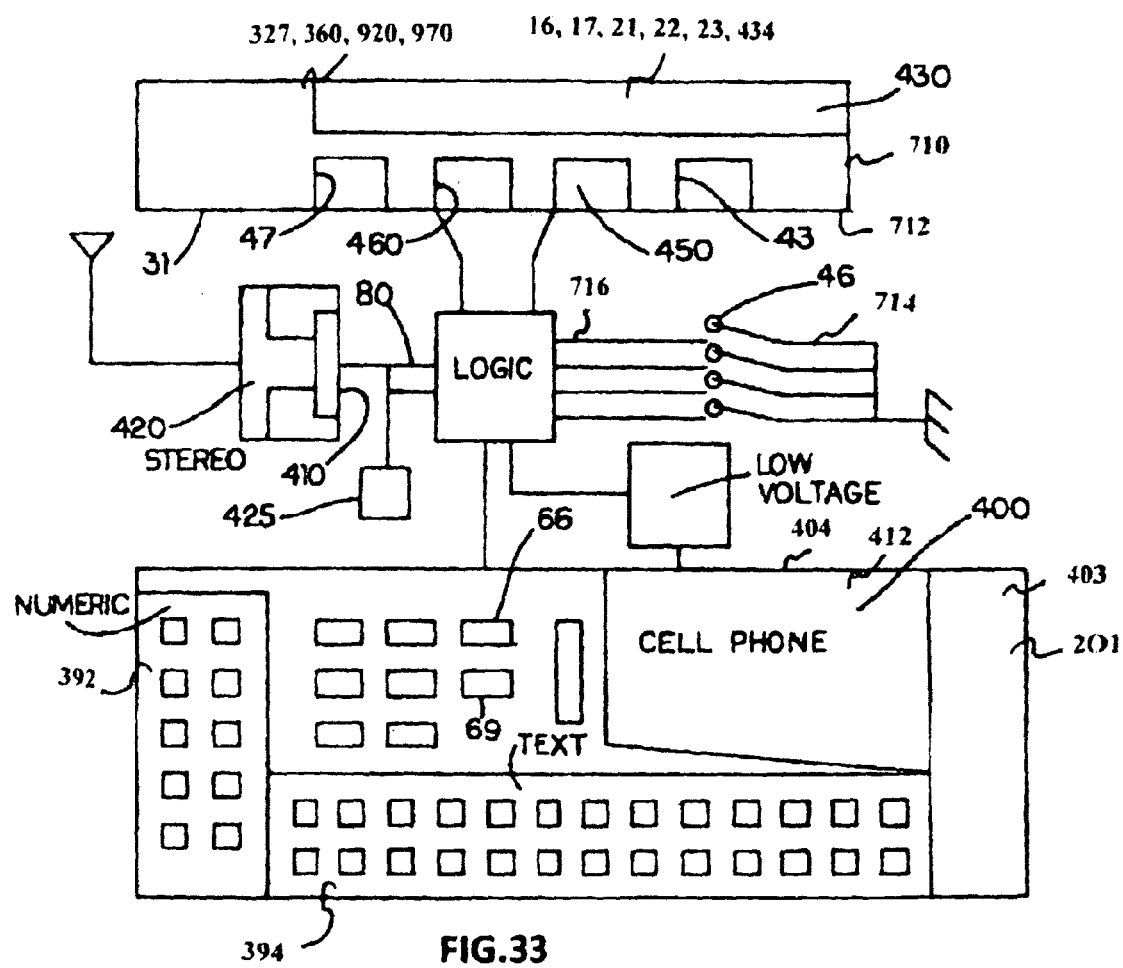
FIG. 33 is an exemplary embodiment of a circuit diagram of the logic interface configured for operation with the megatel, the cell phone and different components of the device.

Referring to FIG. 33 is seen exemplary embodiments of the communication apparatus comprising a cell phone 400 being configured with a numerical pad 392, a text pad 394, a dialer 69, and an encoder 66. Disclosed embodiments further provide communication apparatus 400 comprising methods and systems for generating and storing electrical energy. Certain embodiments comprise nano-materials 710 comprising microfiber material. Disclosed embodiments further provide sensors 327, 360 920 and 970 being embedded in silicon substrate 712 and fused/etched in the microfiber material 710 comprising materials with excellent electrical properties. The microfiber material 710 includes material components with nanometer dimensions in which at least one dimension is less than 100 nanometers. Some embodiments provide the microfiber materials being further configured with nano-wires/tubes 714. The nano-wires/tubes 714 being further embedded in the silicon substrate 712. Certain embodiments provide a communication apparatus 400 comprising the substrate 712, being configured with electrodes 716 in communication with the nano-wires/tubes 714. Other embodiments provide the nano-wires/tubes 714 comprising at least one component of: carbon char, carbon black, metal sulfides, metal oxides and other organic materials being alloyed with the microfiber material 712. The communication apparatus 400 further comprises a logic circuit in communication with at least one of: signal booster chip 403 in communication with antenna 201, display/input 404 comprising a touch screen 412, electronic switches 46, CPU 425, radio device 410, low voltage indicator, and/or a media device 420. The logic circuit is further connected to at least one of: a wireless Internet means 430, signal transmitting source 31, an encoder 47, at least an electro-optical-modulator 460, a demodulator 450, at least one module 16, 17, 21, 22, 23, 434, diodes 80 and/or a decoder 43.

Figure 34:
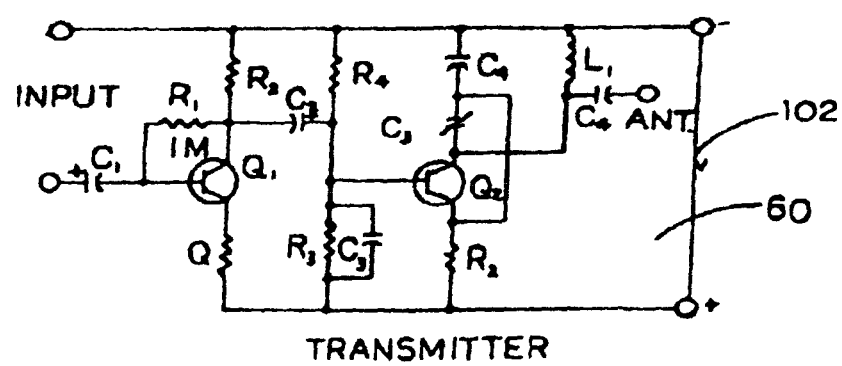
FIG. 34 is an exemplary embodiment seen to represent the circuit diagram of the receiver.

Referring to FIG. 34 is seen an exemplary embodiments of the circuit diagram for the receiver 70 being operable on low voltage 101. The receiver is operable for receiving communication signals.

Figure 35:
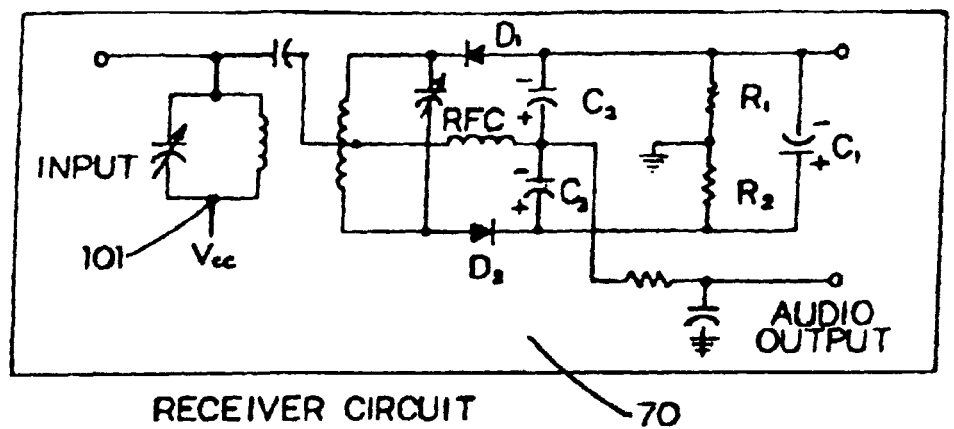
FIG. 35 is an exemplary embodiment seen to represent the circuit diagram of the transmitter.

Referring to FIG. 35 is seen an exemplary embodiments of the circuit diagram for the transmitter 60 being operatively configured with a preset voltage 102. The transmitter is operable for transmitting communication signals.

Figure 36:
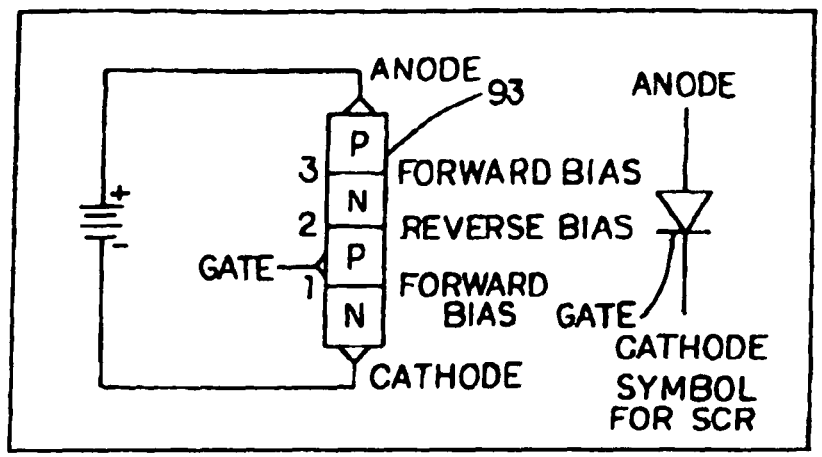
FIG. 36 is an exemplary embodiment seen to represent the block diagram of the control device switching circuit.

Referring to FIG. 36 is seen an exemplary embodiments of the communication control device comprising silicon controlled rectifier consisting of a p-type and n-type gates. The communication control device is further operable in forward and/or reverse bias mode 93. The silicon control rectifier is further operatively configured for signal amplification and/or communication signal booster. Disclosed embodiments further provide a chip comprising a CMOS operable on a digital circuitry. Certain embodiments provide integrated circuits (chips). The CMOS circuitry is operable to dissipate less power. Certain embodiments of the disclosure further provide a static logic configuration being operable on p-type and n-type metal-oxide-semiconductor field-effect-transistors "MOSFET's." for implementing logic gates. Embodiments provide a CMOS logic being implemented with discrete devices of transistors of both p-type and n-type on a silicon and or silicon substrate commonly called chips, dice, dies. Embodiments provide CMOS fabrication of solar cells on n-type CZ silicon substrates, including Polycrystalline thin-film cells, lightly boron-doped CZ, or gallium-, indium-, and aluminum-doped CZ. Disclosed embodiments further provide a thin-film comprising of thin layer of transparent conducting oxide, including tin oxide. Certain embodiments provide the oxides being highly transparent and configured to conduct electricity efficiently. Some embodiments provide antireflection coating. Other embodiments provide Polycrystalline thin-film cells comprising tiny crystalline grains of semiconductor materials.

Figure 37:
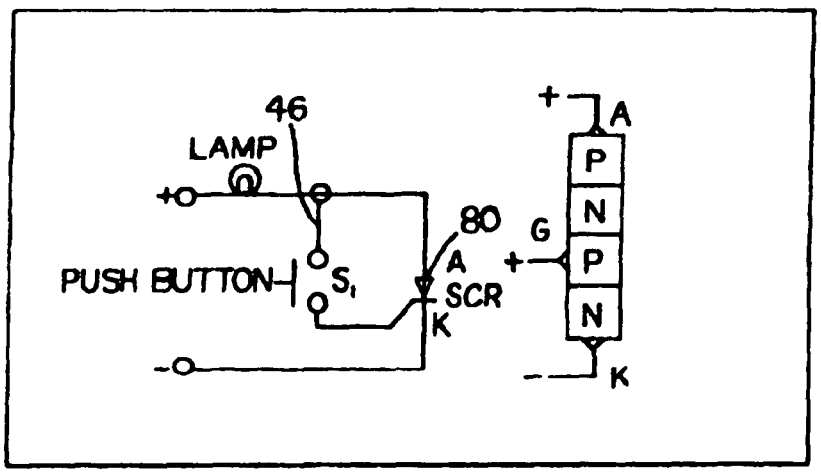
FIG. 37 is seen to represent a silicon control rectifier simple switching circuit for the control device.

Referring to FIG. 37 is seen an exemplary embodiments of the communication control device comprising silicon control rectifier being operable on a p-type and n-type gates. The silicon control rectifier is operatively configured with transistorized switches 46 in communication with a diode 80. The communication control device being further configured for interactive communications. Disclosed embodiments provide CMOS circuit that allows the implementation logic gates through p-type and n-type metal oxide semiconductor field effect transistors to create paths to the output from either the voltage source or ground. When a path to output is created from the voltage source, the circuit is pulled up. The other circuit state occurs when a path to output is created from ground and the output pulled down to the ground potential.

Disclosed embodiments provide CMOS circuits being constructed so that all PMOS transistors have either an input from the voltage source or from another PMOS transistor. The NMOS transistors have either an input from ground or from another NMOS transistor. Disclosed embodiments provide a PMOS transistor being operable to create low resistance between its source and the drain contacts when a low gate voltage is applied. Certain embodiments provide PMOS transistors for high resistance when a high gate voltage is applied. Some embodiments provide the composition of an NMOS transistor to create high resistance between source and drain when a low gate voltage is applied and low resistance when a high gate voltage is applied. Some embodiments provide communication methods using CMOS switch filter modules and switch duplexer modules for 3G smart phones. Disclosed embodiments further provide polycrystalline thin-film cells operable with an interface between two different semiconductor materials to create electric field. Certain embodiments provide heterojunction consisting of two different materials. Some embodiments provide comprising homojunction consisting of silicon solar cell.

When the voltage of input A is low, the NMOS transistor's channel is in a high resistance state. This limits the current that can flow from Q to ground. The PMOS transistor's channel is in a low resistance state and much more current can flow from the supply to the output. Because the resistance between the supply voltage and Q is low, the voltage drop between the supply voltage and Q due to a current drawn from Q is small. The output therefore registers a high voltage. On the other hand, when the voltage of input A is high, the PMOS transistor is in an off (high resistance) state so it would limit the current flowing from the positive supply to the output, while the NMOS transistor is in an on (low resistance) state, allowing the output to drain to ground. Because the resistance between Q and ground is low, the voltage drop due to a current drawn into Q placing Q above ground is small. This low drop results in the output registering a low voltage. In short, the outputs of the PMOS and NMOS transistors are complementary such that when the input is low, the output is high, and when the input is high, the output is low. Because of this opposite behavior of input and output, the CMOS circuits' output is the inversion of the input. The logic functions further involving AND and OR gates for manipulating the paths between gates operable by logic on the logic circuit. Disclosed embodiments further provide a method consisting of two transistors in series and both transistors to have low resistance to the corresponding supply voltage, modeling an AND. Certain embodiments provide a method consisting of two transistors in parallel and either one or both transistors having low resistance to connect the supply voltage to the output, modeling an OR. Embodiments provide CMOS switching method using high-resistivity silicon substrates processed circuit for high-performance silicon switch-based communication apparatus comprising 3G and 4G smart phones. Certain embodiments provide communication apparatus comprising cellular handset, wireless local area network (WLAN), CATV/broadband and aerospace and defense applications, wireless infrastructure.

Figure 38:
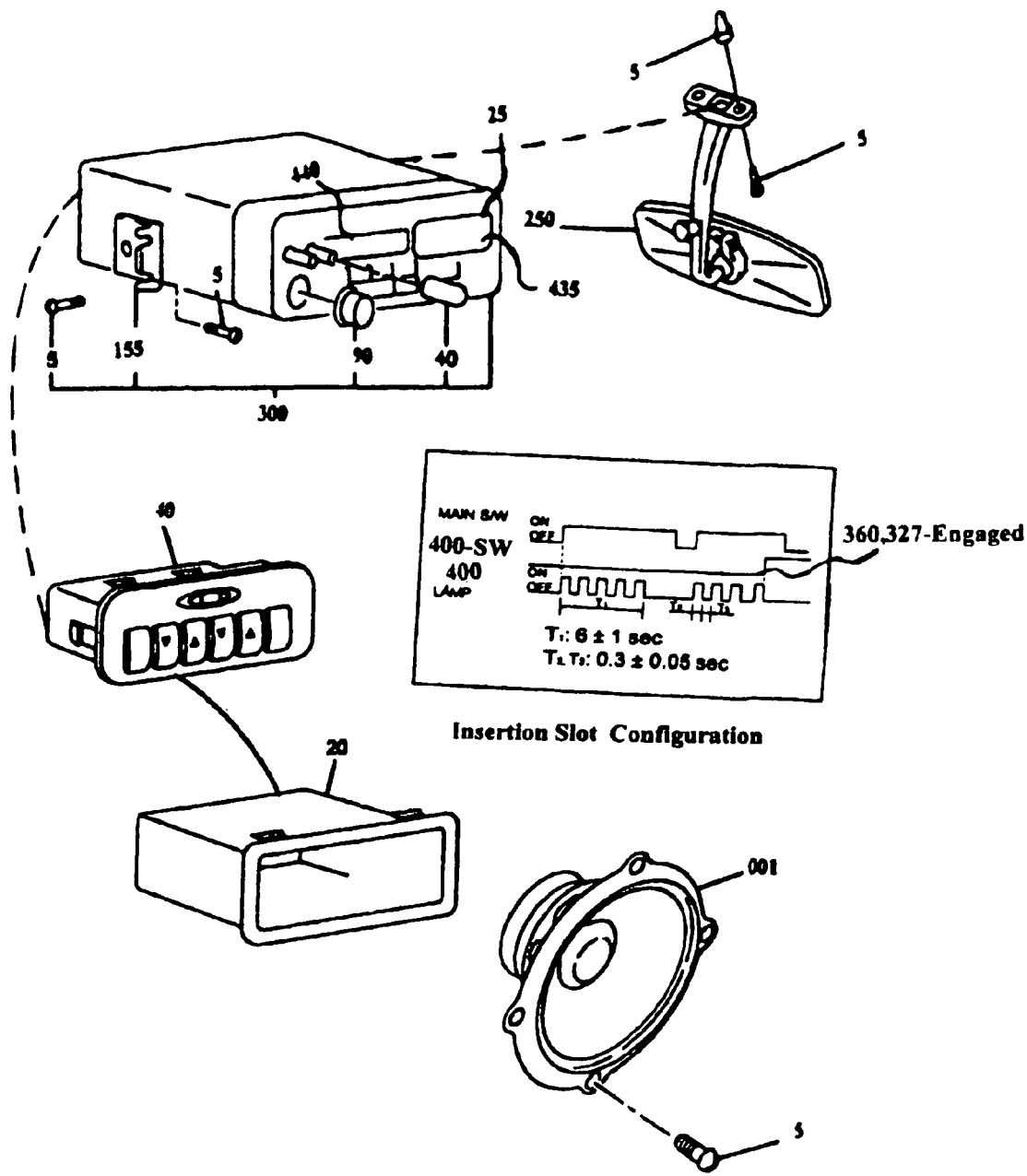
FIG. 38 is an exemplary embodiment of a diagrammatic view of the media device configured with a control device and a display.

Referring to FIG. 38 is seen an exemplary embodiments of the communication apparatus 300 being operable with a media device 440, 435, in communication with the communication control device 40. Embodiments provide the communication control device being secured on a housing 20 by at least a fastener 5. The communication apparatus further comprise the cell phone 400 operatively configured with sensors 360 in further communications with sensors 327 being disposed in side the media device. The media device is secured on at least a mounting bracket 90 by at least a fastener 5. The media device being further configured with at least a slot 25 communicatively connected to a sensor 327 in wireless communication with the cell phone 400. Certain embodiments provide the communication apparatus in communication with an enlarged monitor screen 250. Embodiments provide the communication apparatus operatively configured for communications through at least a speaker device 001.

Figure 39:
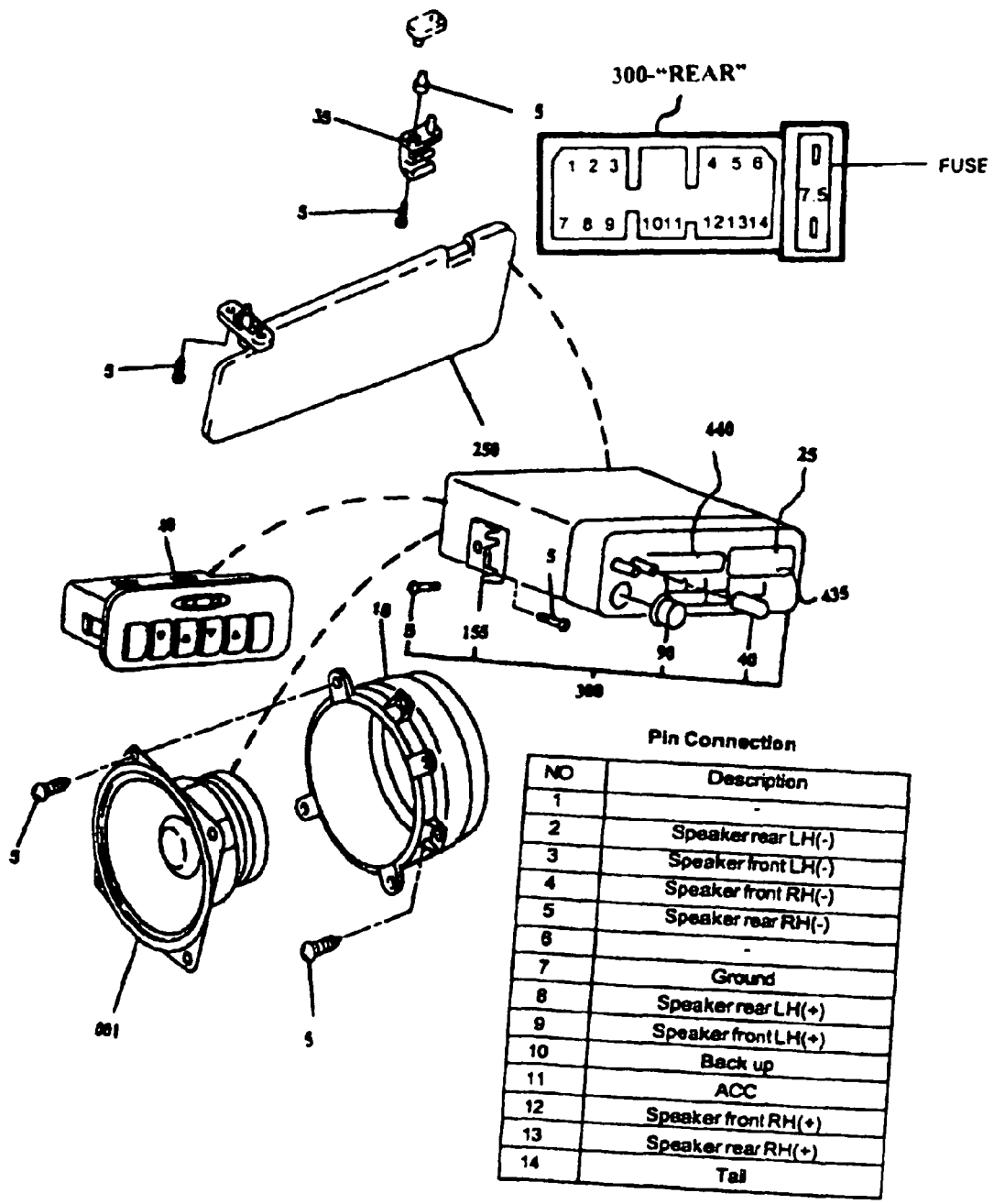
FIG. 39 is an exemplary embodiment of a diagrammatic view of the device configured with a speaker means, a control device, and a sun-visor monitor screen.

Referring to FIG. 39 is seen an exemplary embodiments of the communication apparatus 300 being operable with a media device 440, 435, in communication with the communication control device 40. Embodiments provide the communication control device being secured on a housing 20 by at least a fastener 5. The communication apparatus further comprise the cell phone 400 operatively configured with sensors 360 in further communications with sensors 327 being disposed in side the media device. The media device is secured on at least a mounting bracket 90 by at least a fastener 5. The media device being further configured with at least a slot 25 communicatively connected to a sensor 327 in wireless communication with the cell phone 400. Certain embodiments provide the communication apparatus in communication with an enlarged monitor screen 250. Embodiments provide the communication apparatus operatively configured for communications through at least a speaker device 001. The speaker device is secured in the housing by at least a fastener. Disclosed embodiments provide a protective fuse being operable to protect the device from transient pikes. In other embodiments, the monitor screen comprises at least one of: a mirror device, a visor device, each being firmly secured by at least a bracket 35.

Figure 40:
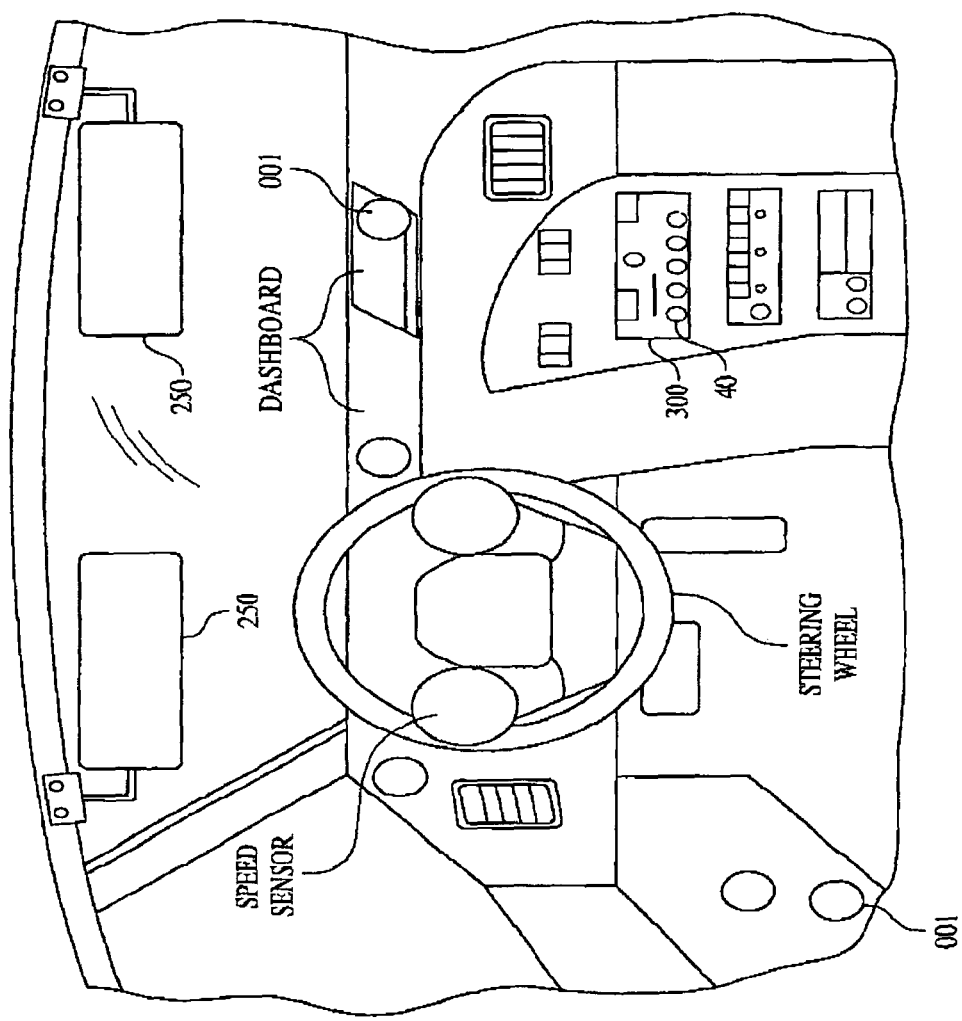
FIG. 40 is an exemplary embodiment seen to reflect sections of the interior part of a vehicle showing the dashboard, the megatel device configured with the control device, the speaker means and the sun-visor monitor screen.

Referring to FIG. 40 is seen an exemplary embodiments of the vehicle operatively configured with a dashboard, a steering wheel, and at least a speed sensor. The communication apparatus 300 is being safely secured on the dashboard. The Communication apparatus is operatively configured with the control device. The control device is further operable through the monitor screen 250. The monitor screen is operatively configured for interactive communications. At least a speed sensor is provided for monitoring when the vehicle is in motion and protect against any hands-on communications. The speaker 001 is communicatively connected to the communication apparatus and in communications with the monitor screen for providing audio/visual human voice auditory.

Figure 41:
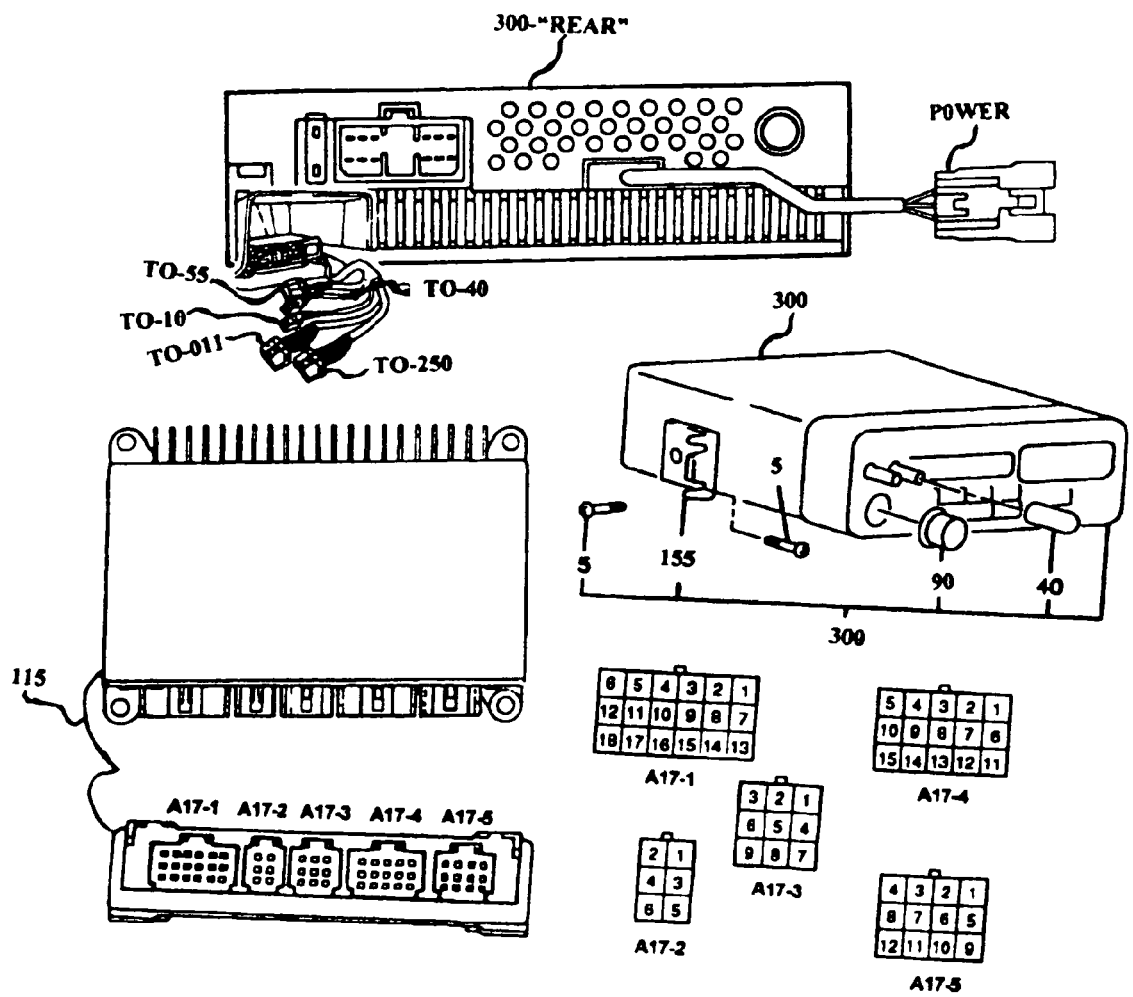
FIG. 41 is an exemplary embodiment of a chip operable with an antenna apparatus. The chip is communicatively connected to a communication apparatus.

Referring to FIG. 41 is seen further exemplary embodiments of the communication apparatus 300 which is being secured on a mounting bracket 155 by at least a fastener 5. The rear of the communication apparatus is provided with communication line to at least one of: line terminals 011, antenna apparatus 10, monitor screen 250, control device 40, and/or a radio modem 55. The control device is further configured with various mode buttons 90. Embodiments provide a communication apparatus 300, operatively configured with at least one chip 115, operable with antenna apparatus 10, operable with the communication apparatus 300. Certain embodiments provide plurality chips, A17-1, A17-2, A17-3, A17-4, and A17-5. Each said chip is operative configured for specific functions. At least one function comprises communication signal amplification. At least one function comprises logical operations. At least one function comprises signal analysis. At least one function comprises network connectivity. At least one function comprises voice enable applications comprising converting text data to human voice auditory. At least one function comprises voice enabled applications comprising converting human voice auditory into text data. At least one function comprises media communications. At least one function comprises. At least one function comprises entertainment applications. At least one function comprises wireless communications. At least one function comprises interactive communications, at least one function comprises graphic interface. At least one function comprises GPS communications. At least one function comprises traffic media.

Figure 42:
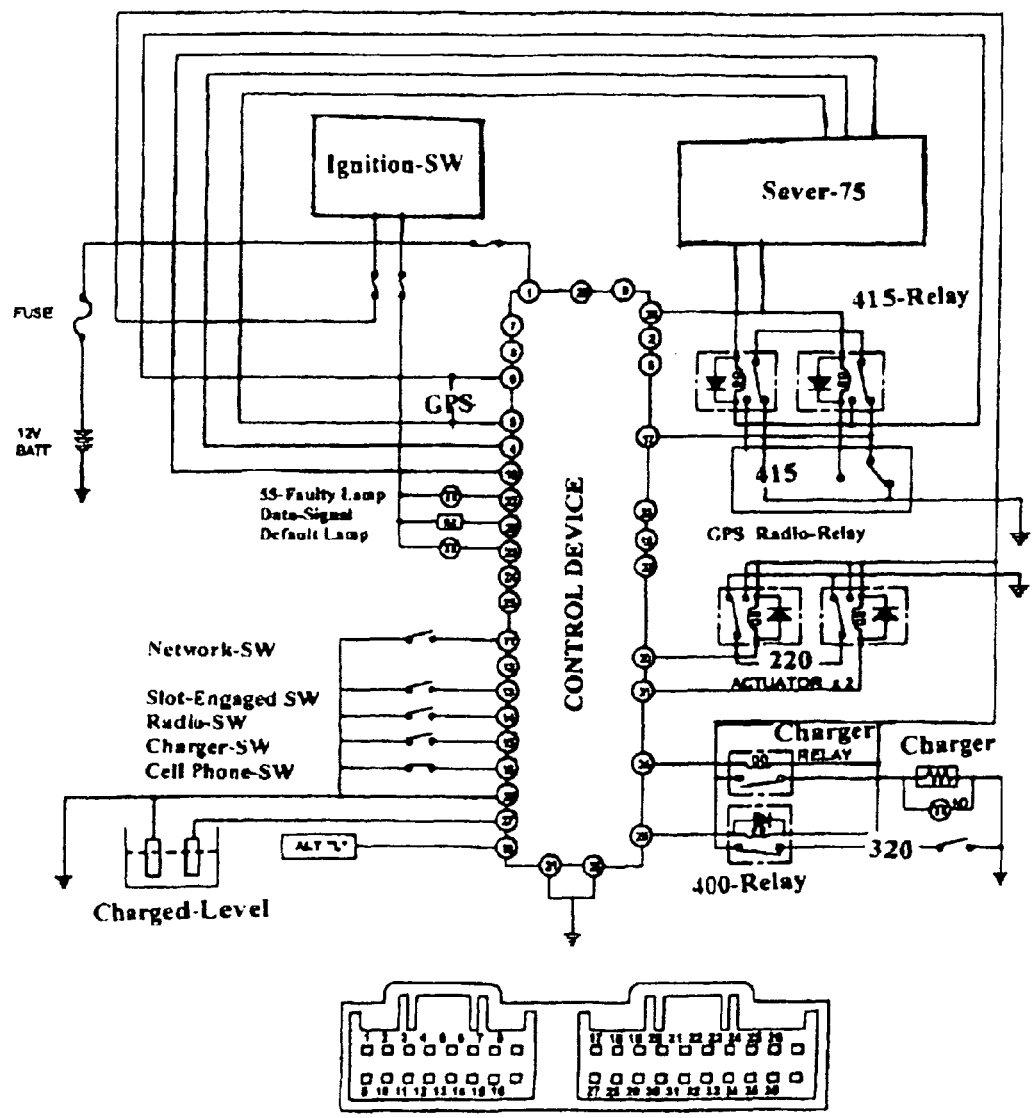
FIG. 42 is an exemplary embodiment of a circuit diagram comprising a platform array for the communication control device being communicatively connected to the communication apparatus being configured with a chip being operable for signal amplification.
Figure 43:
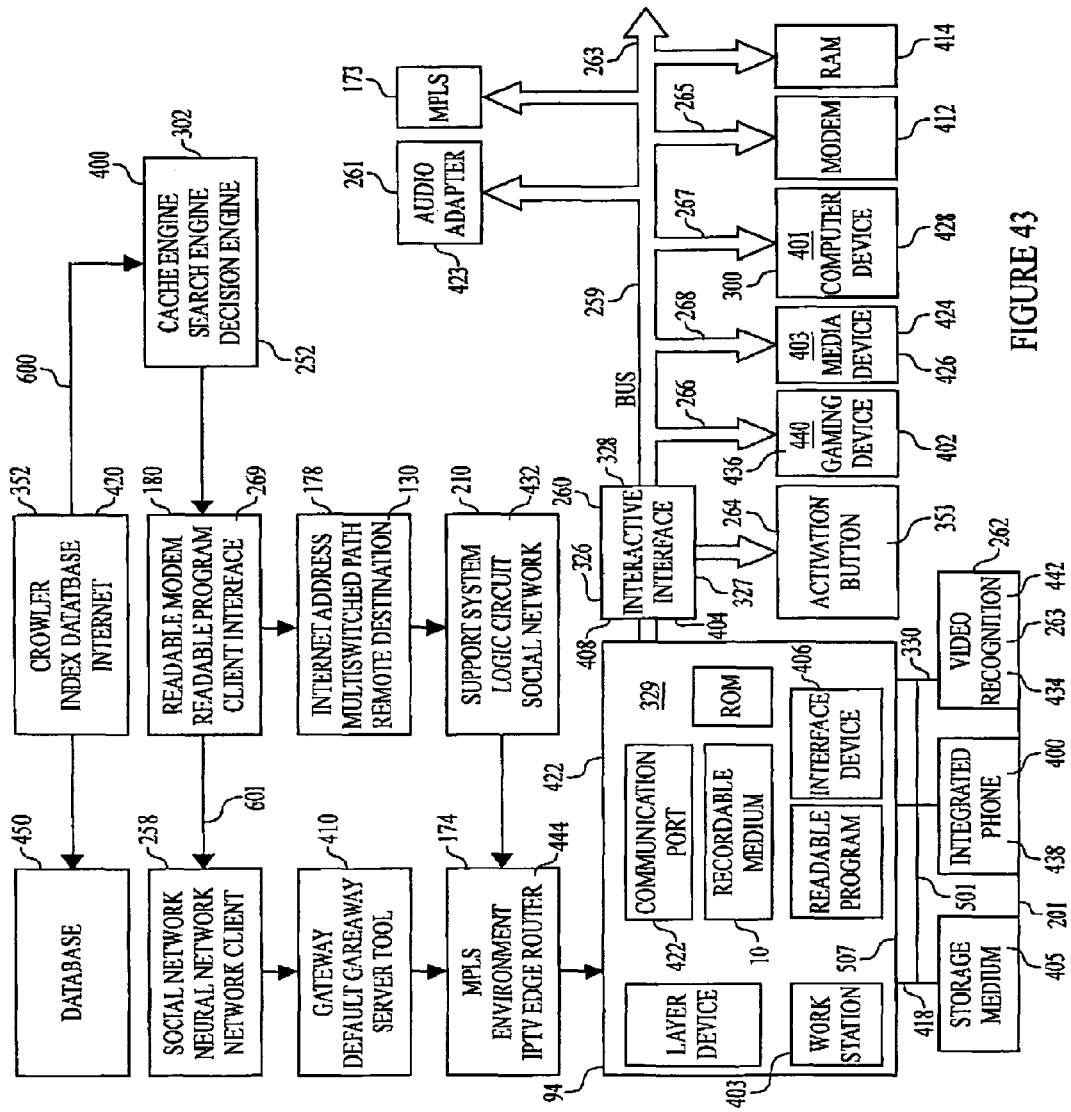
Figure 44:
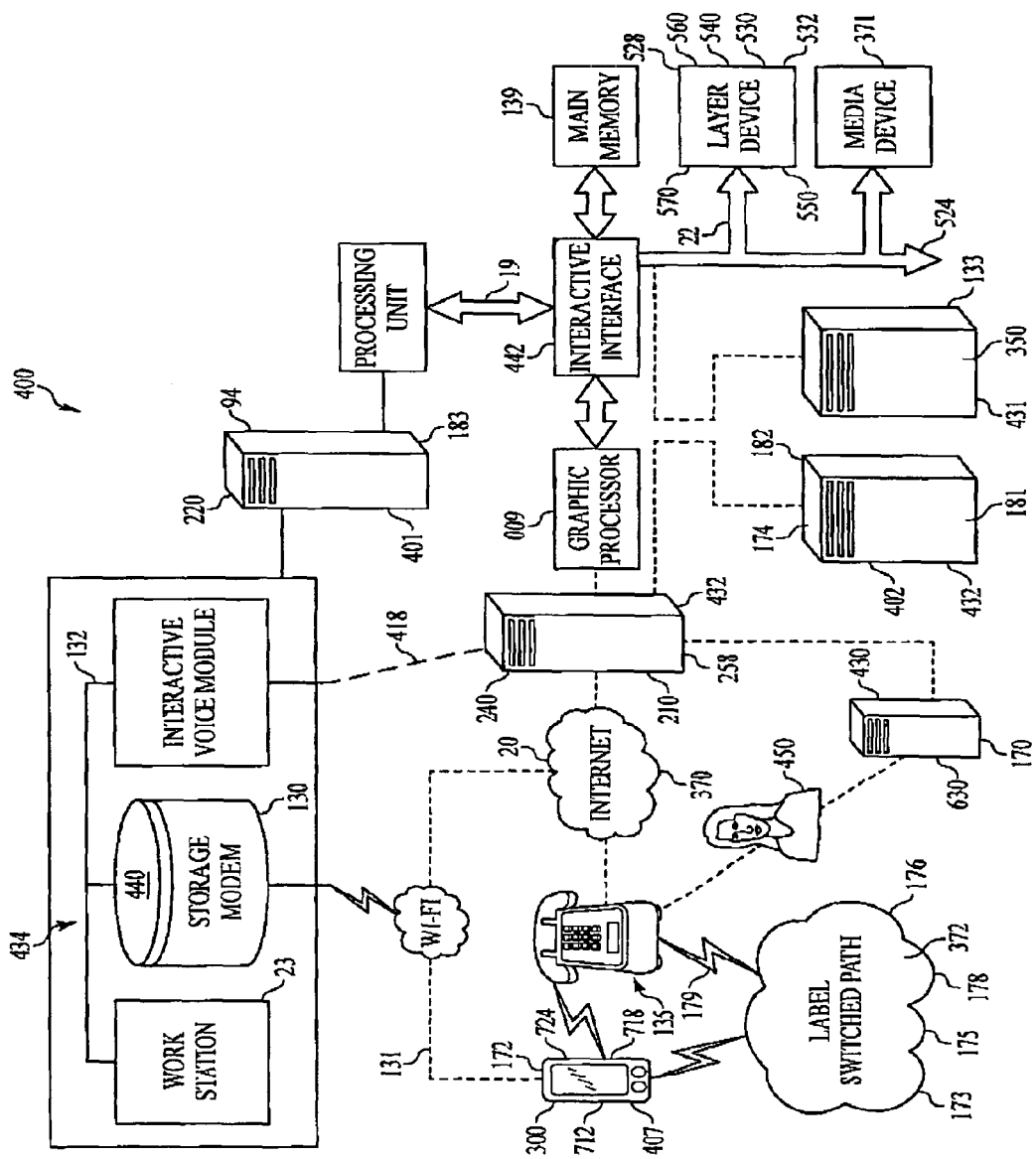
Figure 45:
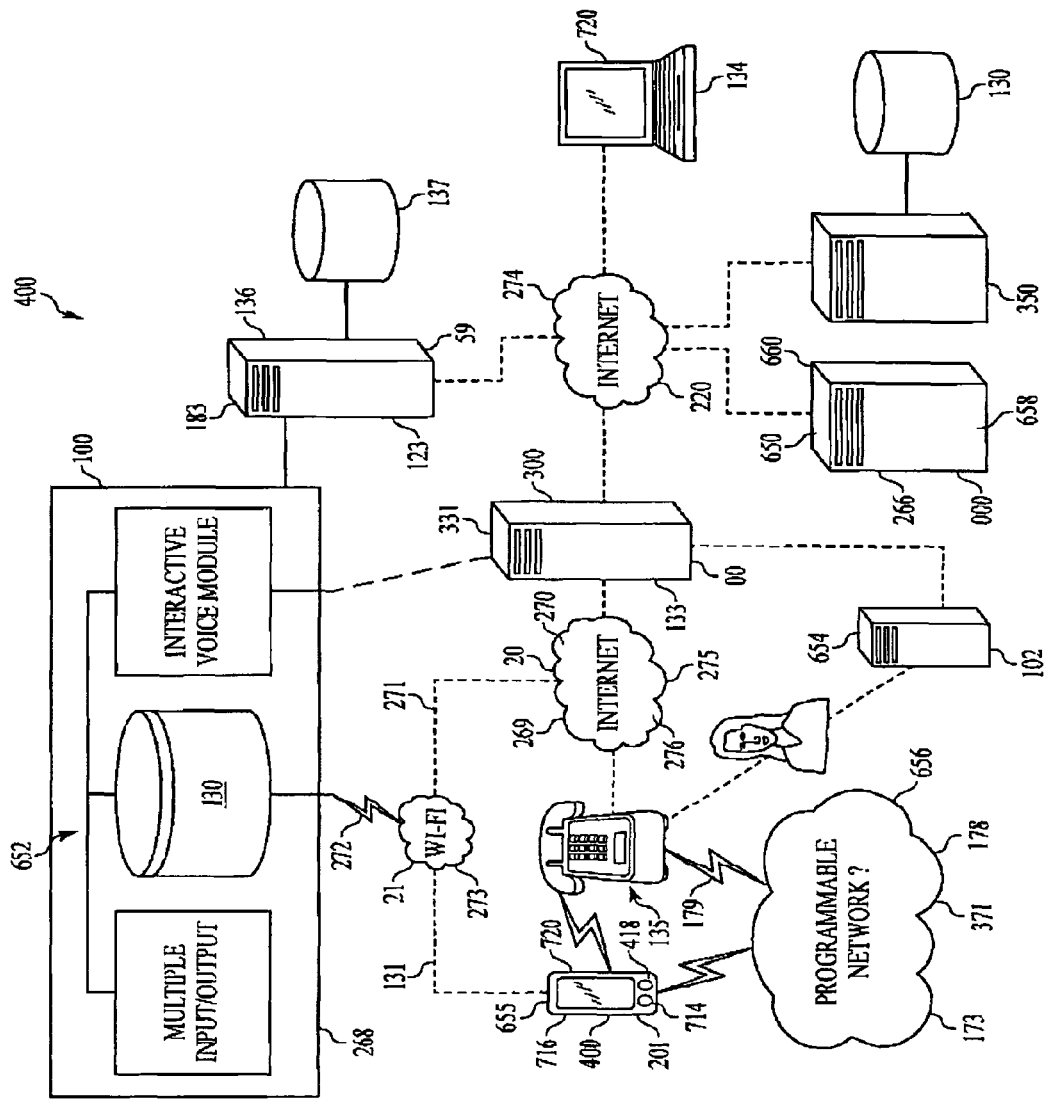

Referring to FIG. 42 is seen exemplary embodiments of the communication apparatus 400 operatively configured with the communication control apparatus. The communication apparatus further comprises at least one of: a cell phone device, social network platform, a server device, a GPS device, a radio device, a charging device, TV applications, a gaming device, and energy production platform. The communication apparatus is operatively configured with control device, further comprising transistorized switches in communication with at least a relay device, accelerometer, cell platform, and detection platform. Embodiments further provide at least one of: fault indicator, date signal, charged indicator, at least memory, at least an actuator, at least a chip, and at least a wireless communication device.

Referring to FIGS. 29 and 31 is seen a display unit being operatively configured for communications and for converting sound waves, vibration, wind force, pressure, and solar energy into electrical energy. The display unit comprises interactive screen being configured with nano-wires/tubes comprising at least one component of: carbon char, carbon black, metal sulfides, metal oxides and other organic materials being alloyed with the microfiber material. Disclosed embodiments further provide communication apparatus being disposed with alloyed material being configured for exhibiting unique electrical and electrochemical properties to provide efficient transportation of energy properties. Certain embodiments provide sensors being embedded in a silicon substrate and fused/etched in a micro fiber material. The display unit further comprising a monitoring screen 250, being communicatively connected to I/O terminals 01. The IC card 240 comprises a second memory 320, in communication with the I/O terminal 03. Commands are processed in the main body 301 configured with the I/O terminal 01. The modem 55 is communicatively connected to the communication control device 40, which is operable when power is applied to the megatel device 300. The media device is secured on the dashboard by at least a support bracket 155 and fastened by a fastener 5. The control device 40 is operatively configured to access and process all the commands and in communication with memory 220 being configured with the monitoring screen 250. The control device 40 comprises at least a silicon control rectifier "SCR" operatively configured for accessing and processing all commands in the command state as input. Embodiments provide the modem 55 communicatively connected to the software program 116 operable with the megatel device 300.

The software program 116 is programmable for communications with the cell phone slot 25, the cell phones 400, radio 410, the media device 420, and the wireless Internet 430. The software is communicatively connected to the logic circuit shown in FIG. 5, to process input and output data. The software is in communication with memory 220 being operable with the monitoring screen 250. The software further comprises an operating system configured with the control device 40, in communication with the wireless radio fiber optic modem chip 115, which is communicatively connected modem 55. The wireless radio fiber optic modem chip 115 is configured with the IC card 240 being operable to permit exchange of input and output of data between devices. Disclosed embodiments further advance safe driving with improved communication. The cell phone 400 is wirelessly connected to the megatel device 300, and may be inserted into slot 25 in communication with cell phone 400. Embodiments provide input and output communications through the communication apparatus being operable with the IC card 240. The IC card memory or ROM 320 is where all programs for operational data processing are stored to allow the RAM 340 to access stored data through the line terminals 011. Processed data are stored in the ROM 320, including languages and software 116 in communication with RAM 340.

Referring to FIGS. 31 and 32 is seen communication apparatus being operable with the software program 116 and transferring communication data through the line terminal 011 to at least one of: the megatel device 300 and/or the IC card 240. The software programs and functional data are at least stored in the ROM 320 and the IC card 240 to allow interactive wireless electronic communication by exchanging information in the IC cards 240 that are uniquely operable within the communication medium. There is a second I/O terminal 02 at the megatel body 301 that allows data to be shared with other devices. The cell phone 400 employs an input device from a personal computer 11, a base station 13, and a branch station 16. The radio 410 enables communication with the base station 13 through the radio waves, allowing the receiver 70 to absorb the emitted signal from the base station 13 to the branch station 16, the antenna 10 absorbs or receives the signals from the communication stations, which is being communicated to the mixer 35 for filtration. The oscillator 22 is operable with the mixer 35 and in communication with the amplifier 33. The amplified signals are demodulated into digital signals by the demodulator 450.

The demodulated signals are then sent to the CPU 425 for operational processing. The CPU 425 process selection calls to allow other communication devices like road constructions, exit rams, advertisements, police communication activities through the branch stations 16 to the megatel device 300. The branch stations transmission medium permits calls made within localized range with the receiver 70 to be classified as a local calls. Embodiments provide a "TV system being viewed on a sun-visor and/or a screen monitor disposed on a sun-visor." Embodiments provide a decoder system operable for converting analog signal into digital data for display on a television set and/or a monitor. Embodiments provide a microprocessor 85 being configured for identifying numbers, letters, and in communication with the antenna apparatus operable for emitting radiant energies traveling through waves. Certain embodiments provide at least one chip comprising at least a microprocessor. The chip 115 is communicatively connected to the logic circuit and being operable with the antenna apparatus 10. Disclosed embodiments provide the communication apparatus in communication with the chip. The carrier detector 82 detects an open station. The oscillator 22 is communicatively connected to the Electro-optical modulator 460 through electronic switches 46, being operable with the transmitter 60. When the transmitter 60 is on the transmission mode, the modulator 460 is operable corresponding to the dialed tag number 14. At least one station comprises a satellite station in a network. The software operatively configured with the communication apparatus for communication with a network station.

Referring to FIGS. 31 and 5 is seen further embodiments of the communication apparatus being operable for transmitting and for receiving communication signals through the antenna 10, being operable with the antenna switch 15 responsive to the received signals, being amplified by the amplifier 33, in communication with the mixer 35. In one embodiment, the fiber optic modem chip 115 is embedded inside the wireless radio modem 55 in communications with the Internet button 00 being operable for at least one of: Internet transmission, radio waves transmissions, wireless Internet communications, land based mobile communications, air based mobile communications, and air and marine vehicles communication applications. Embodiments provide wireless Internet communication apparatus being configured for at least one of: vehicular communications, information system, vehicular Internet activities and electronic wireless communication without any interference with the steering wheel control. The wireless vehicular Internet communication includes microprocessors being configured for selecting and inserting advertisements which may be displayed to at least a user. Embodiments further provide vehicular information, entertainment, communication, and advertisement. Embodiments provide television programming viewed by at least a user and compiles the user profile for in-vehicle media or vehicular television programming.

Embodiments further provide method to eliminate automotive safety hazards through hands free communications. Disclosed embodiments further provide a method for pushing on the Internet button 00 operable for Internet connection, activation, and communication. The server 75 further comprises a workstation, in-vehicle computer, a computer device, or other network node being operable for providing the management of at least multiple vehicles and networking resources a single point of administration. The server 75 provides server functions via wireless local area network (LAN). The server 75 is operable on a media device being operatively configured with communications software that includes network operating system (NOS) software such as windows NT, Unix, Linux, or Novell Netware. The server 75 may include a login server application for initial configuration such as Novell Directory Services ("NDS) for managing access to computer networks. Embodiments further provide methods for a network administrator to set up and control a database of users and manage them using a directory with a graphical user interface. The server 75 may also comprise of file server, e-mail server, and Internet server applications to enable separation of data storage. Using NDS, or the server 75, users of the media devices and in-vehicle computers and other communication devices at remote locations can be added, updated, and managed centrally. The initial login operation to the network is typically controlled by a script, which is executed or interpreted. Other means of operation in addition to Novell Directory Services may include Microsoft's Active Directory to be utilized as a directory service.

The file server application allows files contained on the server 75 to be accessed by at least wireless devices. The email server may be utilized to manage and control email accounts on the wireless network and permit the sending and receiving of Internet email via Internet. The email server utilizes voice enabled applications to read mails to recipients. The Internet server allows access to the Internet and operable with at least a browser in communication with the World Wide Web to search contents specific to users needs and for file transfers using the File Transfer Protocol. The server 75 includes management and control applications for managing and controlling each of the devices connected to the server 75, including at least one of: a media device, the appliance and the environmental device. For example, the server 75 is operatively configured with software for automatically controlling a thermostat in a vehicle or for providing a uniform means of controlling each of the electronic devices on the wireless LAN 150. The Internet server is further configured for allowing the transmission and receipt of Internet electronic mail messages, including audio/visual messages and/or human voice auditory from suitable network nodes such as the mobile terminals of various networks. The office equipment of the LAN 150 is signified by the dashed circle in FIG. 29 and provides all of the functions of equipment that may be associated with a home or workplace office. Printers, the scanner, and the fax machine are provided with a wireless transceiver for communicating with the server 75 via respective antennas. In this regard, special server applications such as a print server may be provided on the server 75 to allow all terminals on the network to share the printers, and office equipment in general.

Referring to FIG. 31 is further seen the control device 40 being configured for signal detections in communications with the ring indicator 74 and the Internet server 75. The ring indicator 74 identifies calls and also allows the metal base sensors 360 of the cell phone 400 to decode calls permissible over the radio and the antenna apparatus. The control device 40 is configured for cell phones 400 communications operable with the hock-up control device 41 to connect all phone calls to the server 75. The control device 40 receives phone number from the tone encoder 66 and decodes the number to identify the destination country so that an appropriate receiver is enabled. The server 75 is configured with the control device 40 responsive to receiver 70 and/or to the Internet network.

Referring to FIGS. 34 and 35 are seen the receiver 70 and the transmitter 60 being operable to transmit and to receive voice and data communication signals through wireless means. The server is further responsive to communications to department of transportation. The ROM 320 stores all the tag numbers 14 for each state, and when the tag number is dialed, the decoder 43 compares the coded tag number to that of the ROM 320. If the matching signal is identical, the ROM 320 then send the tag data to the CPU 425 that will then process data and enable communications with the base station 13. The reflected signal is absorbed by the antenna 10 and received by the CPU 425. The CPU 425 controls the logic that allows wireless communications, data processing, and component interface. The computer program comprises programmed code being embedded in the computer storage medium. The memory of the server 75 includes data that are shared among traffickers when an emergency is eminent, providing easy means of communication in the highway. The stored data are used as identification numbers, which are assigned to individual vehicles and modified for use as regular phone numbers. Plurality of the tag numbers could be dialed by an officer during police chase or road emergency, by simply assigning a code to the direction of the route in question. The cell phone switch 002 allows the server 75 to allocate data that are coded and assigned as emergency numbers and phone numbers. Embodiments further provide a media device being configured with software being programmable for operation with the computing system. A computing system further comprises communication channels that allow communication with other systems and devices. The communication channels are examples of communications media which embodies computer-readable instructions, data structures, program modules, and/or other data in a modulated data signal such as a carrier wave or other transport mechanism, including any information-delivery media. By way of example, and not by limitation, communications media include wireless/wired media, such as wireless/wired networks and direct-wired connections. The wireless media comprises acoustic, radio, infrared, and other wireless media. The computing system comprises input components, including VOIP, keyboard, mouse, pen, a voice-input component, a touch-input device. Output components include screen displays, speakers, printer, at least a module such as adaptors for driving them. The computing system is also powered by a power supply, including cells and battery devices.

The fiber optic modem chip 115 and the microprocessor 85 are further operable to transmit and receive signals and also programmed to dial a 911 or a home phone number when a collision is detected. The communication apparatus comprises Internet applications and interactive screen 250 being interfaced for viewing and monitoring Internet accessed information and for providing output data. Embodiments further provide the cell phone device in communication with the transmitter 60 being operable to impact communication signals. The cell phone device is further operable through the radio speakers 001 operatively connected to a media device. The low voltage line signal 101 is the source voltage of the cell phone 400, which is configured with a controller that monitors the voltage count to the preset voltage 102. The voltage counts output signals to the CPU 425 to control strings of events in communications with the built in logic and the network. Embodiments provide low power consumption communication apparatus configured for processed data transmission through the wireless radio modem 55 to the server 75. The communication signals are outputted through the radio transmitter 60 through the antenna 10. All signals are reflected to the reflection circuit 105, in response to the processed data signals in communication with the demodulator 450 being operable to demodulate the received data or signals travelling through the antenna 10 to the communication apparatus. The transmitted messages are coded by the source 31 and decoded by the receiver 70 to initiate communications. The insertion slot configured with the IC card 240. The insertion slot is further configured with an indicator composed of a light-emitting diode. Loading the IC card into the insertion slot will illuminate the light-emitting diode (LED). The LED blinks when the IC card 240 is loaded. Signals are transmitted through electrical impulses that are changed into sound waves and used to transfer, emit, and absorb the coded information. The impulses are changed to sound waves to enable the megatel device logic mode to be operable with the accept button 47 to further advance the hands free communication to reduce accidents caused by the use of cell phones 400 while driving.

Embodiments further provide a 411 button 49 in communication with the microprocessor 85 operable with software 116 for communicating with the data base for the department of transportation and for providing network services between transportation highways, the police, and computers. The embedded chip 117, the fiber optic modem chips 115 and the Electro-optic modulator 460 provide translation of electrical signals to optical signals to enhance the wireless Internet services. The embedded chip 117, the RAM 340, and the CMOS 370 are in communication with the microprocessor 85, the fiber optic modem chips 115, and the Electro-optic modulator 460 operable to transmit and receive wireless Internet communication and wireless cell phone 400 communications. The self-test chip 119 is configured with the self-test button 44 to check the functionality of components of the communication apparatus. Embodiments further provide monitoring screen 250 being built in the sun-visor 130, with wires harnesses running through the sun-visor base 131 to the media device output terminal configured to allow data to be displayed through the screen 250.

Referring to FIG. 29 and FIG. 38, when the tag number 14 is dialed, the microprocessor 85 will power the megatel device 300 to pick the radio or microwave signals in other to ascertain communication. Embodiments further allows cell phones 400 to be electrically charged through contacts between the coded metal base sensor 360 of the cell phone 400 and the second sensor 327 inside the slot 25. The cell phone 400 is further connected to the slot 25 to allow the metal base sensor 360 of the cell phone 400 and the second sensor 327 of the slot 25 to initiate contacts so that communication through the media 420 and the speakers 001 are ascertained. The megatel device 300 is operable as hands free cell phone 400, when the cell phone 400 is inserted in the slot 25. When the cell phone 400 is in the slot 25, the metal base sensor 360 and the second sensor 327 of the megatel device 300 are communicatively connected to ascertain communication through the media system 420 and provide audible output responses through the speakers 001 and/or the display device. The speaker is disposed on the interior of the vehicle and the cell phone, and secured by a fastener. The control device 40 is disposed/snapped onto a housing 20 and connected to the media device by at least a cable means. The control device 40 is configured with a spring-like clip 35 that snaps securely into the housing 20. The megatel device further comprises a vehicular entertainment system comprising of a portable electronic apparatus configured with methods for receiving information from a transmitter and providing the information to vehicular occupant. At least one touch button is associated with the active area of the display device for enabling input data, data retrieval, and data transmission. At least a modem is responsive to data received/transmitted. At least a memory is provided for storing plurality data into a hierarchy level sequence of memory frames. Each memory frame is uniquely identifiable and includes information portions corresponding to images, active areas and links. A control device is provided for identifying information to be displayed upon query.

The microprocessor 85, the fiber optic modem chips 115 are the intelligence of the megatel device comprising a programmable means for contacting the corps through a one push button 005 being operable for communication between the corps and vehicles on the direction of the corps patrol. Together with the emergency 911 button 30, the megatel device 300 facilitates connections to the nearest police station or police car for immediate emergency rescue. In other to allow other networks and businesses to advertise nationwide along the highway, pluralities of microprocessor 85 are programmed to enable communication between the advertising board 007 on the highway and the megatel device 300. Near by restaurants and other businesses along the perimeters of the highway, the gas stations and other lucrative areas could be programmed to advertise and communicate with the megatel device 300 to inform commuters about the advertised businesses or products. The microprocessor 85 further enables the power antenna 10 to absorb or emit coded energies to initiate communication.

The fiber optics is used for the antenna 10 and components of the megatel device 300, the transmitter 60, and the receiver 70 to transmit and receive wave signals from radio waves and microwaves by determining the amount of light traveling down the fiber. The fiber optics measures the amount of light traveling down the fiber or from one fiber to another in optical radiation. The optical properties change each time the fiber optic is exposed to other electrical data sources. That is, the speed of the light remains constant when the voltage is removed from the modulator 460, and varies when the voltage is installed in the modulator 460, allowing the light wave to reinforce each other and create a 1 "bright". When the waves are out of phase, they cancel out each other, creating a 0 "dark." The modulation is laser-like being modulated with electrical signals or impulses. The lights are switched from dark to bright, representing OFF and ON, or 0's and 1's in digital information and communications. The fiber optic modem chip 115 allows Internet activities to be enabled. The sun-visor is adjustable to accommodate different drivers. The interface unit 95 is connected to the circuit board 94 being operable to allow the control functions and memories to intelligently control functions of the communication apparatus in communication with the network software 116.

Referring to FIG. 31, certain embodiments provide the fiber optic modem chip 115 in communication with automatic switch 200 for the wireless Internet, allowing corresponding pin interface in communication with other fiber optic modems 55 and server 75. Transmission to the modem 55 is synchronous, allowing the transmission time to be selected for internal and external or loop-back clock. Disclosed embodiments transmit and receive through the antenna 10. Carrier signal is modulated in response to the transmitted data by diode 80, reflecting radiated signals to the radio modem 415, through the antenna 10. The diode 80 detects the received signals and supplies the control device 40 with the detected signals in communication with the amplifier 33 being operable for signal amplification. In other embodiment, speaker 001 is disposed in a housing 015 and held in place by at least a fastener 5. Still in other embodiment, the sun-visor is secured on a bracket 035 disposed on the roof and secured by a fastener 5. The control device 40, upon receiving the signal, enables communication with the CPU 425 being operable to supply processing data to the carrier and also to receive transmitted data from the demodulator 450. The modulated signals are sent to the bias 93 in communication with decoder 43. Various mode buttons allow stored messages or emails to be received and transmitted to the monitoring screen 250. The monitoring screen 250 is configured for viewing wireless Internet related activities in vehicles and cell phones 400 through a view window 131. Disclosed embodiments provide power and input to the monitoring screen 250. Certain embodiments provide the cell phone being inserted into the slot 25 and providing communication/being operable through a media device. Other embodiments provide Internet communication being enabled through the server 75 being operable to receive the Internet information or data and communication output through monitoring screen 250. Certain embodiments provide the monitoring screen being communicatively configured to display all data or information when activated for viewing.

Referring to FIG. 29, the sun-visor 130 is pivoted at a supporting base 05 to absorb vibration and is connected to a ball joint 06 to further allow permissible screen angle adjustment and relocation. The sun-visor mounting base 05 and the monitoring screen 250 are pivotally moveable, and comprises of a cover 015, that covers the monitoring screen 250 when disabled. Embodiments provide the communication control apparatus being further operable to electronically enable the screen when Internet transmission is eminent. The mirror case 15 is an accessory for individual use. Embodiments further provide the communication apparatus being configured with semiconductor devices being operable for higher scale of signal integration and functional intelligence, providing improved cellular communications and vehicular wireless Internet services. The logical circuitry is further configured for determining the sequences. Numeric counts start from 0 to 9 while the character counts starts from 10 to 35. The arrangement of the count is not absolute, as it could further be arranged in different applications and settings.

| NUNERIC TO DIGITAL DAILING SYSTEM "DECIMAL TO BINARY" | | | | | | | |
|---|---|---|---|---|---|---|---|
| Decimal | 0 | 1 | 2 | 3 | 4 | 5 | 6 | 7 |
| BINARY | 0 | 1 | 10 | 11 | 100 | 101 | 110 | 111 |

| Decimal | TEXT CHARACTER | BINARY |
|---|---|---|
| 10 | A | 1010 |
| 11 | B | 1011 |
| 12 | C | 1100 |
| 13 | D | 1101 |
| 14 | E | 1110 |
| 15 | F | 1111 |
| 16 | G | 10000 |
| 17 | H | 10001 |
| 18 | I | 10010 |
| 19 | J | 10011 |
| 20 | K | 10100 |
| 21 | L | 10101 |
| 22 | M | 10110 |
| 23 | N | 10111 |
| 24 | O | 11000 |
| 25 | P | 11001 |
| 26 | Q | 11010 |
| 27 | R | 11011 |
| 28 | S | 11100 |
| 29 | T | 11101 |
| 30 | U | 11110 |
| 31 | V | 11111 |
| 32 | W | 100000 |
| 33 | X | 100001 |
| 34 | Y | 100010 |
| 35 | Z | 100011 |

When the numeric and text character dialing system is used for assigning cell phone 400 numbers, the numbers will be digitized and coded to turn on series of switches representing 0s and 1s in digital counting. The 0s and 1s are the number of bright light and dark, a representation of the change of optical properties when exposed to electrical data source. Numeric numbers and text characters are converted to binaries and coded to speed up the counting processes. The following components are further explained.

1C1=CPU
1C2=RFID Chip reader
L1+L2=LED
S1=ASPDT "Automatic momentary single pole double throw" switch, for transmitting and receiving signals.
CI=Electrolytic capacitor
C2=imf capacitor
C3=imf capacitor
Q1=Infrared or general purpose silicon transistor
Q2=Phototransistor detector
L1=Infrared LED emitter
M1=speaker/microphone
R1 through R10=Resistors While certain aspects and embodiments of the disclosure have been described, these have been presented by way of example only, and are not intended to limit the scope of the disclosure. Indeed, the novel of the apparatus described herein may be embodied in a variety of other forms without departing from the spirit thereof. The accompanying claims and their equivalents are intended to cover such forms or modifications as would fall within the scope and spirit of the disclosure. It is to be understood that the scope of the present invention is not limited to the above description, but encompasses the following claims.

What is claimed:

1. An energy harvesting communication device configured with signal booster apparatus, comprising:
at least a communication apparatus;
at least an antenna apparatus communicatively coupled to the communication apparatus and in association with at least an input output (IO) device;
at least a microprocessor configured with a software for controlling communications via the communication apparatus and for processing data associated with said IO device; said at least an antenna apparatus in communication with said at least a microprocessor; and
at least a sensor apparatus embedded in silicon substrate and embedded in a microfiber material to provide at least one of a communication medium, communication clarity, a detection platform, detection selectivity, and detection sensitivity.

2. The energy harvesting communication device of claim 1, wherein said IO device further comprises a computer apparatus configured for providing at least one of optical data transmission, optical communication, optical data storage medium, optical communication, and character processing, each said IO device further comprising a graphic user interface configured with at least one of: a display apparatus; a keyboard; a pressure responsive apparatus, a vibration responsive apparatus; means for converting pressure into electrical energy; an illuminance sensor associated to a glass surface operable for reflecting sufficient light to form an image of an object placed in front of a display apparatus; wherein said pressure apparatus and said vibration responsive apparatus are further configured for generating electrical energy.

3. The energy harvesting communication device of claim 1, wherein said IO device further comprises a media device comprising at least a receiving device, said media device operatively configured for broadcasting media content over the Internet, and the energy harvesting computer device further comprises a mobile device operable for at least one of: communications; transmitting characters; displaying characters; broadcasting television content; reflecting sufficient light to form an image of an object placed in front of it; receiving character; harvesting energy from an environment; and downloading media content.

4. The energy harvesting communication device of claim 1, wherein said IO device is further configured with said at least a sensor apparatus being operable for enabling communications and for generating electrical energy, and further comprises a receiver and a signal boosting apparatus operatively configured with said receiver.

5. The energy harvesting communication device of claim 1, wherein said at least a communication apparatus configured with a chip in communication with said at least an antenna apparatus, wherein said chip further comprises signal booster apparatus, said signal booster apparatus further comprises a device selected from the group consisting of a signal booster that increases signal reception capabilities for the receiver, and an amplifier operable for amplifying frequency band signals received by the receiver.

6. The energy harvesting communication device of claim 1, wherein said at least a communication apparatus configured with said control logic, said control logic in communication with said detection platform, wherein said detection platform further generating detection signals responsive to movements of at least one of: character; objects; keypads; energy; electrical energy; vibration energy; force energy; and pressure energy, and wherein said control logic operable for controlling an application is responsive to said at least one detection signal.

7. The energy harvesting communication device of claim 1, wherein said at least a sensor apparatus further comprises at least a chip in communication with said control logic, wherein said at least one chip is a signal booster being operable to amplify communication signals.

8. The energy harvesting communication device of claim 1, wherein at least one chip is configured with said at least an antenna apparatus, said antenna apparatus further comprises at least one of: a communication signal booster, a frequency band amplification path, a radio frequency transceiver, an RF transmitter, a transducer, and an infrared (IR) transceiver.

9. The energy harvesting communication device of claim 1, wherein said at least a microprocessor further comprises at least one of: a video communication apparatus, said video communication apparatus further comprising at least a subscriber identity module (SIM) card processor communicatively connected to said control logic; a media device comprising an entertainment module; a memory device; a communication module; energy processing module.

10. The energy harvesting communication device of claim 1, wherein said at least a sensor apparatus comprises at least one of: nano sensors, nanotechnology application, micro-electro-mechanical systems (MEMS), and a sensor module.

11. The energy harvesting communication device of claim 1, wherein said detection platform further comprises at least one of: a mobile phone case; a mobile phone housing; a mobile phone circuitry; a housing for an electronic device; a case for an electronic device; a housing for said communication apparatus; a circuit board for said communication apparatus; each said detection platform further operable for generating electrical energy.

12. The energy harvesting communication device of claim 1, wherein said detection platform further comprises at least one of: a display device; an IO device; digital video broadcast entertainment, digital audio broadcast, digital multimedia broadcast, global positioning system, means for providing safety services, transportation road communication systems, universal mobile telecommunications system, an illuminance sensor associated to a glass surface operable for reflecting sufficient light to form an image of an object placed in front of it, touch screen IO device operable for interactive communications; a pressure responsive energy producing device.

13. The energy harvesting communication device of claim 1, wherein said at least a communication apparatus further comprises sensors embedded in silicon substrate and embedded in microfiber material to provide at least one of: energy harvester apparatus; energy conversion device, sensory display and input device, interactive communication device, intelligence detection device, radiation prevention device, non cancerous communication device, secondary energy platform, primary energy platform, accelerated data processing device, solar energy to electrical energy conversion device, objects movement detection device, electronic document translation device, touch screen display device.

14. The energy harvesting communication device of claim 1, wherein said at least a communication apparatus further includes a power source module selected from a group consisting of at least one of: a transformer, a fuel cell, a battery, a solar cell, thin film, wafer module, metal ceramic material, polymers material, an illuminance sensory module, an electrochromic sensory module disposed with an electrochromic substrate, a radio frequency tag module, materials comprising at least one silicon from the silicon group, a material comprising at least one infrared tag module.

15. The energy harvesting communication device of claim 1, wherein a power source includes at least one of: carbon char, carbon black, metal sulfides, metal oxides, organic materials, textile fibers, zinc oxide (ZnO), nano-wires, piezoelectric crystals, piezoelectric elements, sensory layer, wet etching, dry etching, electron-silicon substrate-oxide, metal oxide semiconductor, optical properties, glass fiber, substrate micro fiber, substrate nano-fiber, field-programmable gate array meta material structure, cell platform, solar cell, nickel-cadmium batteries (NiCd), nickel oxide hydroxide, metallic cadmium, wafer module, a capacitor module operatively configured to withstand a higher number of charge and discharge cycles and faster charge and discharge rates, at least one power source further comprises a material being alloyed with microfiber material.

16. The energy harvesting communication device of claim 1, wherein said at least a communication apparatus further comprises at least one of: an optical computer device; an optical communication device, an electronic computer device, an electronic communication device, an optical storage medium, signal amplifier comprising at least a variable gain module, social network platform; video recognition platform; voice over text platform; text to voice enabled conversion platform; time division multiple access platform; wideband code division multiple access platform; code division multiple access platform; terrestrial digital multimedia broadcast platform; global system for mobile communications (GSM) platform; global positioning system platform; general packet radio service platform; transportation information highway platform; modulation format selectable cellular device platform; frequency authentication platform; multiple IO platforms; enhanced digital GSM platform; enhanced direct memory access platform; orthogonal frequency division multiplex platform; orthogonal frequency division multiple access platform; Wi-Fi platform; Wi-Max platform; wireless library platform; educational module; touch screen sensory platform; phone book; electronic book; electronic reader; dictionary; calendar; calculator; Internet service applications; energy generating apparatus; gaming apparatus; and Internet service connectivity operable for global roaming.

17. The energy harvesting communication device of claim 1, wherein said at least a communication apparatus further comprises a circuit board comprising electronic system applications being configured for providing at least one of: wired communications, wireless communications, cell phone communications, handheld communication, laptop computer operations, desktop computer operations, telemetry device operations, a switching device operations, an MP3 player, a router, a repeater, a codec, a local area network (LAN), a wireless LAN, Bluetooth enabled device operations, a digital camera, a digital audio player, a digital audio recorder, a digital video player, a digital video recorder, a computer, a monitor, a television set, a satellite set top box, a cable modem, a digital automotive control system, a control module, a communication module, a digitally-controlled home appliance, a printer, a copier, a digital audio or video receiver, radio frequency transceiver, a personal digital assistant (PDA), a digital game playing device, a digital testing device, a digital measuring device, a digital avionics device, a media device, a medical device, and a digitally-controlled medical equipment.

18. The energy harvesting communication device of claim 1, wherein said change in resistance includes at least one of: energy level, temperature level, signal level, sound quality level, signal clarity, modulated video signal, frequency bands analysis, and resistance to signal flow.

19. The energy harvesting communication device of claim 1, wherein said device further comprises at least one of: a button, a touch screen, a QWERTY keyboard, a liquid crystal display (LCD), a keyboard, a keypad, and a scroll wheel.

20. The energy harvesting communication device of claim 1, wherein said detection platform further comprises at least one of: a solar panel for converting light photons to a photo generating electrical energy, optical elements; a light shield film; an ultraviolet curing resin; a transparent support substrate; a plate; an electric power generating system; an energy management apparatus; a heating module, a cooling module; a method for manufacturing an electronic wafer module; a photovoltaic array; a solar module; a solar cell; a monocrystalline silicon wafer; a fuel cell, metal-ceramic membranes, film composite metal-ceramic materials, thin film; polymer; an amplified signal transmitter; an amplified signal receiver; a power generator engine; nanotechnology; photovoltaic module; an energy harvester; a nano-rectifier.

21. The energy harvesting communication device of claim 1, wherein said at least a communication apparatus further comprising at least a wireless communication spectrum operable for at least one of: receiving one or more wireless signals associated with at least a frequency within the wireless communication spectrum; determining at least a signal strength for the received wireless signals; determining at least a signal strength for at least a cell within the frequency; allocating the at least one cell for enabling wireless transmission based on at least a predetermined threshold value.

22. The energy harvesting communication device of claim 1, wherein said at least a communication apparatus further comprises at least one of: means for transmitting a wavelet carrier signal within the allocated at least one cell; apparatus for harvesting energy from environmental conditions to charge an energy storage device at a first rate using the harvested energy; and a sensing module operable to sense a condition and to perform at least one of: transmitting a wireless signal indicative of said condition; adjusting the energy harvesting means responsive to said environmental condition, directing said apparatus responsive to the direction of natural light to harvest said energy effectively.

23. The energy harvesting communication device of claim 22, wherein wavelet carrier signal is generated based on at least one of: a scaling parameter; shifting parameter; a parameter that dilates the wavelet signal in time; beam scattering parameters; electromagnetic metamaterial based parameter; plasmonic parameters; a parameter that reduces the wavelet signal frequency band based on said dilated wavelet signal in time; a parameter that compresses the wavelet signal in time; and a parameter that increases the wavelet signal frequency band based on the compression time.

24. The energy harvesting communication device of claim 1, wherein said at least a communication apparatus further comprises at least one of: means for exchanging controllable information between at least a transmitting device and at least a receiving device; means for maintaining a charge in at least an energy cell means to sustain operation of the sensing module, wherein said energy cell means further comprises at least one of: at least a photovoltaic panel; at least photovoltaic cells; at least a piezoelectric element; at least means for converting a form of energy into electrical energy; at least an alternating current (AC) to direct current (DC) converter operable to convert an AC voltage from an AC power source to a DC voltage; at least a means for providing a notification in response to the energy storage device full charge; at least an energy harvesting wearable case for said communication apparatus for harvesting electrical energy.

25. The energy harvesting communication device of claim 24, wherein said controllable information further comprises at least one of: transmission center frequency; harvesting energy from environmental conditions; receiving at least an energy source into a charging input port; charging the cell means at a controllable rate; signal transmission time slot, and information associated with the wavelet carrier signal; reflecting sufficient light to form an image of an object placed in front of a screen.

26. The energy harvesting communication device of claim 1, wherein said at least a communication apparatus further comprises at least one of an optical data storage medium; an optical communication medium: an optical computing medium: an optical computer device: an optical communication device: photonic communications: photonic network; an electronic computer device; an electronic communication device: an optical data transmission device; a digital communication device: a video communication apparatus, said video communication apparatus further comprising at least a subscriber identification module card processor communicatively connected to said communication control apparatus operable to selectively and simultaneously transmit and receive at least one of: analog signals of varying frequencies; digital signals of varying frequencies; a shift parameter that repositions the wavelet signal to one of a plurality of cells within the frequency.

27. The energy harvesting communication device of claim 1, wherein said at least an antenna apparatus in association with said at least a microprocessor for determining signal strength, further operable for determining at least one of: a plurality of wavelet coefficients corresponding to at least a received wireless signal; an average energy from the determined plurality of wavelet coefficients; energy harvesting platform; computing platform; gaming platform; downloadable platform; a social media platform; professional media platform; varying frequency platform; multiple network platform; a mirror platform; an averaging energy comprising a squared modulus for each of the determined plurality of wavelet coefficients.

28. The energy harvesting communication device of claim 1, wherein said at least a communication apparatus further comprising at least one of: plasmonic communication network: photonic communication network; means for providing wireless interconnectivity for at least one of: computer device; cell phone apparatus; gaming device; media device; entertainment device; to at least a worldwide computer network, said worldwide computer network further comprising at least: a local internet service provider portal to said network; a satellite network; each operable for allocating at least one cell within at least a frequency threshold value; a time map that is further allocated based on said threshold value, wherein said threshold value is one of above, below, and equal to the determined signal strength of the plurality of adjacent cells.

29. The energy harvesting communication device of claim 1, wherein said at least a communication apparatus further comprises means for monitoring at least one of: a communication spectrum; a frequency; a time cell for a received wireless signal; a wavelet coefficients corresponding to the received wireless signal; an average energy based on at least a determined wavelet coefficients; a threshold value exceeding at least a predetermined energy value; a light emitting diode means; a diode controlling at least a form of energy; a wireless signal; a scalable cell; a channel within the wireless communication spectrum: an optical data storage medium: an optical communication medium: an optical computing medium; an optical computer device: an optical communication device; an electronic computer device: an electronic communication device: an optical data transmission device; a digital communication device.

30. The energy harvesting communication device of claim 1, wherein said at least a communication apparatus further configured for at least one of: powering a load with energy stored in the energy cell means; powering a load with energy received from at least a secondary energy source; powering a load with said cell means and said secondary energy source; charging an energy cell means to power a load; harvesting at least an energy to maintain power to said load; utilizing at least said energy to amplify said load.

31. The energy harvesting communication device of claim 1, wherein said detection platform further comprises a cell means comprising at least one of: a capacitor; a cell phone case; a cell phone housing; a communication circuit board; a housing for a communication device; a super capacitor; a micro-electro-mechanical systems (MEMS); a thin film metal oxide; a piezoelectric element; a rechargeable battery; a rectifier; an antenna apparatus; a nano-wire; a nanotechnology application; means for harvesting energy from environmental conditions; a sensor apparatus; an alternating current (AC) to direct current (DC) converter, a DC to DC converter; integrated circuit; an integrated circuit chip electrically coupled to said antenna and an energy means.

32. The energy harvesting communication device of claim 1, wherein said at least a communication apparatus is further configured for at least one of: substantially autonomous operation; transmitting signal communications to at least mobile communication network, receiving signal communications from at least a mobile communication network, further comprising the step of sending information for identifying the wireless local area network (LAN) that the communication apparatus is requesting to be added to, sending information for identifying the type of wireless device requesting to be added to the wireless LAN; separating communication signals normal to wireless transmissions, loading at least a data content into at least a computer device, at least a receiving step comprising the step of receiving a network protocol software operable on the wireless device being identified and verifying compatibility with the LAN being identified; responsive to electrical signals communicated via the antenna.

33. The energy harvesting communication device of claim 1, wherein said at least a communication apparatus further comprises an integrated circuit chip comprising at least one of: a circuitry in association with the antenna; an energy harvesting device; means for converting non-electrical energy to electrical energy; an environmental sensory circuitry configured to perform at least one of: detection, communication; communicating at least a characteristic of energy harvesting associated with an external environment; receiving at least an acoustical input data; receiving at least an electrical impulse input data; at least a wireless communications circuitry operable for transmitting at least a characteristic for harvesting energy between the environmental sensory circuitry and the wireless communications circuitry; a wearable communication device.

34. The energy harvesting communication device of claim 1, wherein said at least an antenna apparatus further communicatively connected to an integrated circuit chip for communicating at least a characteristic is selected from the group consisting of at least one of: a location within an environment, a composition of an environment, a temperature of an environment, a pressure of an environment, a voltage of an electrical feature associated with the environment, a current of an electrical feature associated with the environment, a resistance of an electrical feature associated with the environment, a concentration of the environment, and a viscosity of the environment.

35. The energy harvesting communication device of claim 1, wherein said at least a communication apparatus further configured to analyze a predetermined threshold value substantially associated with at least one of: a software defined radio; a structural communication architecture; database; a compiler; a router; and an illuminance sensory environment associated with voltage for changing a screen into a mirror environment.

36. The energy harvesting communication device of claim 1, wherein said detection platform further comprising a cell platform, and wherein the cell platform further comprises at least one of a charging apparatus; and a communication device.

37. The energy harvesting communication device of claim 1, wherein said detection platform further comprising a cell platform in communication with at least one of a mobile terminal: a transportable terminal; a mobile network: a transportable network.

38. The energy harvesting communication device of claim 1, wherein said at least a communication apparatus further comprises a mobile terminal configured to receive from said detection platform, at least one of a form of energy; communications.

39. The energy harvesting communication device of claim 1, wherein said detection platform further comprises at least one of a thin film solar cell; a cell platform.

40. The energy harvesting communication device of claim 1, wherein said silicon substrate further associated with said nano-fiber material: said nano-fiber material further comprises at least one of: a transparent material; an electrically conductive material; an electrochromic element; an electrochromic unit; means for producing photovoltaic electric field; a self charging platform; a wearable charging means.

41. The energy harvesting communication device of claim 1, wherein said detection platform further comprises at least a charge platform comprising at least one of: a charge circuit; means for controlling at least a charge to at least a cell means; means for controlling at least a charge to an energy storage device; means for outputting electrical energy; means for converting at least energy within an environment into at least electrical power; a transparent substrate; a meta material substrate; and a sensor network.

42. The energy harvesting communication device of claim 1, wherein said silicon substrate in association with at least one of: an electrochromic unit; electrochromic element; a meta material element comprising at least a charge plate; and a field programmable gate array (FPGA).

43. The energy harvesting communication device of claim 1, wherein said silicon substrate microfiber further comprises at least one of: a coating for harvesting electrical energy; an external surface comprising at least a case configured for harvesting electrical energy; a solar cell; a charging circuit apparatus; an illuminance sensor in association with energy contained within an environment, in communication with the cell platform; means for converting light energy into electrical energy; a bendable piezoelectric element comprising at least a cantilever sensor; a sensor responsive to pressure; a piezoelectric membrane; a material disposed with electromagnetic cavity to form a wireless bus; wherein said material further disposed on a housing to provide a cavity resonator for signal propagation.

44. The energy harvesting communication device of claim 1, wherein said at least a communication apparatus further comprising at least one of: a housing structure comprising a silicon substrate microfiber; a substrate nano fiber consisting of solar cell platform configured for energy harvesting; a communication circuit board configured with complementary metal oxide silicon (CMOS) multiple antennas on chip in association with a rectifying circuit: means for converting electromagnetic wave into electrical energy; a display device configured with piezoelectric elements, said display device responsive to applied force, converting said applied force into electrical energy; a cover being fabricated from at least a material, at least one material is a solar cell configured with a flexible ribbon-like nano wires being connected to a rectifier disposed in a universal serial bus (USB) mail port; wherein said USB mail port in communication with at least a female charge port disposed with said housing; said housing further comprising at least one of: cavity waveguide; cavity resonator; signal propagator; a cavity assisted radio frequency pathway; and a radiating element.

45. The energy harvesting communication device of claim 1, wherein said at least a communication apparatus further comprises at least one of: a communication circuit board comprising solar cell platform; a complementary metal oxide silicon (CMOS) multiple antenna on chip in communication with a rectifier for converting electromagnetic wave into electrical power; an antenna comprising nano-wire antenna in association with the rectifier; a nano-wire comprising a material for exhibiting good electrical properties: a nano wire operable for transmitting and for receiving electromagnetic signals; further comprises at least a gold material for receiving and for transmitting electromagnetic signals at higher frequencies; at least a touch screen comprising a sensory platform configured with at least one of: piezoelectric elements, micro-electro-mechanical systems (MEMS), load cell, strain gauge, acoustic sensor, for converting pressure force and sound waves into electrical energy; at least a case comprising solar cell platform in association with a rectifier device for converting solar energy into electrical power; at least a case comprising nano sensors embedded in silicon substrate and alloyed with meta-material structure cavity; at least a nano material substrate embedded in microfiber material to exhibit a sensory platform for converting at least a form of energy within an environment into electrical energy.

46. The energy harvesting communication device of claim 1, wherein said at least a communication apparatus further comprises an electronic device, and said electronic device is configured to be associated with said cell platform, wherein said cell platform further comprises at least a case comprising at least one of integrated electronic circuitry for energy harvesting; an optical data storage medium; an optical communication medium; an optical computing medium: an optical computer device; an optical communication device: an electronic computer device; an electronic communication device; an optical data transmission device; a digital communication device; and a wearable outfit.

47. The energy harvesting communication device of claim 1, wherein said detection platform further comprises at least a circuitry connectable to at least one of: a power means; an electronic device; a meta material structure cavity in association with nano sensors; an electromagnetic wave transport stream; means for electromagnetic wave absorption; means for converting electromagnetic energy into direct current (DC) power; an energy compensation means responsive to solar cell band gap limitation; a silicon substrate microfiber comprising a solar cell platform; a rectifying apparatus; a wearable electronic; and a wearable device.

48. The energy harvesting communication device of claim 1, wherein said detection platform further comprises at least a case comprising a power source communicable to said at least a communication apparatus, and wherein said power source further comprises at least one of: a photovoltaic module for generating power from the occurrence of natural energy sources; and an electromagnetic module for converting electromagnetic radiation into electrical energy.

49. The energy harvesting communication device of claim 1, wherein said at least a communication apparatus further comprises at least one of: an integrated radio frequency device; a nano-electronic system; means for eliminating drop calls; means for extending battery life; an Internet radio communication environment; an internet television communication environment; a radio frequency (RF)-micro-electro-mechanical systems (MEMS) device; an energy harvesting smart phone comprising an E-PHONE; an array of digitized capacitors disposed on a die; means for capturing stray radiations; means for radiating communication signals; a software defined radio device; a turn-able RF device; a turn-able RF- MEMS front end; a software defined radio on chip device; a turn-able capacitor array; an antenna apparatus comprising of a signal booster; and a dual band signal booster antenna on chip.

50. The energy harvesting communication device of claim 1, wherein said at least a communication apparatus further comprises at least one of: an energy harvesting smart network comprising at least one of an E-NETWORK; field programmable gate array (FPGA) dedicated memory; an FPGA dedicated multiplier; an FPGA silicon circuitry; an FPGA high speed IO device; an FPGA silicon nano-wire; a non-linear switch circuitry for energy harvesting; a fiber nano-generator; a piezoelectric semiconducting electronic device; means for harvesting energy locally and for transmitting information to and from the means wirelessly; a piezoelectric energy harvesting device; a transducer energy harvesting device; means for creating a free charge field across at least a capacitive element an optical data storage medium: an optical communication medium: an optical computing medium: an optical computer device; an optical communication device: an electronic computer device: an electronic communication device; an optical data transmission device; a digital communication device.

51. The energy harvesting communication device of claim 1, wherein said at least a sensor apparatus further operable to electrically couple a load to at least a rechargeable battery pack.

52. The energy harvesting communication device of claim 1, wherein said at least a sensor apparatus further comprises at least one of: means for generating electrical energy; means for harvesting electrical energy; a piezoelectric element; an integrated energy source; a solar collector; a cantilever disposed with conductive elements; and a Plasmon element.

53. The energy harvesting communication device of claim 1, wherein said at least a sensor apparatus further comprises means for harvesting energy from at least one of: an exposed signal source; an enclosed signal source; an electromagnetic wave; a resonator in association with at least a reflective element; and an optical signal source.

54. The energy harvesting communication device of claim 1, wherein said at least a communication apparatus further comprises at least one of an optical computer device: an optical communication device: an electronic computer device; an electronic communication device; an optical data storage medium; a sensor apparatus; and an energy harvesting communication device.

* * * * *